(12) United States Patent
Saylor et al.

(10) Patent No.: US 9,361,392 B1
(45) Date of Patent: Jun. 7, 2016

(54) COMPARING SUBSETS OF USER IDENTITIES OF A SOCIAL NETWORKING PLATFORM

(71) Applicant: MicroStrategy Incorporated, Vienna, VA (US)

(72) Inventors: Michael J Saylor, Vienna, VA (US); Peter Jerome DiDomenico, III, Amissville, VA (US); Javier Aldrete, Austin, TX (US)

(73) Assignee: MicroStrategy Incorporated, Vienna, VA (US)

( * ) Notice: Subject to any disclaimer, the term of this patent is extended or adjusted under 35 U.S.C. 154(b) by 137 days.

(21) Appl. No.: 13/913,415

(22) Filed: Jun. 8, 2013

Related U.S. Application Data

(60) Provisional application No. 61/668,394, filed on Jul. 5, 2012.

(51) Int. Cl.
*G06F 17/30* (2006.01)
(52) U.S. Cl.
CPC .................................. *G06F 17/3089* (2013.01)
(58) Field of Classification Search
CPC ........................................................ G06G 30/00
USPC ................................................. 707/672, 749
See application file for complete search history.

(56) References Cited

U.S. PATENT DOCUMENTS

| | | | | |
|---|---|---|---|---|
| 5,754,938 A * | 5/1998 | Herz et al. | ...... | 725/116 |
| 6,029,195 A * | 2/2000 | Herz | ...... | 725/116 |
| 6,460,036 B1 * | 10/2002 | Herz | ...... | 707/748 |
| 8,316,020 B1 * | 11/2012 | Kleinmann | ...... | 707/734 |
| 8,458,085 B1 * | 6/2013 | Yakubov | ...... | 705/38 |
| 2002/0002635 A1 * | 1/2002 | Astala et al. | ...... | 709/328 |
| 2009/0063284 A1 * | 3/2009 | Turpin et al. | ...... | 705/14 |
| 2010/0004977 A1 * | 1/2010 | Marci et al. | ...... | 705/10 |
| 2010/0057645 A1 * | 3/2010 | Lauritsen | ...... | 706/11 |
| 2010/0223119 A1 * | 9/2010 | Klish | ...... | 705/14.26 |
| 2010/0228814 A1 * | 9/2010 | McKenna et al. | ...... | 709/203 |
| 2010/0229192 A1 * | 9/2010 | Marilly et al. | ...... | 725/34 |
| 2011/0231296 A1 * | 9/2011 | Gross et al. | ...... | 705/37 |
| 2011/0256520 A1 * | 10/2011 | Siefert | ...... | 434/322 |
| 2011/0282808 A1 * | 11/2011 | Amram et al. | ...... | 705/412 |
| 2011/0306054 A1 * | 12/2011 | Jackson et al. | ...... | 435/6.12 |
| 2012/0330869 A1 * | 12/2012 | Durham | ...... | 706/16 |
| 2013/0031090 A1 * | 1/2013 | Posse et al. | ...... | 707/723 |
| 2013/0262277 A1 * | 10/2013 | Clark et al. | ...... | 705/30 |
| 2013/0290414 A1 * | 10/2013 | Rait et al. | ...... | 709/204 |
| 2014/0129345 A1 * | 5/2014 | Grishaver | ...... | 705/14.66 |
| 2014/0201134 A1 * | 7/2014 | Sankhla et al. | ...... | 707/609 |
| 2015/0100576 A1 * | 4/2015 | Zent et al. | ...... | 707/737 |
| 2015/0134745 A1 * | 5/2015 | Posse et al. | ...... | 709/204 |

* cited by examiner

*Primary Examiner* — Baoquoc N To
(74) *Attorney, Agent, or Firm* — Fish & Richardson P.C.

(57) ABSTRACT

In one implementation, data associated with user identities is extracted from an electronic social networking platform. Based on the extracted data, at least some of the user identities are classified as fitting one or more of multiple different profiles. A first subset of user identities classified as fitting a first profile is identified. A second subset of user identities classified as fitting a second profile is identified. In addition, values for a particular characteristic associated with user identities identified as belonging to the first subset are identified, and values for the particular characteristic associated with user identities identified as belonging to the second subset are identified. A display then is caused that reflects the identified values for the particular characteristic associated with user identities identified as belonging to the first subset and the identified values for the particular characteristic associated with user identities identified as belonging to the second subset.

19 Claims, 14 Drawing Sheets

JAMES

| BASIC INFORMATION | Edit |
|---|---|

Gender: Male
Birthday: July 4, 1976
Current City: Washington, DC
Hometown: Chicago, Illinois
Relationship Status: Single
Interested In: Women
Primary Language: English

| WORK AND EDUCATION | Edit |
|---|---|

Employer(s): MicroStrategy (Software Developer)

Graduate School:

College/University: Massachusetts Institute of Technology (Electrical Engineering)

High School: Lincoln Park High School

| CONTACT INFORMATION | Edit |
|---|---|

Address: Washington, DC

E-mail Address: user2@email.com

Phone Number: +1 555 555 1212

| INTERESTS | Edit |
|---|---|

SPORTS
　U.S. Soccer, Boston Red Sox, FC Barcelona, Washington Capitals, and 9 more.

ARTS & ENTERTAINMENT
　Lady Gaga, Pink Floyd, Bob Marley, U2, and 37 more.

ACTIVITIES & ADDITIONAL INTERESTS
　MicroStrategy, Chipotle Mexican Grill, Jimmy John's, TED, and 93 more.

FIG. 3B

COMPARING SUBSETS OF USER IDENTITIES OF A SOCIAL NETWORKING PLATFORM

CROSS-REFERENCE TO RELATED APPLICATION

This application claims priority from U.S. Provisional Patent Application Ser. No. 61/668,394, filed Jul. 5, 2012, and titled "COMPARING SUBSETS OF USER IDENTITIES OF A SOCIAL NETWORKING PLATFORM," which is incorporated herein by reference in its entirety.

BACKGROUND

An electronic social networking platform may store data about or otherwise related to users of the electronic social networking platform.

BRIEF DESCRIPTION OF THE DRAWINGS

FIGS. 2A-2B and FIGS. 3A-3B are diagrams of examples of graphical user interfaces (GUIs) for an example of an electronic social networking platform.

DETAILED DESCRIPTION

Figure 1A:
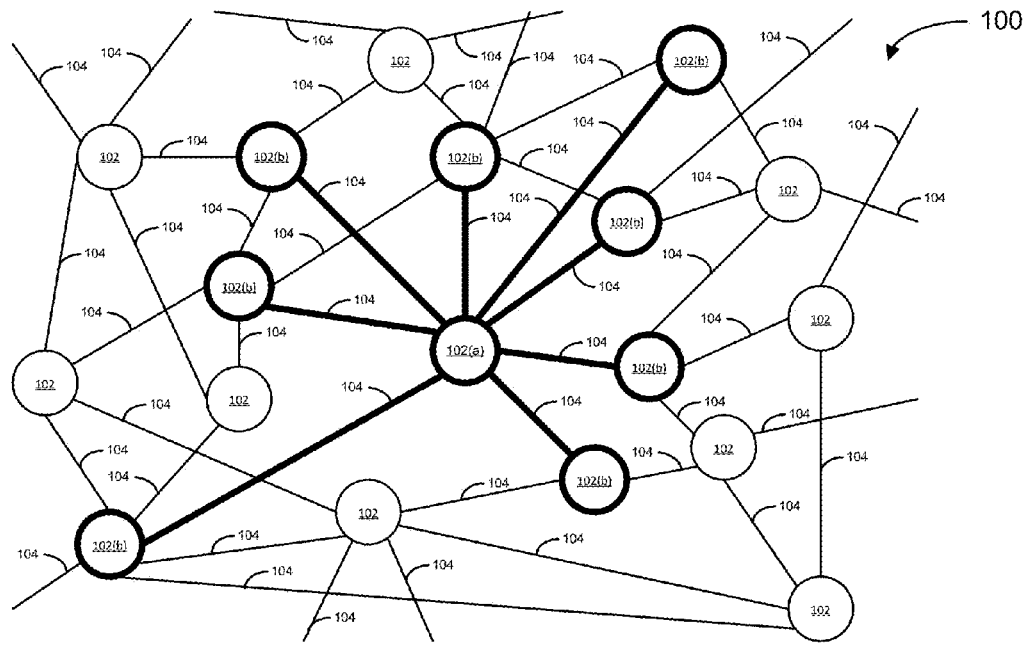
FIGS. 1A and 1B are schematic diagrams of examples of electronic social networking platforms.

An application may extract data from an electronic social networking platform on behalf of users of the application who also are represented by user identities within the electronic social networking platform. This data extracted from the electronic social networking platform may include data about or otherwise related to the users of the application. In addition, this data extracted from the electronic social networking platform may include data about or otherwise related to user identities within the electronic social networking platform who are members of the social networks of users of the application. After extracting this data from the electronic social networking platform, the application may process the extracted data to enable analysis of the extracted data, for example, to glean intelligence about the users of the application (and/or user identities within the electronic social networking platform who are members of the social networks of the users of the application).

In one example, the application may determine if the individual user identities for whom the application extracted data from the electronic social networking platform belong to any one of a number of different psychographic profiles based on the data extracted from the electronic social networking platform. Generally speaking, such psychographic profiles may represent one or more particular interests, lifestyles, values, attitudes, behaviors, and/or personality types. After identifying the individual user identities for whom the application extracted data from the electronic social networking platform that belong to the different psychographic profiles, the application may enable comparison of characteristics of the user identities that the application identified as belonging to one psychographic profile to characteristics of the user identities that the application identified as belonging to another psychographic profile.

In some implementations, the application may enable users of the application who also are represented by user identities within the electronic social networking platform to analyze the data extracted from the electronic social networking platform. Additionally or alternatively, the application may enable administrators or other representatives of the application to analyze the data extracted from the electronic social networking platform. Furthermore, the application may enable various other third parties to analyze the data extracted from the electronic social networking platform.

There are many different examples of electronic social networking platforms. Facebook, Twitter, LinkedIn, Google+, MySpace, and Orkut are just a few examples. But, there are many others, and it is reasonable to expect many more to be developed in the future. Techniques are described herein for extracting, analyzing, and/or acting upon data from an electronic social networking platform. These techniques are widely applicable and may be employed in connection with any of the above electronic social networking platforms or any other electronic social networking platforms.

Electronic social networking platforms often enable an individual user identity to create a user profile that reflects various different types of information about or otherwise related to the user identity. Such a profile for a particular user identity may be helpful to other user identities of the electronic social networking platform who are interested in learning more about the particular user identity. Similarly, the profile for the particular user identity may be helpful to the user identities of the electronic social networking platform who are interested in confirming that the particular user identity represents a particular human user within the electronic social networking platform.

For example, an electronic social networking platform may maintain a user profile for a user identity that reflects the user identity's name, gender, age, relationship status, education history (e.g., schools attended and/or degrees awarded), employment history (e.g., employers and/or positions held), contact information (e.g., e-mail address(es), telephone number(s), other electronic addresses, physical addresses, etc.), current residence information (e.g., city, state/territory, and/or country), hometown information (e.g., city, state/territory, and/or country), primary language, and/or sexual orientation.

Additionally or alternatively, the user identity's profile also may reflect various different interests of the user identity and/or indications of various different locations that the user identity (or another user identity, such as, for example, a member of the user identity's social network) has registered with the electronic social networking platform as locations that the user identity has visited. Such locations may include a wide variety of different types of locations, including, for example, geographic locations, such as cities, states, or countries, as well as commercial venues, businesses, or other places, such as restaurants, retail stores, parks, train or bus stations, airports, etc. For ease of reference, indications of locations registered with an electronic social networking platform as locations that a user identity has visited may be referred to herein as "check-ins," and information stored in a user identity's profile that reflects such indications of locations registered with the electronic social networking platform as locations that the user identity has visited may be referred to herein as "check-in information."

Electronic social networking platforms also typically enable an individual user identity (e.g., representing a human user who has registered with the electronic social networking platform and/or a human user who has been assigned a unique or otherwise identifying identifier by the electronic social networking platform) to establish connections with other user identities. These connections between user identities may reflect relationships between the underlying human users of the electronic social networking platform who are represented by the user identities. For example, a connection between two user identities within an electronic social networking platform may reflect a social friendship (e.g., developed through physical interaction in the real-world and/or through on-line interaction in the cyber-world) or a professional relationship between the underlying human users represented by the user identities.

In some electronic social networking platforms, user identities may be able to form connections with other user identities unilaterally. For example, an electronic social networking platform may enable a first user identity to form a connection to a second user identity simply by requesting to form a connection to the second user identity (without requiring authorization of the connection by the second user identity). Alternatively, in other electronic social networking platforms, the formation of connections between two user identities may involve bilateral participation by both user identities. For example, in such electronic social networking platforms, when a first user identity requests to form a connection to a second user identity, the electronic social networking platform may establish the connection between the first and second user identities only after receiving authorization to form the connection from the second user identity.

A user identity's social network within an electronic social networking platform may be defined based on the connections between the user identity and other user identities of the electronic social networking platform. In some cases, the social network of a particular user identity of an electronic social networking platform may be defined as the group of other user identities to whom the particular user identity is directly connected. Alternatively, in other cases, the social network of a particular user identity of an electronic social networking platform may be defined to extend beyond the group of other user identities to whom the particular user identity is directly connected to include other user identities who are within a threshold level of proximity to the particular user identity within the electronic social networking platform. For example, social proximity between two user identities of an electronic social networking platform may be measured in terms of the number of degrees of separation (or the number of other intermediate, interconnected user identities required to form a connection) between the two user identities within the electronic social networking platform, and the social network of a particular user identity within the electronic social networking platform may be defined to include a group of other user identities who are within a threshold number of degrees of separation of the particular user identity.

Commonly, an electronic social networking platform may provide a particular user identity with certain increased functionality in connection with other user identities who are members of the particular user identity's social network within the electronic social networking platform that the electronic social networking platform may not provide to the particular user identity in connection with user identities who are not members of the particular user identity's social network within the electronic social networking platform. For example, an electronic social networking platform may provide a particular user identity with one or more different mechanisms for electronically communicating or otherwise sharing content with other user identities who are members of the particular user identity's social network within the electronic social networking platform. Furthermore, an electronic social networking platform may allow a particular user identity to access more detailed profile information about other user identities who are members of the particular user identity's social network within the electronic social networking platform than the electronic social networking platform allows the particular user identity to access about user identities who are not members of the particular user identity's social network. Additionally or alternatively, an electronic social networking platform may enable a particular user identity to access "check-ins" registered with the electronic social networking platform by members of the particular user identity's social network within the electronic social networking platform, while not enabling the particular user identity to access "check-ins" registered with the electronic social networking platform by user identities who are not members of the particular user identity's social network within the electronic social networking platform.

The connections between individual user identities within an electronic social networking platform may be represented in the form of a graph, where user identities are represented by nodes and connections between user identities are represented by edges connecting the nodes. As new user identities join and other user identities stop using the electronic social networking platform and/or as new connections between user identities are formed and old connections between user identities are dissolved, this graph of interconnected user identities may change dynamically in time to represent the current state of connections between user identities within the electronic social networking platform.

FIG. 1A is a schematic diagram of an example of an electronic social networking platform. As illustrated in FIG. 1A, the electronic social networking platform is represented as a graph 100 of nodes 102 connected by edges 104. In some implementations, each node 102 of graph 100 may represent an individual user identity of the electronic social networking platform. In such implementations, an edge 104 that connects two nodes 102 represents a connection between the two user identities that are represented by the connected nodes 102. For example, the edges 104 that connect node 102(a) to nodes 102(b) represent connections between the user identity represented by node 102(a) and the other user identities represented by nodes 102(b). As discussed above, in some cases, an electronic social networking platform may define a particular user identity's social network as the group of other user identities to whom the user identity is directly connected. If this definition is applied within the electronic social networking platform illustrated in FIG. 1A, the social network for the user identity represented by node 102(a) would be defined as the group of other user identities represented by nodes 102(b).

As further discussed above, an electronic social networking platform may facilitate the sharing of information and the exchange of electronic communications between a particular user identity and other user identities who are members of the particular user identity's social network within the electronic social networking platform. For example, referring to the electronic social networking platform represented in FIG. 1A, the electronic social networking platform may provide mechanisms that facilitate the exchange of electronic communications between the user identity represented by node 102(a) and the user identities represented by nodes 102(b) who are members of the social network of the user identity represented by node 102(a). In some implementations, the electronic social networking platform may provide a mechanism that enables the user identity represented by node 102(a) to send private electronic messages to any one or more of the user identities represented by nodes 102(b). Furthermore, the electronic social networking platform also may provide a mechanism that enables the user identity represented by node 102(a) to publish an electronic message (e.g., a "status post") that is broadcast to all (or some defined subset of all) of the user identities represented by nodes 102(b). Additionally or alternatively, the electronic social networking platform may provide a mechanism that enables the user identity represented by node 102(a) to send a directed electronic message to a user identity who is represented by a particular one of nodes 102(b). In such cases, the recipient user identity of the directed message may define whether this directed message is shared publicly with other user identities of the electronic social networking platform.

In addition to enabling user identities to establish connections to other user identities, an electronic social networking platform also may enable user identities to establish connections with other types of objects. Among other examples, such other types of objects may include interest objects, location objects, event objects, and application objects.

Interest objects may represent a variety of different types of interests, including, for example, local businesses or places (e.g., restaurants, retail stores, parks, train or bus stations, airports, etc.); companies, organizations, or institutions; brands or products; artists, bands, or public figures; media or other forms of entertainment (e.g., books, music albums, movies, etc.); and causes or communities. As described in greater detail below in connection with FIG. 3A, interest objects may be manifested within an electronic social networking platform as so-called "pages" that provide information about the interests that the interest objects represent. These "pages" may be maintained by one or more representatives of the interests that the interest objects represent.

An electronic social networking platform that supports interest objects may enable an individual user identity to record various different interests within the electronic social networking platform by registering endorsements of the interest objects that represent the user identity's interests with the electronic social networking platform. The electronic social networking platform may represent the individual user identity's endorsement of different interest objects within the electronic social networking platform as connections between the user identity and the interest objects that the user identity has endorsed. Furthermore, the electronic social networking platform may provide various different mechanisms that enable the one or more representatives of a particular interest object to share electronic communications or otherwise interact with those user identities who have endorsed the particular interest object. For example, the electronic social networking platform may enable the one or more representatives of the particular interest object to publish status posts, including, for example, text, images, and/or videos, that are broadcast publicly to user identities who have endorsed the particular interest object.

Location objects may represent a variety of different types of locations, including, for example, geographic locations, such as cities, states, or countries, as well as commercial venues, businesses, or other places, such as restaurants, retail stores, parks, train or bus stations, airports, etc. An electronic social networking platform that supports location objects may enable an individual user identity to form various different types of connections to different location objects. For example, an electronic social networking platform may enable a user identity to record information about the user identity's hometown by establishing a "hometown" connection with a location object that represents the user identity's hometown. Similarly, an electronic social networking platform may enable a user identity to record information about the user identity's current place of residence by establishing a "current city" connection with a location object that represents the user identity's current place of residence. Additionally or alternatively, an electronic social networking platform may enable a user identity to register locations that the user identity has visited by establishing "check-in" connections with location objects that represent locations that the user identity has visited.

In some cases, an electronic social networking platform may provide mechanisms that enable a user identity to manually "check-in" at a location. For example, a social networking platform may provide mechanisms that enable a user identity to manually define and/or search for a location object that corresponds to a location that the user identity is visiting (or has visited or plans to visit) and create a connection to the location object that corresponds to the location in order to "check-in" at the location. Additionally or alternatively, an electronic social networking platform may provide mechanisms that enable a user identity to "check-in" at a location in a more intelligent or automated fashion. For instance, a social networking platform may provide mechanisms that enable a user identity to "check-in" at a location using a mobile computing device (e.g., a smartphone or tablet computer) using global positioning system (GPS), map, and/or other location-identifying data available to the mobile computing device.

Event objects may represent events hosted by user identities of an electronic social networking platform and/or events hosted by representatives of interest objects. Furthermore, event objects may include mechanisms that enable the hosts of the events represented by the event objects to invite user identities to the events. In some electronic social networking platforms, event objects may be manifested within the electronic social networking platforms as "event pages" that provide information about the events the event objects represent (e.g., date, time, and location information for the events), and the electronic social networking platforms may enable one or more designated representatives associated with the event (e.g., the hosts) to share information and exchange electronic communications with user identities who have been invited to the event via the "event page."

An electronic social networking platform that supports event objects may establish a connection between an event object and the user identity or interest object responsible for hosting the event represented by the event object. In addition, the electronic social networking platform also may establish a connection between an event object and user identities who have been invited to the event represented by the event object and/or user identities who register with the electronic social networking platform that they will be attending the event represented by the event object.

As described in greater detail below, electronic social networking platforms may enable independent applications to leverage the electronic social networking platforms, for example, to provide more compelling user experiences for the users of the independent applications by accessing and/or extracting data from the electronic social networking platforms, generally on behalf of user identities who have granted the independent applications authorization to access and/or extract data from the electronic social networking platforms on their behalf. Application objects in an electronic social networking platform, thus, may represent different applications that leverage the electronic social networking platform.

A wide variety of different types of applications may leverage electronic social networking platforms. Among other examples, gaming applications are one common example of applications that leverage electronic social networking platforms. Such gaming applications may allow user identities to engage in interactive or multiplayer games that involve other user identities of the electronic social networking platforms that they leverage. Other examples of types of applications that may leverage electronic social networking platforms include social electronic marketplace applications, social event management applications, content delivery and sharing applications, collaboration applications, and social recommendation applications.

An electronic social networking platform that supports application objects may establish connections between an individual application that leverages the electronic social networking platform and user identities who are users of the application represented by the application object and/or who are users who have granted the application represented by the application object authorization to access or extract data from the electronic social networking platform on their behalf. Furthermore, the electronic social networking platform may provide various different mechanisms that enable an application that leverages the social networking platform to share electronic communications or otherwise interact with those user identities for whom connections have been established with the application object that represents the application within the electronic social networking platform. For example, the electronic social networking platform may enable an application that leverages the electronic social networking platform (and/or users of the application that leverages the electronic social networking platform) to transmit communications within the electronic social networking platform to user identities for whom connections have been established with the application object that represents the application within the electronic social networking platform.

Figure 1B:
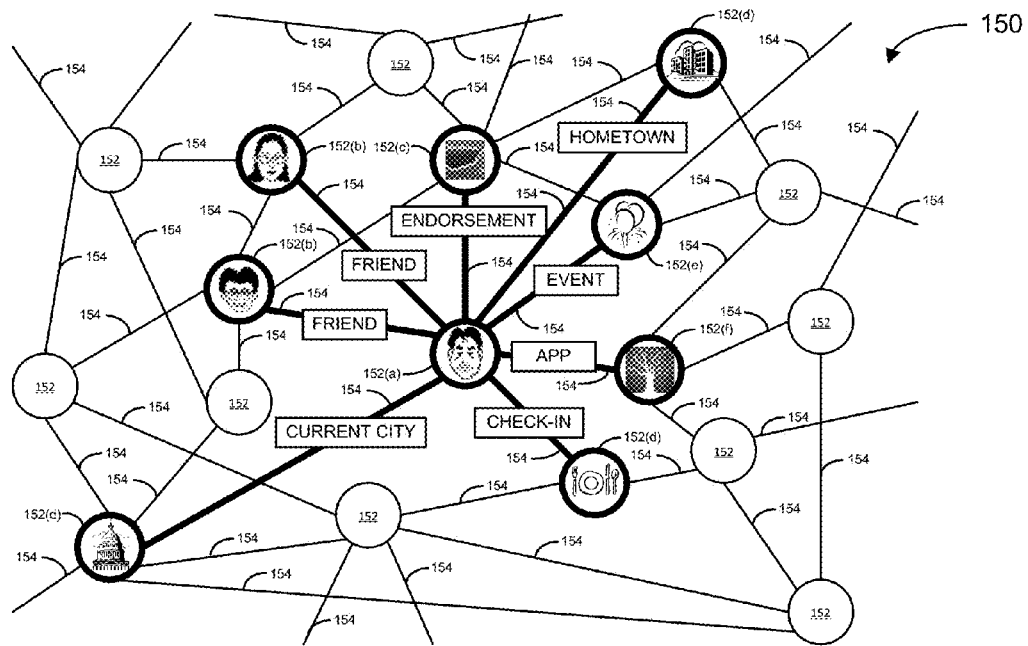

FIG. 1B is a schematic diagram of an example of an electronic social networking platform that enables user identities to form connections with multiple different types of objects including, for example, other user identity objects, interest objects, location objects, event objects, and application objects. As illustrated in FIG. 1B, the electronic social networking platform is represented as a graph 150 of nodes 152 connected by edges 154. Each node 152 in the graph 150 represents a particular type of object in the electronic social networking platform. For example, nodes 152(*a*) and 152(*b*) represent user identity objects, while node 152(*c*) represents an interest object, nodes 152(*d*) represent location objects, node 152(*e*) represents an event object, and node 154(*f*) represents an application object.

As illustrated in FIG. 1B, an edge 154 that connects two nodes 152 represents a connection between the two objects that are represented by the connected nodes 152. For example, the edges 154 that connect node 152(*a*) to nodes 152(*b*) represent connections between the user identity represented by node 152(*a*) and the user identities represented by nodes 152(*b*). (For ease of reference, such a connection between two user identity objects in an electronic social networking platform may be referred to herein as a "friend" connection.)

Similarly, the edge 154 that connects node 152(*a*) to node 152(*c*) represents a connection between the user identity represented by node 152(*a*) and the interest object represented by node 152(*c*). (As discussed above, a user of an electronic social networking platform may form a connection to such an interest object by endorsing the interest object. Therefore, for ease of reference, connections between a user identity object and an interest object in an electronic social networking platform may be referred to herein as an "endorsement" connection.)

Furthermore, the edges 154 that connect node 152(*a*) to nodes 152(*d*) represent connections between the user identity represented by node 152(*a*) and the location objects represented by nodes 152(*d*). Depending on the electronic social networking platform, a user identity may be able to establish various different types of connections to location objects. For example, in order to store a record of the user identity's hometown, the user identity may establish what may be referred to herein as a "hometown" connection to a location object that represents the user identity's hometown. Additionally or alternatively, in order to store a record of the user identity's current residence, the user identity may establish what may be referred to herein as a "current city" or "current residence" connection to a location object that represents the user identity's current residence. Furthermore, in order to store a record of a location the user identity visited, the user identity may establish what may be referred to herein as a "check-in" connection to a location object that represents a location that the user identity visited.

The edge 154 that connects node 152(*a*) to node 152(*e*) represents a connection between the user identity represented by node 152(*a*) and the event represented by event object 152(*e*). (For ease of reference, such a connection between a user identity object and an event object may be referred to herein as an "event" connection.) There may be various different types of event connections between user identities and event objects in an electronic social networking platform. For example, one type of an event connection between a user identity and an event object in an electronic social networking platform may signify that the user identity is the host of the event. Another type of an event connection between a user identity and an event object in an electronic social networking platform may signify that the user identity has been invited to the event. Still another type of event connection between a user identity and an event object in an electronic social networking platform may signify that the user identity has registered with the electronic social networking platform that the user identity will be attending the event. Yet another type of event connection between a user identity and an event object in an electronic social networking platform may signify that the user identity has registered with the electronic social networking platform that the user identity will not be attending the event. Still one more type of event connection between a user identity and an event object in an electronic social networking platform may signify that the user identity has registered with the electronic social networking platform that the user identity tentatively will be attending the event.

Finally, the edge 154 that connects node 152(*a*) to node 152(*f*) represents a connection between the user identity represented by node 152(*a*) and the application represented by application object 152(*f*). (For ease of reference, such a connection between a user identity object and an application objected may be referred to here as an "application" connection.)

Electronic social networking platforms may provide various different types of user interfaces for interacting with the electronic social networking platforms. For example, for each user of an electronic social networking platform, the electronic social networking platform may provide a first GUI that generally presents a feed of content shared by or otherwise related to other user identities who are members of the user identity's social network as well as content shared by or otherwise related to other objects (e.g., interest, location, event, and/or application objects) to which the user identity is connected within the electronic social networking platform. In some electronic social networking platforms, this feed may be referred to as the user identity's "news feed." In addition, the electronic social networking platform also may provide a second GUI for each user identity of the electronic social networking platform that presents a feed that generally records the activity of the user identity within the electronic social networking platform as well as content shared with the user identity directly by other user identities who are members of the user identity's social network and/or by other objects to which the user identity is connected within the electronic social networking platform (e.g., interest, location, event, and/or application objects). In some electronic social networking platforms, this feed may be referred to as the user identity's "wall" or "timeline."

An electronic social networking platform may include a variety of different content in a user identity's "news feed." For example, among other types of content, a particular user identity's "news feed" may include: (i) electronic messages, such as, for example, "status posts," and other content, such as, for example, images, videos, and/or links, that have been published generally by other user identities who are members of the particular user identity's social network; (ii) electronic messages and other content, such as, for example, images, videos, and/or links, that have been published publicly by other types of objects (e.g., interest, location, event, and application objects) to which the particular user identity is connected within the electronic social networking platform; (iii) electronic messages, such as, for example, "walls posts" or "timeline posts," and other content, such as, for example, images, videos, and/or links, that have been shared directly with recipient user identities who are members of the particular user identity's social network and who have configured their privacy settings to share such directed electronic messages and other content with the particular user identity; and/or (iv) information about activities engaged in within the context of the electronic social networking platform by other user identities who are members of the user identity's social network, such as, for example, "check-ins," events hosted and/or attended, and application usage (e.g., participation in a gaming application).

Similarly, an electronic social networking platform may include a variety of different content in a user identity's "wall" or "timeline." For example, among other types of content, a particular user identity's "wall" or "timeline" may include: (i) electronic messages, such as, for example, "status posts," and other content, such as, for example, images, videos, and/or links, that the particular user identity published generally to other user identities who are members of the particular user identity's social network; (ii) electronic messages, such as, for example, "wall posts" or "timeline posts," and other content, such as, for example, images, videos, and/or links, that the particular user identity shared directly with specific members of the particular user identity's social network; (iii) electronic messages, such as, for example, "wall posts" or "timeline posts," and other content, such as, for example, images, videos, and/or links, that user identities who are members of the particular user identity's social network shared directly with the particular user identity; (iv) electronic messages, such as, for example, "wall posts" or "timeline posts," and other content, such as, for example, images, videos, and/or links, that applications to which the particular user identity is connected within the electronic social networking platform shared directly with the particular user identity; and/or (v) information about activities engaged in within the context of the electronic social networking platform by the user identity such as, for example, "check-ins," events hosted and/or attended, and application usage (e.g., participation in a gaming application).

Figure 2A:
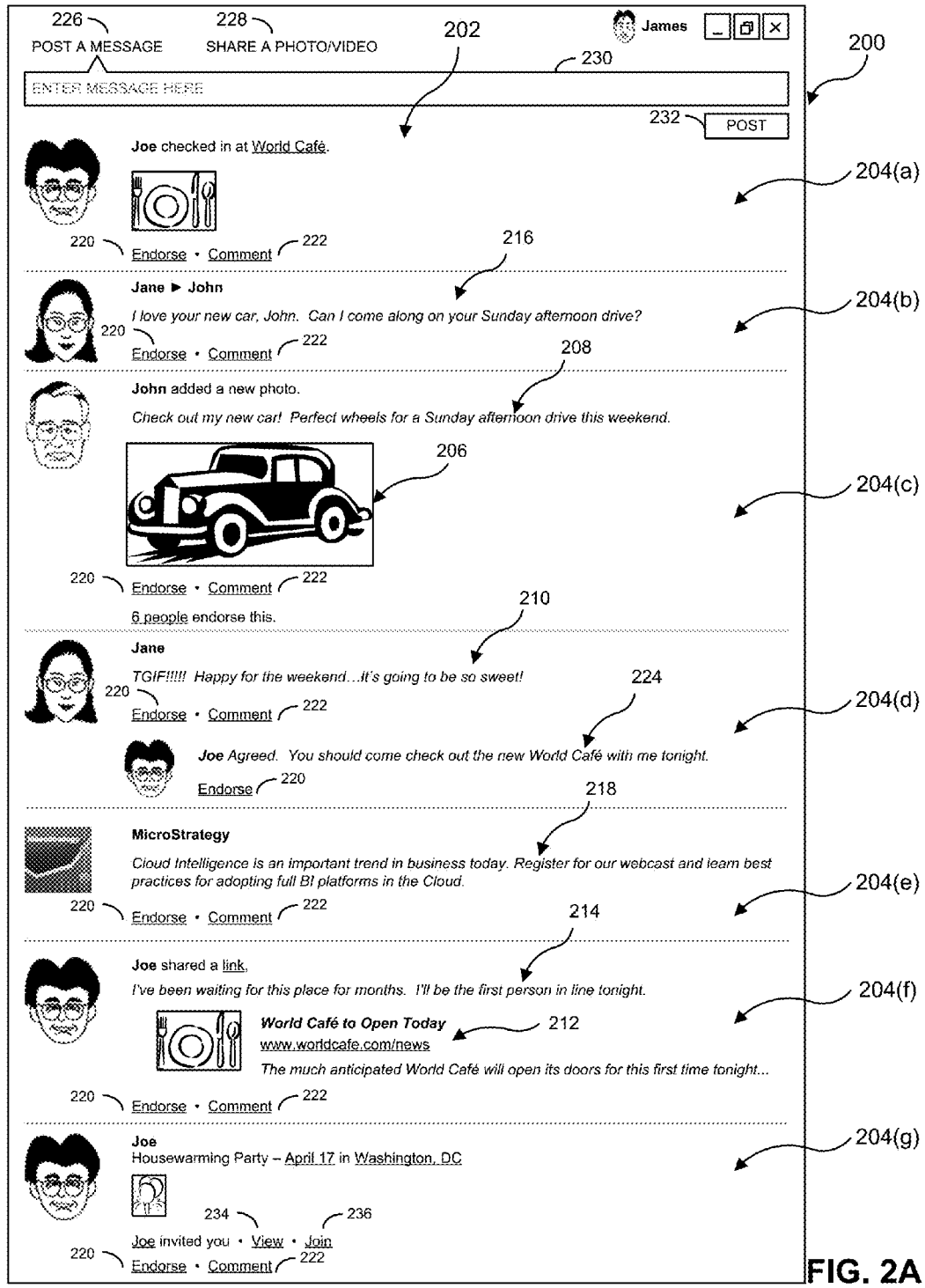
Figure 2B:
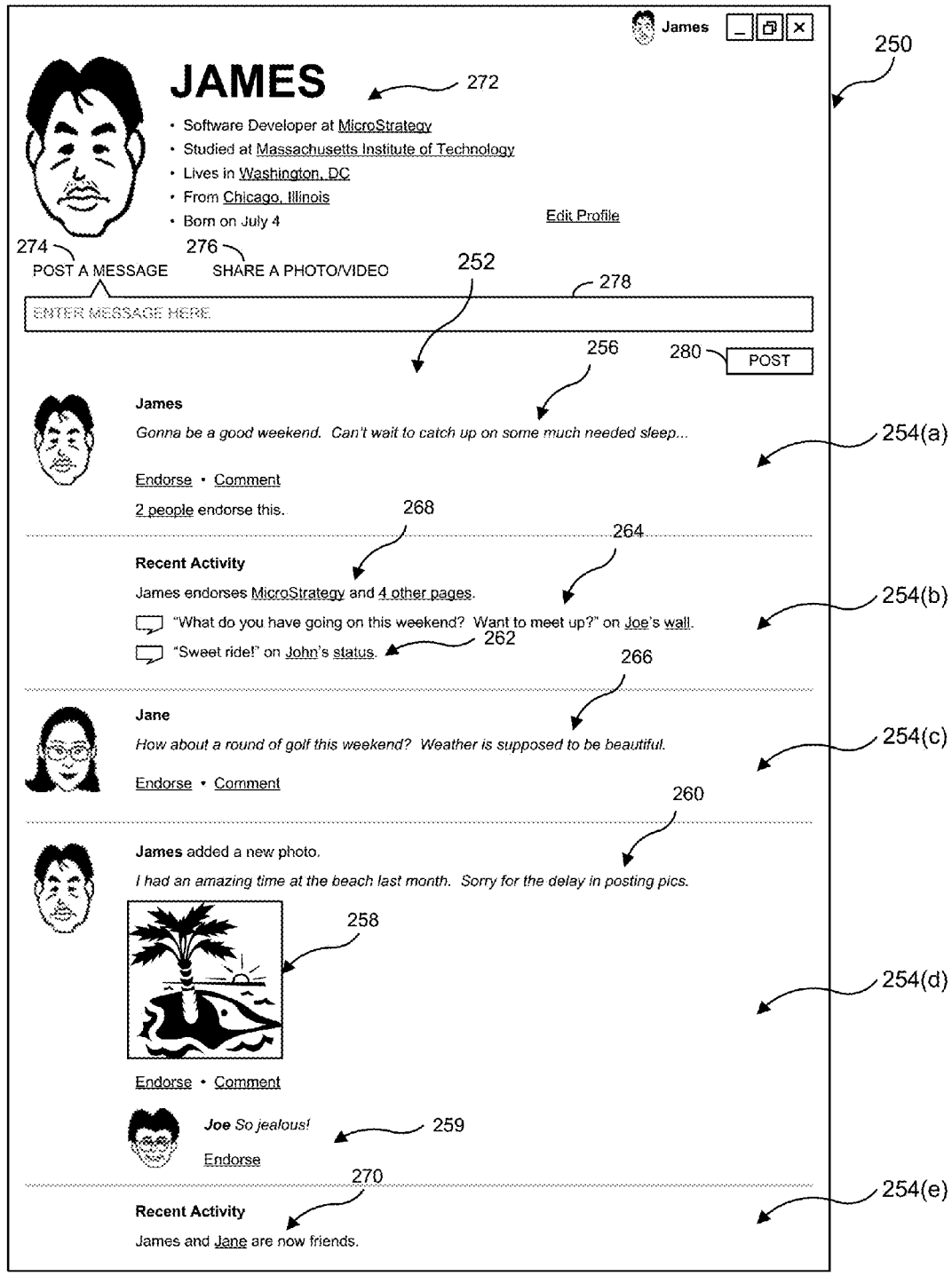

FIGS. 2A and 2B are diagrams of examples of two different GUIs 200 and 250 provided by an example of an electronic social networking platform to a user identity identified as James. The GUI 200 of FIG. 2A illustrates an example of a GUI that presents a "news feed" 202 for the user identity identified as James, while the GUI 250 of FIG. 2B illustrates an example of a GUI that presents a "wall" or "timeline" 252 for the user identity identified as James.

Referring first to FIG. 2A, GUI 200 includes a "news feed" 202 that includes different feed items 204. The items 204 included within "news feed" 202 include content and/or electronic messages that have been shared with James by other user identities who are members of James' social network as well as by other types of objects (e.g., interest, location, event, and application objects) to which James is connected within the electronic social networking platform.

For example, item 204(c) includes an image 206 and a corresponding message 208 shared with James by a member of James' social network identified as John. Similarly, item 204(d) includes a message 210 (e.g., a "status post") shared with James by a member of James' social network identified as Jane, and item 204(f) includes a hyperlink 212 to a web page and a corresponding message 214 shared with James by a member of James' social network identified as Joe. Although not illustrated in FIG. 2A, in addition to enabling user identities to share images and hyperlinks with members of their social networks (e.g., as illustrated by items 204(c) and 204(f), respectively), the electronic social networking platform also may enable user identities to share other types of content with members of their social networks including, for example, videos. Items 204(c), 204(d), and 204(f) may represent content and/or messages that the particular user identities who shared these items (i.e., John, Jane, and Joe, respectively) published generally to user identities who are members of their own social networks.

In addition to enabling user identities to publish electronic messages and other content generally to other user identities who are members of their social networks, the electronic social networking platform also may enable user identities to send directed messages and other content to individual user identities who are members of their social networks. Such directed messages and other content may be presented within the "walls" or "timelines" of the user identities to whom they are targeted. Therefore, these directed messages and other content may be referred to as "wall posts" or "timeline posts." The electronic social networking platform may provide user identities with controls for configuring whether such directed messages and other content posted to their "walls" or "timelines" also are shared with members of their own social networks. In the event that a targeted user identity selects configuration settings that provide for directed messages and other content posted to the targeted user's "wall" or "timeline" to be shared with other members of the targeted user identity's social network, such "wall posts" or "timeline posts" may be presented to the other members of the targeted user identity's social network in their "news feeds."

Item 204(b) in the "news feed" 202 of the GUI 200 is an example of a "wall post" or "timeline post" 216 that was directed to a targeted user identity who is a member of James' social network and who selected configuration settings that provide for the "wall post" or "timeline post" to be shared with other members of the targeted user identity's own social network. More particularly, message 216 was posted to the "wall" or "timeline" of a member of James' social network identified as John by another user identity identified as Jane. Because the user identity identified as John is a member of James' social network, and, because the user identity identified as John selected configuration settings that provide for "wall posts" or "timeline posts" to be shared with other members of his social network, the "wall post" or "timeline post" 216 from the user identity identified as Jane is presented in James' "news feed" 202. The user identity identified as Jane may or may not be a member of James' own social network.

"News feed" 202 also includes information about activities engaged in within the context of the electronic social networking platform by other user identities who are members of James' social network. For example, item 204(a) indicates that a user identity identified as Joe checked-in at a location identified as World Café. The location World Café may be represented as a location object within the electronic social networking platform and may correspond to, for example, a local restaurant.

The items 204 included within "news feed" 202 also include content and/or electronic messages that have been shared with James by other types of objects (e.g., interest, location, event, and application objects) to which James is connected within the electronic social networking platform. For example, item 204(e) includes a message 218 shared with James by an interest object manifested as a "page" within the electronic social networking platform that represents MicroStrategy Incorporated, a software and technology company.

Invitations to events that a user identity receives within the electronic social networking platform also may be presented in the user identity's "news feed." For example, item 204(g) in "news feed" 202 represents an invitation to an event named "Housewarming Party" being held on April 17 in Washington, DC that was sent to James by a user identity who is a member of James' social network identified as Joe. As illustrated in FIG. 2A, item 204(g) includes a selectable "View" control 234 that, when invoked, may provide James with more information about the "Housewarming Party" event. In addition, item 204(g) also includes a selectable "Join" control 236 that enables James to register with the electronic social networking platform that he will be attending the "Housewarming Party" event. As discussed above, the "Housewarming Party" event may be represented as an event object within the electronic social networking platform.

The items 204 presented in "news feed" 202 provide mechanisms that enable James to react to the content included within the items 204 presented in "news feed" 202. For example, as illustrated in FIG. 2A, each of the items 204 presented in "news feed" 202 includes a selectable "Endorse" control 220 and a selectable "Comment" control 222.

A selectable "Endorse" control 220 in an item 204 enables James to register an endorsement of the content (e.g., message, image, video, link, activity, etc.) included in the item 204. The electronic social networking platform records such endorsements and may present the number of endorsements registered in connection with the content presented in an item 204 in connection with the presentation of the item 204 itself. For example, item 204(c) includes an indication that six different user identities have registered endorsements of the picture and message included in item 204(c).

A selectable "Comment" control 222 in an item 204 enables the particular user identity to enter a responsive comment to the content included in the item 204. The electronic social networking platform records such responsive comments and associates them with the content included in the item 204 so that the electronic social networking platform may present any such responsive comments in connection with the presentation of the item 204 itself. For example, item 204(d) includes a message 224 by a user identity identified as Joe that was entered in response to the message 210 originally posted by the user identity identified as Jane.

In addition to "news feed" 202, GUI 200 also includes a selectable "Post A Message" control 226, a selectable "Share A Photo/Video" control 228, and an associated text entry field 230 and selectable "Post" control 232. Selectable "Post A Message" control 226 enables James to compose and publish a "status post" by entering text in associated text entry field 230 and invoking selectable "Post" control 232. Similarly, selectable "Share A Photo/Video" control 228 enables James to share a picture or a video and to compose and publish a corresponding status post by entering text in associated text entry field 230 and invoking selectable "Post" control 232.

Referring now to FIG. 2B, GUI 250 includes a "wall" or "timeline" feed 252 that includes different feed items 254. The items 254 included within the "wall" or "timeline" feed 252 include content and/or electronic messages that the user identity identified as James shared with other members of his social network. Such content and/or electronic messages may include status posts that James published generally to members of his social network, responsive comments that James entered in response to content and/or messages shared by other user identities who are members of James' social network, and "wall" or "timeline" posts that James posted to the "walls" or "timelines" of specific user identities who are members of his social network.

For example, item 254(a) includes a "status post" 256 that James published generally to user identities who are members of his social network. Similarly, item 254(d) includes an image 258 and a corresponding message 260 that James published generally to user identities who are members of his social network. In the event that user identities who are members James' social network enter responsive comments to and/or endorse "status posts" that James published generally to user identities who are members of his social network, any such responsive comments or endorsements also may be presented within "wall" or "timeline" feed 254. For example, item 254(a) includes an indication that two user identities have endorsed message 256. Similarly, item 254(d) includes a message 259 that was entered by a user identity who is a member of James' social network identified as Joe in response to the picture 258 and corresponding message 260 originally posted by James.

Meanwhile, item 254(b) includes a responsive comment 262 that James posted in response to content and/or a message shared by a user identity who is a member of James' social network identified as John. Item 254(b) also includes a "wall post" or "timeline post" 264 that James posted on the "wall" or "timeline" of a specifically-targeted user identity who is a member of James' social network identified as Joe.

The items 254 included in "wall feed" or "timeline feed" 252 also include content and/or messages that were posted directly on James' "wall" or "timeline" by user identities who are members of James' social network. For example, item 254(c) includes a message 266 that was posted directly on James' "wall" or "timeline" by a user identity who is a member James' social network identified as Jane.

In addition, the items 254 in "wall" or "timeline" feed 252 also include information about activities that James has engaged in within the context of the electronic social networking platform. For example, item 254(b) includes an indication 268 that James has endorsed the MicroStrategy Incorporated interest object as well as four additional interest objects, all of which, as described in greater detail below in connection with FIG. 3A, may be manifested within the electronic social networking platform in the form of individual "pages." Meanwhile, item 254(e) includes an indication 270 that James has established a connection within the electronic social networking platform to the user identity identified as Jane.

Although not illustrated in FIG. 2B, a user identity's "wall" or "timeline" feed also may include content and/or messages that were shared with the user identity as a consequence of the user identity's interaction with an application that leverages the electronic social networking platform. For example, in some cases, an application that leverages the electronic social networking application may post messages to the user identity's "wall" or "timeline." Additionally or alternatively, another user identity may originate a message to the user identity within an application that leverages the electronic social networking platform, and the application then may cause the message from the other user identity that originated within the application to be posted to the user identity's "wall" or "timeline."

In addition to "wall" or "timeline" feed 252, GUI 250 also includes a profile section 272 that presents a snapshot of profile information for the user identity identified as James. As illustrated in FIG. 2B, profile section 272 includes information about James' employment history (software developer at MicroStrategy), education history (Massachusetts Institute of Technology), current residence (Washington, DC), hometown (Chicago), and birthday (July 4).

As with GUI 200, GUI 250 also includes a selectable "Post A Message" control 274, a selectable "Share A Photo/Video" control 276, and an associated text entry field 278 and selectable "Post" control 280. Selectable "Post A Message" control 274 enables James to compose and publish a "status post" by entering text in associated text entry field 278 and invoking selectable "Post" control 280. Similarly, selectable "Share A Photo/Video" control 276 enables James to share a picture or a video and to compose and publish a corresponding "status post" by entering text in associated text entry field 278 and invoking selectable "Post" control 280.

Figure 3A:
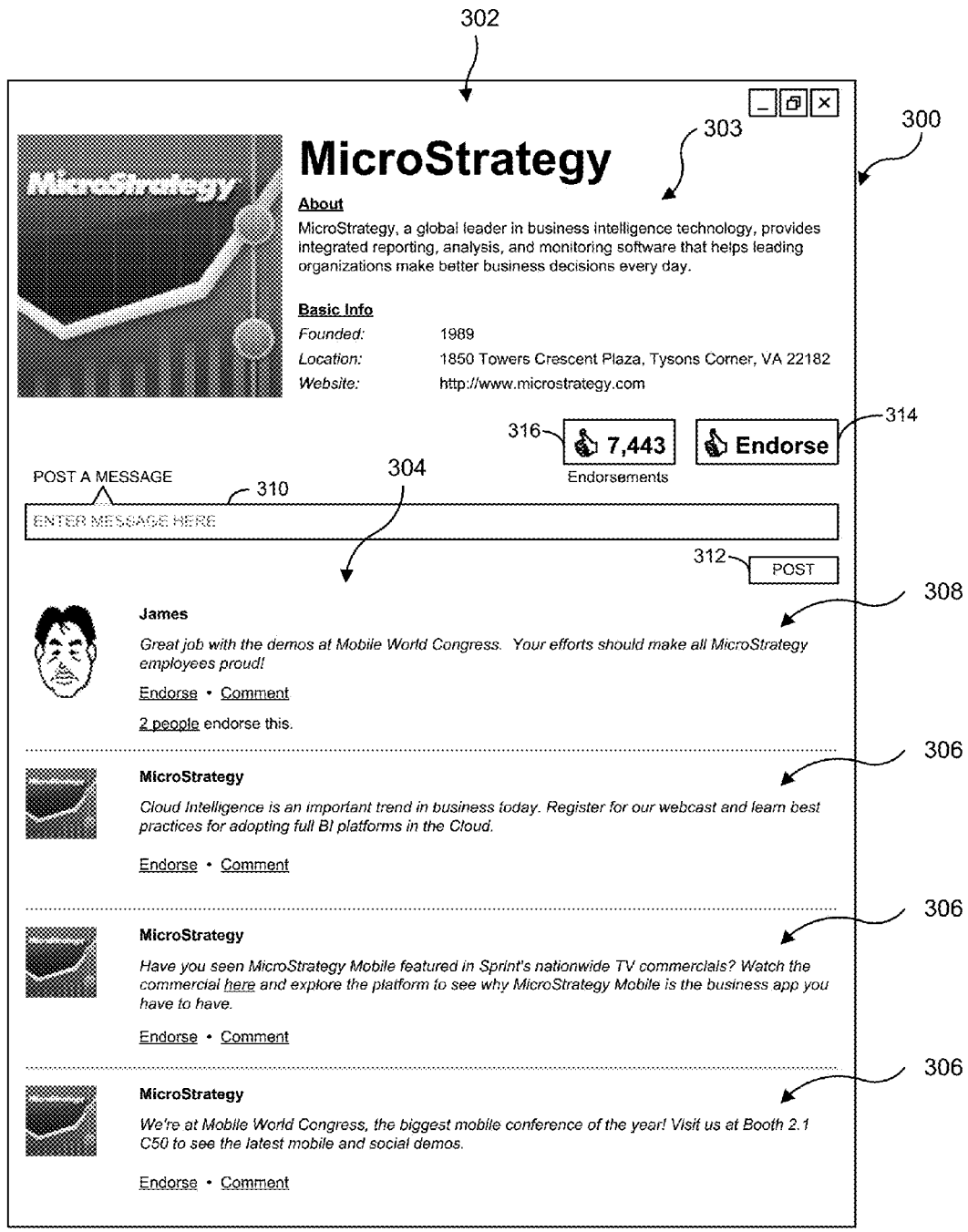

As discussed above, in some electronic social networking platforms, interests may be represented as interest objects that are manifested within the electronic social networking platform as "pages." FIG. 3A is a diagram of an example of a GUI 300 for an example of an electronic social networking platform within which interests are represented as interest objects that are manifested within the electronic social networking platform as "pages." More particularly, GUI 300 displays the MicroStrategy "page" 302 corresponding to the MicroStrategy interest object that represents the software and technology company, MicroStrategy, within the electronic social networking platform.

As illustrated in FIG. 3A, the MicroStrategy "page" 302 includes a description section 303 that provides background information about MicroStrategy. The MicroStrategy "page" 302 also includes a feed 304 that includes, among other content, messages 306 generated by the MicroStrategy "page" 302 and published to user identities of the electronic social networking platform who have endorsed the MicroStrategy "page" 302 or otherwise established a connection to the MicroStrategy "page" 302 within the electronic social networking platform. In addition, as further illustrated in FIG. 3A, the feed 304 also includes messages 308 posted directly to the MicroStrategy "page" 302 by user identities of the electronic social networking platform. The electronic social networking platform may provide a variety of different mechanisms that enable user identities of the electronic social networking platform to post messages directly to a "page," such as, for example, the MicroStrategy "page" 302. In one example, the electronic social networking platform may enable a user identity to post a message directly to the MicroStrategy "page" 302 by entering text in text entry field 310 and invoking selectable "Post" control 312. Although not illustrated as such in FIG. 3A, feed 304 also may include various additional or alternative types of content.

The MicroStrategy "page" 302 also includes a selectable "Endorse" control 314 that enables user identities who view the MicroStrategy "page" 302 and who have not already endorsed MicroStrategy to record an endorsement of MicroStrategy as one of their interests. In response to invocation of selectable "Endorse" control 314 by a particular user identity, the electronic social networking platform records that the particular user identity has endorsed MicroStrategy as an interest, for example, by establishing a connection between the user identity and the interest object that represents MicroStrategy within the electronic social networking platform. As illustrated in FIG. 3A, the MicroStrategy "page" 302 also includes an indication 316 reporting that 7,443 user identities already have endorsed MicroStrategy within the electronic social networking platform.

In some electronic social networking platforms, interests endorsed by a particular user identity may be shared with or otherwise made available to other user identities of the electronic social networking platform. In particular, in some electronic social networking platforms, interests endorsed by a particular user identity may be shared with other user identities who are members of the particular user identity's social network. For example, an electronic social networking platform may provide user identities who are members of a particular user identity's social network with access to a detailed user identity profile page that includes, among other information, indications of interests that the particular user identity has endorsed within the electronic social networking platform.

FIG. 3B is a diagram of an example of a GUI 350 for an example of an electronic social networking platform that displays a profile page 352 for a user identity of the electronic social networking platform identified as James. As illustrated in FIG. 3B, the profile page 352 for the user identity identified as James includes a basic information section 354 that records certain biographic information about James including James' gender (male), birthday (Jul. 4, 1976), current city (Washington, DC), hometown (Chicago, Ill.), relationship status (single), sexual orientation (interested in women), and primary language (English). The profile page 352 for the user identity identified as James also includes a work and education section 356 that records certain information about James' employment and education history including James' employer and role (MicroStrategy (Software Developer)), college/university and degree (Massachusetts Institute of Technology (Electrical Engineering)), and high school (Lincoln Park High School). In addition, the profile page 352 for the user identity identified as James also includes a contact information section 358 that records certain contact information for James including James' mailing address (Washington, DC), e-mail address (user2@email.com), and phone number (+1 555 555 1212). Finally, the profile page 352 for the user identity identified as James includes an interests section 360 that lists various different interests that James has endorsed or otherwise recorded within the electronic social networking platform. As illustrated in FIG. 3B, one of the interests that James has endorsed within the electronic social networking platform is MicroStrategy. As described above, James may have recorded his endorsement of MicroStrategy by invoking the "Endorse" control 314 included in the MicroStrategy "page" 302 illustrated in FIG. 3A.

As described above, an electronic social networking platform may enable independent applications to leverage the electronic social networking platform, for example, to provide more compelling user experiences for the users of the independent applications by accessing and/or extracting data from the electronic social networking platforms.

Figure 4A:
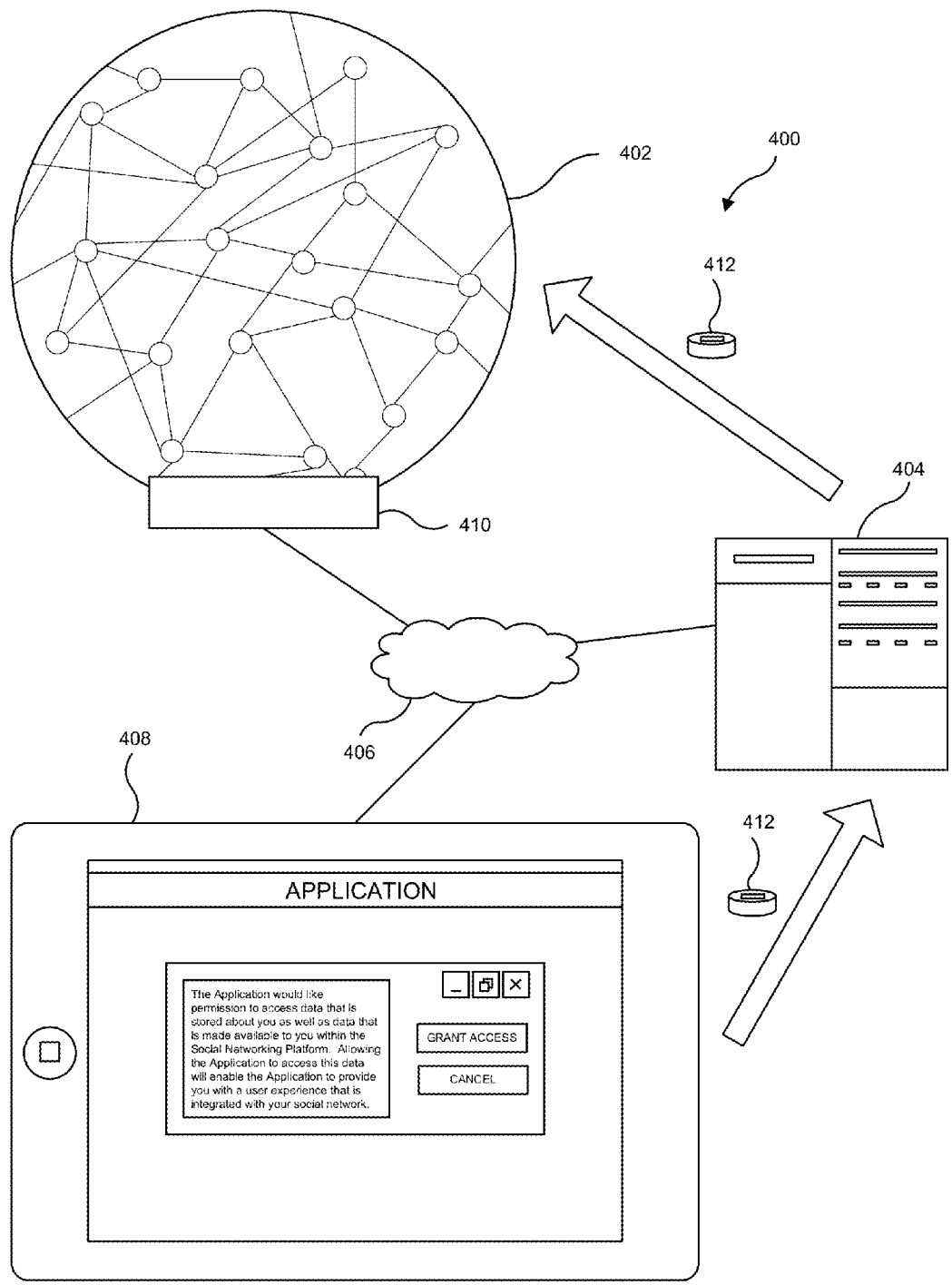
FIGS. 4A-4B are block diagrams of an example of a network computing environment.
Figure 4B:
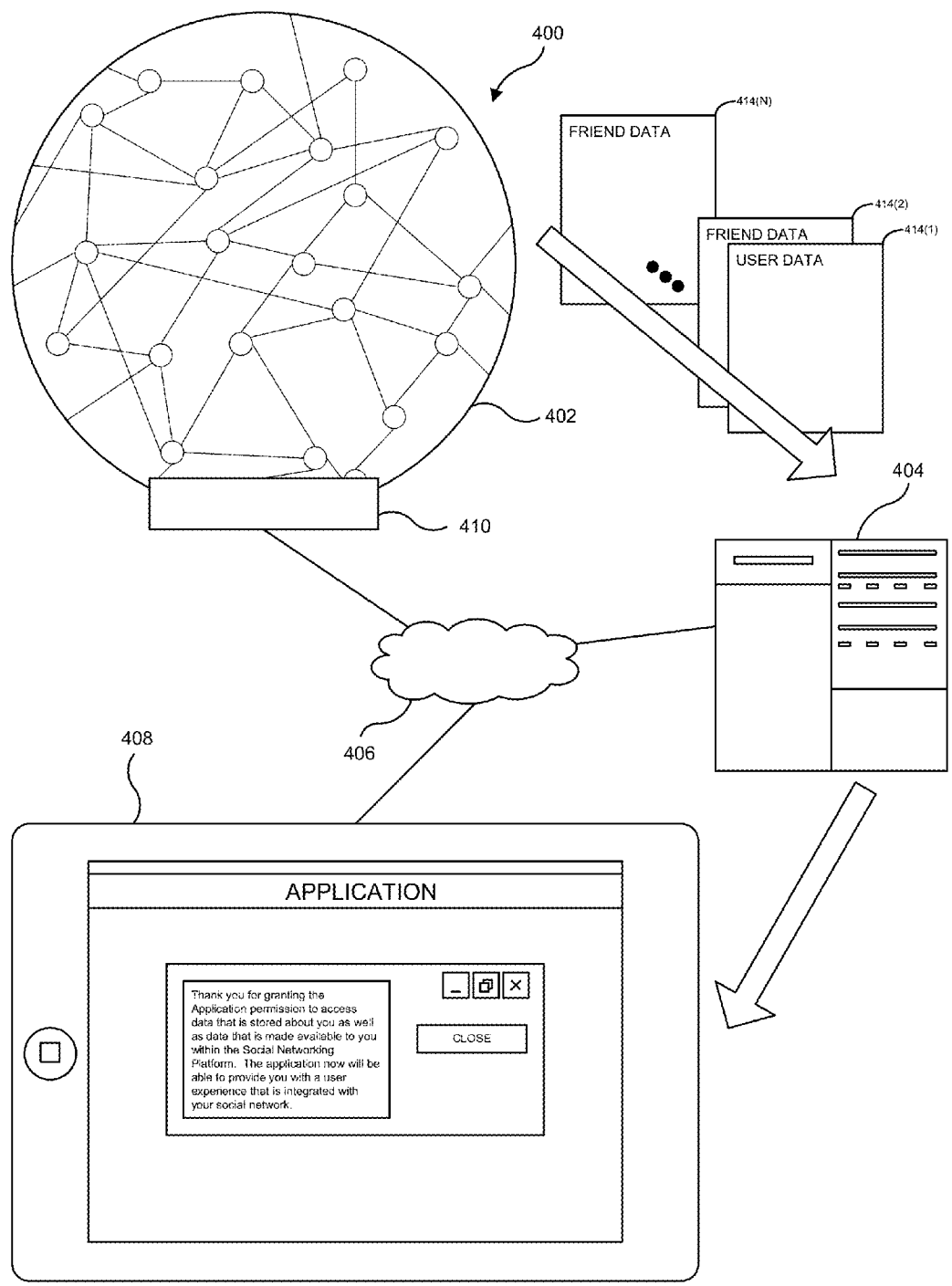

FIGS. 4A-4B are block diagrams of an example of a network computing environment 400 that includes, among other elements, an electronic social networking platform 402 and a computing system 404 that is external to the electronic social networking platform 402 that hosts an application that leverages the electronic social networking platform 402. Electronic social networking platform 402 is accessible to computing system 404 over a network 406. As illustrated in FIGS. 4A-4B, network computing environment 400 also includes a computing device 408. Both electronic social networking platform 402 and computing system 404 may be accessible to computing device 408 over network 406. For illustrative purposes, several elements illustrated in FIGS. 4A-4B and described below are represented as monolithic entities. However, these elements each may include and/or be implemented on numerous interconnected computing devices and other components that are designed to perform a set of specified operations.

Electronic social networking platform 402 may be implemented using one or more computing devices (e.g., servers) configured to provide a service to one or more client devices (e.g., computing device 408) connected to electronic social networking platform 402 over network 406. The one or more computing devices on which electronic social networking platform 402 is implemented may have internal or external storage components storing data and programs such as an operating system and one or more application programs. The one or more application programs may be implemented as instructions that are stored in the storage components and that, when executed, cause the one or more computing devices to provide the features of an electronic social networking platform 402. Furthermore, the one or more computing devices on which electronic social networking platform 402 is implemented each may include one or more processors for executing instructions stored in storage and/or received from one or more other electronic devices, for example over network 406. In addition, these computing devices also typically may include network interfaces and communication devices for sending and receiving data. Electronic social networking platform 402 also may provide an application programming interface (API) 410 that enables other applications to interact with and extract data from the electronic social networking platform 402.

Computing system 404 also may be implemented using one or more computing devices (e.g., servers). The one or more computing devices on which computing system 404 is implemented may have internal or external storage components storing data and programs such as an operating system and one or more application programs. The one or more application programs may be implemented as instructions that are stored in the storage components and that, when executed, cause the one or more computing devices to provide the functionality ascribed herein to the computing system 404. Furthermore, the one or more computing devices on which computing system 404 is implemented each may include one or more processors for executing instructions stored in storage and/or received from one or more other electronic devices, for example, over network 406. In addition, these computing devices also typically may include network interfaces and communication devices for sending and receiving data.

As described in greater detail below, computing system 404 hosts an independent application that leverages electronic social networking platform 402 to provide a service to one or more client devices (e.g., computing device 408). As such, computing system 404 is configured to extract and store data from electronic social networking platform 402. For example, computing system 404 may be configured to exploit API 410 to extract data from electronic social networking platform 402.

Network 406 may provide direct or indirect communication links between electronic social networking platform 402, computing system 404, and computing device 408. Examples of network 406 include the Internet, the World Wide Web, wide area networks (WANs), local area networks (LANs) including wireless LANs (WLANs), analog or digital wired and wireless telephone networks, radio, television, cable, satellite, and/or any other delivery mechanisms for carrying data.

Computing device 408 may be any of a number of different types of computing devices including, for example, a tablet computer as illustrated in FIGS. 4A-4B, or a mobile phone, a smartphone, a personal digital assistant, a laptop or netbook computer, or a desktop computer. Furthermore, computing device 408 typically may have internal or external storage components for storing data and programs such as an operating system and one or more application programs. In particular, the internal or external storage components for computing device 408 may store a client application for interfacing with electronic social networking platform 402 and/or a client application for interfacing with computing system 404. Additionally or alternatively, computing device 408 may be configured to interface with electronic social networking platform 402 or computing system 404 without a specific client application, using, for example, a web browser. As such, one or more user identities of electronic social networking platform 402 may be able to use computing device 408 to access electronic social networking platform 402. Similarly, one or more users of the independent application that leverages electronic social networking platform 402 hosted by computing system 404 may be able to use computing device 408 to access the independent application.

Computing device 408 also typically may include a central processing unit (CPU) for executing instructions stored in storage and/or received from one or more other electronic devices, for example over network 406. Computing device 408 also usually may include one or more communication devices for sending and receiving data. One example of such communications devices is a modem. Other examples include antennas, transceivers, communications cards, and other network adapters capable of transmitting and receiving data over a network (e.g., network 406) through a wired or wireless data pathway.

As illustrated in FIGS. 4A-4B, the electronic social networking platform 402 may be represented in the form of a graph, where user identities are represented by nodes and connections between user identities are represented by edges connecting the nodes. The electronic social networking platform 402 may enable individual user identities to construct social networks within the electronic social networking platform 402 by establishing connections with other user identities. Electronic social networking platform 402 enables user identities who are members of a social network within electronic social networking platform 402 to share various different types of data and other content (e.g., including electronic messages) with each other within the context of the electronic social networking platform 402.

Furthermore, in addition to the service(s) that electronic social networking platform 402 itself provides to user identities, electronic social networking platform 402 also provides mechanisms (e.g., API 410) that enable independent applications to leverage electronic social networking platform 402 to provide services to user identities of the electronic social networking platform 402. For example, among other features, electronic social networking platform 402 enables user identities of electronic social networking platform 402 to grant access tokens (or some other form of access mechanism or access right (e.g., a password or PIN)) to such independent applications that authorize the independent applications to which the tokens are granted to extract data from electronic social networking platform 402 on behalf of the user identities.

In some implementations, the token (or other form of access mechanism or access right (e.g., a password or PIN)) that a particular user identity grants to an independent application may enable the independent application to access and/or extract the particular user identity's user profile data as well as the user profile data for any other user identities of the electronic social networking platform 402 who are members of the particular user identity's social network within the electronic social networking platform 402. Additionally or alternatively, the token (or other form of access mechanism or access right (e.g., a password or PIN)) that the particular user identity grants to the independent application may enable the independent application to access and/or extract data shared or received by the particular user identity within the electronic social networking platform 402 as well as data shared or received by any other user identities who are members of the particular user identity's social network within the electronic social networking platform 402.

As discussed above, computing system 404 hosts an independent application that leverages electronic social networking platform 402. The electronic social networking platform 402 is accessible to the application hosted by computing system 404 over network 406 and, for example, via API 410. In addition, the application hosted by computing system 404 is accessible to client devices (e.g., computing device 408) also over network 406.

As illustrated in FIG. 4A, in order for the application hosted by computing system 404 to extract data about or otherwise related to a particular user identity and/or other user identities who are members of the particular user identity's social network from electronic social networking platform 402, the particular user identity first may grant the application hosted by computing system 404 a token 412 (or some other form of access mechanism or right (e.g., a password or PIN)) that authorizes the application to extract such data from the electronic social networking platform 402 on behalf of the particular user identity. Upon acquiring a token 412 (or other form of access mechanism or right (e.g., a password or PIN)) for the particular user identity, the application thereafter may transmit the token 412 (or other form of access mechanism or right (e.g., a password or PIN)) to electronic social networking platform 402 along with requests to extract data from the electronic social networking platform 402 on behalf of the particular user identity. (Although FIG. 4A schematically illustrates token 412 (or other form of access mechanism or right (e.g., a password or PIN)) as being transmitted to the application hosted by computing system 404 from the computing device of the particular user identity (e.g., computing device 408), it will be understood that token 412 (or other form of access mechanism or right (e.g., a password or PIN)) actually may be transmitted to the application by the electronic social networking platform 402 (e.g., after being authorized to do so by the particular user identity).)

Referring now to FIG. 4B, when electronic social networking platform 402 receives a request from the application hosted by computing system 404 on behalf of the particular user identity to extract data about or otherwise related to the particular user identity and/or other user identities who are members of the particular user identity's social network from electronic social networking platform 402 that is accompanied by the appropriate token 412 authorizing the application to extract data from the electronic social networking platform 402 on behalf of the particular user identity, the electronic social networking platform 402 locates and returns the requested data 414 about or otherwise related to the particular user identity and/or other user identities who are members of the particular user identity's social network to the application hosted by computing system 404.

In some implementations, the application hosted by computing system 404 may extract the following data 414(1) about or otherwise related to the particular user identity from the electronic social networking platform 402: name; gender; birthday (and/or age); current city; hometown; relationship status; sexual orientation; primary language; employment history; education history; contact information (e.g., mailing address(es), e-mail address(es), phone number(s), etc.); interests recorded with the electronic social networking platform 402 (e.g., by endorsing interest objects manifested as "pages" within the electronic social networking platform 402); "check-ins" registered with the electronic social networking platform 402; event information for events to which the particular user identity has been invited within the context of the electronic social networking platform 402; "status posts" published by the particular user identity to other user identities who are members of the particular user identity's social network and any related responsive comments and/or endorsements; and "wall posts" or "timeline posts" received by the particular user identity.

Additionally or alternatively, the application hosted by computing system 404 also may extract the following data 414(2)-414(N) about or otherwise related to each other user identity who is a member of the particular user identity's social network from the electronic social networking platform: name; gender; birthday (and/or age); current city; hometown; relationship status; sexual orientation; primary language; employment history; education history; contact information (e.g., mailing address(es), e-mail address(es), phone number(s), etc.); interests recorded with the electronic social networking platform 402 (e.g., by endorsing interest objects manifested as "pages" within the electronic social networking platform 402); "check-ins" registered with the electronic social networking platform 402; event information for events to which the user identity has been invited within the context of the electronic social networking platform 402; "status posts" published by the user identity to other user identities who are members of the user identity's social network and any related responsive comments and/or endorsements; and "wall posts" or "timeline posts" received by the user identity.

The application hosted by computing system 404 may extract from the electronic social networking platform 402 data about or otherwise related to each user identity for whom the application hosted by computing system 404 has received a token (or other form of access mechanism or right (e.g., a password or PIN)). Additionally or alternatively, the application hosted by computing system 404 may extract from the electronic social networking platform 402 data about or otherwise related to the other user identities of the electronic social networking platform 402 who are members of the social networks of each user identity for whom the application hosted by computing system 404 has received a token (or other form of access mechanism or right (e.g., a password or PIN)). In this manner, in some implementations, the application hosted by computing system 404 may extract from the electronic social networking platform 402 data about or otherwise related to user identities of the electronic social networking platform who are not also users of the application hosted by computing system 404.

After extracting data from the electronic social networking platform 402, the application hosted by computing system 404 may store the extracted data (e.g., in the storage components accessible to computing system 404). More particularly, in some implementations, the application hosted by computing system 404 may store the extracted data in one or more databases. For example, the application hosted by computing system 404 may store the extracted data in one or more on-line transaction processing (OLTP) databases. Such OLTP databases may be implemented as relational or other forms of databases. As described in greater detail below, the application hosted by computing system 404 may process the data extracted from the electronic social networking platform 402 to glean intelligence about the users of the application and/or the other user identities of the electronic social networking platform 402 who are members of the social networks of the users of the application. In some such implementations, the application hosted by computing system 404 may process the extracted data stored in the database(s) and load the processed data into a data warehouse (e.g., an on-line analytical processing (OLAP) data warehouse) that may facilitate reporting and analysis of the processed data.

In order to keep the data that is available to the application hosted by computing system 404 generally synchronized with the data in the electronic social networking platform 402, the application hosted by computing system 404 occasionally may repeat the extraction from the electronic social networking platform 402 of data about or otherwise related to each user identity for whom the application hosted by computing system 404 has received a token (or other form of access mechanism or right (e.g., a password or PIN)) as well as data about or otherwise related to other user identities of the electronic social networking platform 402 who are members of the social networks of each user identity for whom the application hosted by computing system 404 has received a token (or other form of access mechanism or right (e.g., a password or PIN)).

The application hosted by computing system 404 may use the data extracted from the electronic social networking platform 402 for a variety of different purposes. For example, the application hosted by computing system 404 may use the data extracted from the electronic social networking platform 402 to provide a compelling user experience for users of the application that is tied into the users' social networks.

Additionally or alternatively, as suggested above, the application hosted by computing system 404 may process the data extracted from the electronic social networking platform 402 to glean intelligence about the users of the application and/or the other user identities of the electronic social networking platform 402 who are members of the social networks of the users of the application. In some implementations, the application hosted by computing system 404 may maintain the extracted data and/or any intelligence gleaned from the extracted data internally, for example, to use such intelligence to enhance the performance of the application and/or to provide a more personalized user experience. Additionally or alternatively, the application hosted by the computing system 404 may make the extracted data and/or any intelligence gleaned from the extracted data available to one or more administrators or other individuals associated with the application as well as to various third parties. Furthermore, the application hosted by computing system 404 also may share the extracted data and/or any intelligence gleaned from the extracted data with the users of the application.

The application hosted by computing system 404 also may provide users with whom the extracted data is shared with various analysis and reporting tools for manipulating the extracted data. Such analysis and reporting tools may reside on or otherwise be provided by computing system 404. Additionally or alternatively, such analysis and reporting tools may be provided within a client application that is resident on a computing device and that is configured to enable the client application to access the application hosted by computing system 404.

In some implementations, the application may enrich the raw data extracted from the electronic social networking platform, for example, in an effort to enable better intelligence to be gleaned from the data extracted from the electronic social networking platform. For instance, the application may derive various different characteristics or estimates of various different characteristics of the user identities for whom the application extracted data from the electronic social networking platform from the data extracted from the electronic social networking platform for the user identities even if the electronic social networking platform itself does not record or make available data about such characteristics.

For example, the hometown and/or current residence information for a user identity returned by the electronic social networking platform may be incomplete, providing only an indication of a city but not the state/territory and/or country in which the city is located, and the application may identify the state/territory and/or country in which the city is located. Additionally or alternatively, the application may determine if a user identity's current residence is urban or rural. The application also may determine if a user identity's current residence belongs to a particular metro area. In addition, the application may estimate a user identity's income, affluence, influence, and/or popularity based on data extracted from the electronic social networking platform for the user identity.

Furthermore, the application may determine if the user identity belongs to any one of a number of different psychographic profiles based on data extracted from the electronic social networking platform for the user identity. Examples of different psychographic profiles to which the application may attempt to determine if the user identity belongs may include: music lovers, movie lovers, TV fans, social activists, sports lovers, food lovers, book lovers, travel lovers, art connoisseurs, health and beauty conscious, game lovers, techies, comedy lovers, car lovers, brand conscious, religious people, outdoor enthusiasts, frequent travelers, do-it-yourselfers, party-goers, politics—Democrats, pet lovers, brides-to-be, budget shoppers, deal hunters, politics—Republicans, parents of young kids, environmentally aware, charity minded, shopping lovers, beverage lovers, and on-line shoppers.

Various different techniques may be employed to determine the state/territory and/or country in which a user identity's hometown or current residence is located when the hometown or current residence information for the user identity returned by the electronic social networking platform provides an indication of a city but not the state/territory and/or country in which the city is located. In some implementations, the hometown or current residence information for the user identity returned by the electronic social networking platform may include geographic coordinates corresponding to the user identity's hometown or current residence city. In such implementations, the geographic coordinates may be used to identify the location of the city, from which the state/territory and/or country in which the city is located then can be determined. In other implementations, the city returned by the electronic social networking platform may be compared to hometown or current residence cities already extracted from the electronic social networking platform for other user identities, and, if the city matches one of the cities already extracted from the electronic social networking platform for one or more other user identities, the state/territory and/or country information associated with the matched city may be assumed to be the same. In the event that the city returned by the electronic social networking platform matches multiple cities already extracted from the electronic social networking platform located in different states/territories and/or countries, the state/territory and/or country information associated with the matching city corresponding to the greatest number of other user identities may be assumed to be the state/territory and/or country to associate with the city.

Various different techniques may be employed to determine if a user identity's current residence is urban or rural. For example, a database of geographic locations (e.g., identified by one or more of city, state/territory, and/or country name; latitude/longitude or other geographic coordinates; etc.) known to be urban locations may be maintained. When a user identity's current residence location is extracted from the electronic social networking platform, the user identity's current residence location may be compared to the geographic locations known to be urban locations. If the user identity's current residence location matches one of the geographic locations known to be an urban location, then the user identity's current residence may be determined to be urban. If the user identity's current residence location does not match any of the geographic locations known to be urban locations, one or more databases that store population data for different locations may be accessed. If the population for the user identity's current residence location can be determined by accessing the database(s) storing population data, and the population for the user identity's current residence location is greater than or equal to a defined threshold value (e.g., 15,000), then the user identity's current residence may be determined to be urban. If the population for the user identity's current residence location can be determined by accessing the database(s) storing population data, and the population for the user identity's current residence location is less than a defined threshold value (e.g., 15,000), then the user identity's current residence may be determined to be rural. If the population for the user identity's current residence location cannot be determined by accessing the database(s) storing population data, the application may be unable to determine if the user identity's current residence location is urban or rural.

Various different techniques may be employed to determine if a user identity's current residence belongs to a particular metro area. For example, a database of known metro areas may be maintained. This database may store geographic coordinates for each of the known metro areas. In some implementations, these coordinates may correspond to the primary city around which the metro area is centered (e.g., the coordinates may be the coordinates for the center of the city around which the metro area is centered). In other implementations, these coordinates may correspond to the geographic center of the metro area. In still other implementations, these coordinates may correspond to boundaries of the metro area. When a user identity's current residence location is extracted from the electronic social networking platform, geographic coordinates for the user identity's current residence may be determined. In some implementations, geographic coordinates for the user identity's current residence may be provided by the electronic social networking platform. In other implementations, the electronic social networking platform may return the city, state/territory, and/or country name of the user identity's current residence. In such implementations, a query may be run against the city, state/territory, and/or country name of the user identity's current residence to determine geographic coordinates for the user identity's current residence. Once geographic coordinates for the user identity's current residence have been determined, distances between the geographic coordinates for the user identity's current residence and any one or more of the geographic coordinates for the known metro areas may be calculated. If the distance between the geographic coordinates for the user identity's current residence and the geographic coordinates for any known metro area is determined to be less than or equal to a defined threshold distance (e.g., 60 miles), the user identity's current residence may be determined to be a part of that metro area. In the event that the distances between the geographic coordinates for the user identity's current residence and the geographic coordinates for multiple metro areas are less than or equal to the defined threshold distance, the user identity's current residence may be determined to be a part of the metro area to which it is closest. If the distance between the geographic coordinates for the user identity's current residence and the geographic coordinates for all of the known metro areas is determined to exceed a defined threshold distance (e.g., 60 miles), the user identity's current residence may be determined to not be a part of any metro area.

Various different techniques may be employed to estimate a user identity's income based on information extracted from the electronic social networking platform. One particular example is described below.

First, a determination may be made as to whether the user identity likely has an income. This determination may be made based upon one or more of the user identity's age, employment history, and education history. If the user identity has a current employer specified in his/her employment history, the user identity may be determined to have an income irrespective of the user identity's age and/or education history. If the user identity is less than 18 years old and does not have a current employer specified in his/her employment history, the user identity may be determined not to have an income. If the user identity is between 18 years old and 21 years old, does not have a current employer specified in his/her employment history, and does not have a college/university or a graduate school specified in his/her employment history, the user identity may be determined to have an income. In contrast, if the user identity is between 18 years old and 21 years old, does not have a current employer specified in his/her employment history, and does have a college/university or a graduate school specified in his/her employment history, the user identity may be determined not to have an income. If the user identity is between 22 years old and 25 years old, does not have a current employer specified in his/her employment history, and does not have a graduate school specified in his/her employment history, the user identity may be determined to have an income. In contrast, if the user identity is between 22 years old and 25 years old, does not have a current employer specified in his/her employment history, and does have a graduate school specified in his/her employment history, the user identity may be determined to not have an income. If the user identity is between 25 years old and 65 years old and does not have a current employer specified in his/her employment history, the user identity still may be determined to have an income. If the user identity is more than 65 years old and does not have a current employer specified in his/her employment history, the user identity may be determined not to have an income. Finally, if no age information is returned from the electronic social networking platform for the user identity, the application may not be able to estimate the user identity's income.

If the user identity is determined to have an income, a base income then is determined for the user identity. Different techniques may be employed to determine a base income for the user identity. For example, one or more databases may be maintained that store base incomes to be used for user identities based on the current residence locations of the user identities. In some implementations, the same base income may be used for all user identities within a single country. In such implementations, the base income to be used for user identities from each country may be the mean or median income for the country. In other implementations, different base incomes may be used for user identities from a single country. In such implementations, the base incomes to be used may vary at the regional, state, or even city level and may be based on the mean or median incomes for the corresponding regions, states, or cities. For example, the base incomes to be used for user identities residing in one country may be determined based on the cities in the country where the user identities currently reside. More particularly, the base income to be used for a user identity may be the mean income for individuals in the user identity's current residence city. Alternatively, the base income to be used for a user identity may be the median income for individuals in the user identity's current residence city.

After determining the base income for the user identity, age and education level multipliers then are determined for the user identity. The age multiplier for the user identity may be calculated according to Equation 1 below:

$$\left(\frac{0.72}{1+e^{-0.345(age-24.3)}}+0.344\right)\cdot(1+0.00481(age-24.3)) \quad \text{(Eq. 1)}$$

where "age" represents the user identity's age in years.

Meanwhile, the education level multiplier for the user identity depends on the user identity's education history. If the user identity's age is less than 22 years old, the user identity's education level multiplier may be calculated according to Equation 2 below. Similarly, if the user identity's education history specifies a high school but no college/university or graduate school, the user identity's education level multiplier may be calculated according to Equation 2 below:

$$\frac{0.250}{1+e^{(7.0\times10^{-5})(base\ income-75,000)}}+0.350 \quad \text{(Eq. 2)}$$

where "base income" represents the base income determined for the user identity as discussed above.

If the user identity's education history specifies a college/university but no graduate school, and the user identity is at least 22 years old or no age is specified for the user identity, the user identity's education multiplier may be calculated according to Equation 3 below. Similarly, if the user identity's education history specifies a graduate school and the user identity is less than 25 years old, the user identity's education level multiplier may be calculated according to Equation 3 below:

$$\frac{0.400}{1+e^{(7.0\times10^{-5})(base\ income-75,000)}}+0.950 \quad \text{(Eq. 3)}$$

where "base income" represents the base income determined for the user identity as discussed above.

If the user identity's education history specifies a graduate school and the user identity is at least 25 years old, the user identity's education level multiplier may be calculated according to Equation 4 below:

$$\frac{0.600}{1+e^{(7.0\times10^{-5})(base\ income-90,000)}}+1.8 \quad \text{(Eq. 4)}$$

where "base income" represents the base income determined for the user identity as discussed above.

The education level multiplier for a user identity who does not satisfy any of the above conditions is "1."

After the age and education level multipliers for the user identity have been determined, the user's estimated income is determined according to Equation 5 below:

$$\text{est. income}=(\text{base income})\times(\text{age multipler})\times(\text{education level multiplier}) \quad \text{(Eq. 5)}$$

Various different techniques may be employed to estimate a user identity's affluence based on information extracted from the electronic social networking platform. In one example, an affluence score for a user identity may be determined for the user identity based on the income estimated for the user identity, for example, as described above. More particularly, the affluence score for the user identity may be calculated by dividing the estimated income for the user identity by the highest estimated income for all user identities for which the application is able to calculate an estimated income and then multiplying the result by 100.

Various different techniques may be employed to estimate a user identity's influence based on information extracted from the electronic social networking platform. One particular example is described below.

In this example, an influence score may be calculated for a user identity based on the user identity's activity within the electronic social networking platform over a defined period of time (e.g., the previous 30 days, the previous 60 days, the previous 90 days, the previous year, etc.). First, the number of "status posts," M, that the user identity has published within the electronic social networking platform during the defined period of time is determined. In addition, the number of distinct users who endorsed each of the M posts is determined, and the number of distinct users who commented on each of the M posts is determined. A raw influence score for the user identity then may be calculated according to Equation 6 below:

$$\text{raw influence}=\sqrt{M}\cdot(\Sigma_{i=1}^{M}\text{\#distinct users endorsing post}_i)\cdot3(\Sigma_{i=1}^{M}\text{\#distinct users commenting on post}_i) \quad \text{(Eq. 6)}$$

A final influence score for the user identity then is calculated for the user identity by converting the user identity's raw influence score to a logarithmic scale and dividing by a maximum "cut-off" value so that the user identity's final influence score is within the range 0-99 according to Equation 7 below:

$$\text{influence} = 99 \times \frac{\log_{10}(1 + \text{raw influence})}{\log_{10}(1 + \text{Max(raw influence)})} \quad \text{(Eq. 7)}$$

Various different techniques may be employed to estimate a user identity's popularity based on information extracted from the electronic social networking platform. One particular example is described below.

In this example, a popularity score may be calculated for a user identity based on targeted "wall" or "timeline" posts from other user identities, "wall" or "timeline" posts from gaming applications, and/or event invitations that the user identity received within the electronic social networking platform over a defined period of time (e.g., the previous 30 days, the previous 60 days, the previous 90 days, the previous year, etc.).

First, the "wall" or "timelines posts from other user identities, the "wall" or "timelines" posts from gaming applications, and the event invitations that the user received within the electronic social networking platform during the defined time period are identified. In addition, the sources of each of the identified "wall" or "timeline" posts from other user identities, the "wall" or "timeline" posts from gaming applications, and the event invitations are identified. Then, for each identified source, i, of "wall" or "timelines posts from other user identities, "wall" or "timeline" posts from gaming applications, and event invitations, a weighted score is calculated according to Equation 8 below:

$$n_{resource_i} = (\#\text{posts posted}) + 0.1(\#\text{of gaming posts}) + 2 (\#\text{quality event invites sent}) \quad \text{(Eq. 8)}$$

where "# of posts posted" represents the number of "wall" or "timeline" posts from a user identity that originated from the source, i, "# of gaming posts" represents the number of "wall" or "timeline" posts from gaming applications that originated from the source, i, and "# quality event invites sent" represents the number of event invitations for which more than a defined threshold of invitees have accepted an invitation that originated from the source, i.

After the score $n_{source_i}$ has been calculated for each source, i, a sum of the scores $n_{source_i}$ for all M sources may be calculated according to Equation 9 below:

$$n_{total} = \Sigma_{i=1}^{M} n_{source_i} \quad \text{(Eq. 9)}$$

Then, a raw popularity score for the user identity may be calculated according to Equation 10 below:

$$\text{raw popularity} = \sum_{i=1}^{M} n_{source_i} \cdot \left( \log_{10}\left(\frac{n_{total}}{n_{source_i}}\right) \right) \quad \text{(Eq. 10)}$$

A final popularity score for the user identity then is calculated for the user identity by converting the user identity's raw popularity score to a logarithmic scale and dividing by a maximum "cut-off" value so that the user identity's final popularity score is within the range 0-99 according to Equation 11 below:

$$\text{popularity} = 99 \times \frac{\log_{10}(1 + \text{raw popularity})}{\log_{10}(1 + \text{Max(raw popularity)})} \quad \text{(Eq. 11)}$$

As discussed above, the application may determine if user identities for whom the application extracted data from the electronic social networking platform belong to one or more different psychographic profiles based on the data for the user identities that the application extracted for the user identities from the electronic social networking platform. A variety of different techniques may be used to determine if a user identity belongs to a particular psychographic profile, and the application may consider a variety of different types of data extracted for the user identity from the electronic social networking platform in determining if the user identity belongs to the particular psychographic profile. For example, the application may consider the user identity's "page" endorsements, "check-ins," and/or demographic characteristics when determining if the user identity belongs to a particular psychographic profile.

Each psychographic profile may be defined as corresponding to a collection of certain "pages" within the electronic social networking platform. The collection of "pages" corresponding to any particular psychographic profile may be identified based on "pages" that have been specifically designated within the application (e.g., "pages" that have been hardcoded within the application) as belonging to the psychographic profile, "pages" that have been assigned one or more category designations within the electronic social networking platform, and/or "pages" that include one or more specified keywords within the text of their "page" descriptions within the electronic social networking platform.

The application may determine if a user identity belongs to a particular psychographic profile based on the extent to which the user identity has endorsed "pages" that the application identifies as corresponding to the particular psychographic profile. The application may consider any user identity who has endorsed at least one "page" that corresponds to the particular psychographic profile as a candidate for the psychographic profile. For a user identity that the application has identified as a candidate for a particular psychographic profile, the application then may calculate a psychographic profile page score for the user identity according to Equation 12 below:

$$\text{psychographic profile page score} = A^2 \cdot B \quad \text{(Eq. 12)}$$

where A represents the number of "pages" that the user identity has endorsed that correspond to the particular psychographic profile and B represents the total number of "pages" that the user identity has endorsed within the electronic social networking platform. As described in greater detail below, the application then may use the psychographic profile page score calculated for the user identity in determining if the user identity belongs to the particular psychographic profile.

Another factor the application may consider in determining whether a user identity belongs to a particular psychographic profile is the user identity's "check-ins" that the application extracted from the electronic social networking platform. Each psychographic profile may be defined as corresponding to a collection of certain "check-in" locations. The collection of "check-in" locations corresponding to any particular psychographic profile may be identified based on "check-in" locations that have been assigned one or more category designations within the electronic social networking platform and/or "check-in" locations that have been assigned one or more category designations by the application (e.g., specific "check-in" locations that have been hardcoded as belonging to one or more different categories by the application itself). The application may determine if a user identity belongs to a particular psychographic profile based on the extent to which the user identity has "checked-in" at locations that the application identifies as corresponding to the particular psychographic profile.

Examples of techniques for determining if a user identity belongs to the different psychographic profiles introduced above are now described.

Various different techniques may be employed to determine if a user identity belongs to the music lovers psychographic profile. One particular example is described below. The music lovers psychographic profile may be defined as corresponding to "pages" categorized within the electronic social networking platform as musician/band, musical genre, song, music video, and music. If a user identity has endorsed any "page" within the electronic social networking platform categorized as belonging to any one of these categories, the application may consider the user identity to be a candidate for the music lovers psychographic profile and calculate a psychographic profile page score for the user identity. If the psychographic profile page score for the user identity is within a predefined top percentile (e.g., the top 20%) of psychographic profile page scores for all user identities identified as candidates for the music lovers psychographic profile, then the application may determine that the user identity belongs to the music lovers psychographic profile. Even if the application determines that the user identity's "page" endorsements do not qualify the user identity for membership in the music lovers psychographic profile, the application still may determine that the user identity belongs to the music lovers psychographic profile based on the user identity's "check-in" activity. For example, the application may determine that the user identity belongs to the music lovers psychographic profile if the user identity has "checked-in" to locations classified by the electronic social networking platform and/or the application as concert/music venues or music stores more than six times within the previous six months.

Various different techniques may be employed to determine if a user identity belongs to the movie lovers psychographic profile. One particular example is described below. The movie lovers psychographic profile may be defined as corresponding to "pages" categorized within the electronic social networking platform as movie, actor/director, movie genre, movie theater, and movie general. If a user identity has endorsed any "page" within the electronic social networking platform categorized as belonging to any one of these categories, the application may consider the user identity to be a candidate for the movie lovers psychographic profile and calculate a psychographic profile page score for the user identity. If the psychographic profile page score for the user identity is within a predefined top percentile (e.g., the top 20%) of psychographic profile page scores for all user identities identified as candidates for the movie lovers psychographic profile, then the application may determine that the user identity belongs to the movie lovers psychographic profile. Even if the application determines that the user identity's "page" endorsements do not qualify the user identity for membership in the movie lovers psychographic profile, the application still may determine that the user identity belongs to the movie lovers psychographic profile based on the user identity's "check-in" activity. For example, the application may determine that the user identity belongs to the movie lovers psychographic profile if the user identity has "checked-in" to locations classified by the electronic social networking platform and/or the application as movie theaters at least once a week every week for the previous six months.

Various different techniques may be employed to determine if a user identity belongs to the TV fans psychographic profile. One particular example is described below. The TV fans psychographic profile may be defined as corresponding to "pages" categorized within the electronic social networking platform as TV show, TV network, TV channel, TV, and TV genre. If a user identity has endorsed any "page" within the electronic social networking platform categorized as belonging to any one of these categories, the application may consider the user identity to be a candidate for the TV fans psychographic profile and calculate a psychographic profile page score for the user identity. If the psychographic profile page score for the user identity is within a predefined top percentile (e.g., the top 20%) of psychographic profile page scores for all user identities identified as candidates for the TV fans psychographic profile, then the application may determine that the user identity belongs to the TV fans psychographic profile.

Various different techniques may be employed to determine if a user identity belongs to the social activists psychographic profile. One particular example is described below. The social activists psychographic profile may be defined as corresponding to "pages" categorized within the electronic social networking platform as non-profit organization and cause. If a user identity has endorsed any "page" within the electronic social networking platform categorized as belonging to any one of these categories, the application may consider the user identity to be a candidate for the social activist psychographic profile and calculate a psychographic profile page score for the user identity. If the psychographic profile page score for the user identity is within a predefined top percentile (e.g., the top 20%) of psychographic profile page scores for all user identities identified as candidates for the social activist psychographic profile, then the application may determine that the user identity belongs to the social activist psychographic profile.

Various different techniques may be employed to determine if a user identity belongs to the sports lovers psychographic profile. One particular example is described below. The sports lovers psychographic profile may be defined as corresponding to "pages" categorized within the electronic social networking platform as athlete, professional sports team, sports league, sports/recreation/activities, recreation/sports, amateur sports team, school sports team, sport, and sports. If a user identity has endorsed any "page" within the electronic social networking platform categorized as belonging to any one of these categories, the application may consider the user identity to be a candidate for the sports lovers psychographic profile and calculate a psychographic profile page score for the user identity. If the psychographic profile page score for the user identity is within a predefined top percentile (e.g., the top 20%) of psychographic profile page scores for all user identities identified as candidates for the sports lovers psychographic profile, then the application may determine that the user identity belongs to the sports lovers psychographic profile. Even if the application determines that the user identity's "page" endorsements do not qualify the user identity for membership in the sport lovers psychographic profile, the application still may determine that the user identity belongs to the sport lovers psychographic profile based on the user identity's "check-in" activity. For example, the application may determine that the user identity belongs to the sport lovers psychographic profile if the user identity has "checked-in" to locations classified by the electronic social networking platform and/or the application as sporting venues more than six times within the previous six months.

Various different techniques may be employed to determine if a user identity belongs to the food lovers psychographic profile. One particular example is described below. The food lovers psychographic profile may be defined as corresponding to "pages" categorized within the electronic social networking platform as restaurant/café and food. If a user identity has endorsed any "page" within the electronic social networking platform categorized as belonging to any one of these categories, the application may consider the user identity to be a candidate for the food lovers psychographic profile and calculate a psychographic profile page score for the user identity. If the psychographic profile page score for the user identity is within a predefined top percentile (e.g., the top 20%) of psychographic profile page scores for all user identities identified as candidates for the food lovers psychographic profile, then the application may determine that the user identity belongs to the food lovers psychographic profile. Even if the application determines that the user identity's "page" endorsements do not qualify the user identity for membership in the food lovers psychographic profile, the application still may determine that the user identity belongs to the food lovers psychographic profile based on the user identity's "check-in" activity. For example, the application may determine that the user identity belongs to the food lovers psychographic profile if the user identity has "checked-in" to locations classified by the electronic social networking platform and/or the application as restaurants at least once a week for the previous six months.

Various different techniques may be employed to determine if a user identity belongs to the book lovers psychographic profile. One particular example is described below. The book lovers psychographic profile may be defined as corresponding to "pages" categorized within the electronic social networking platform as book genre, book, author, and library. If a user identity has endorsed any "page" within the electronic social networking platform categorized as belonging to any one of these categories, the application may consider the user identity to be a candidate for the book lovers psychographic profile and calculate a psychographic profile page score for the user identity. If the psychographic profile page score for the user identity is within a predefined top percentile (e.g., the top 20%) of psychographic profile page scores for all user identities identified as candidates for the book lovers psychographic profile, then the application may determine that the user identity belongs to the book lovers psychographic profile.

Various different techniques may be employed to determine if a user identity belongs to the travel lovers psychographic profile. One particular example is described below. The travel lovers psychographic profile may be defined as corresponding to "pages" categorized within the electronic social networking platform as hotel, travel/leisure, bags/luggage, transportation, and transport/freight. If a user identity has endorsed any "page" within the electronic social networking platform categorized as belonging to any one of these categories, the application may consider the user identity to be a candidate for the travel lovers psychographic profile and calculate a psychographic profile page score for the user identity. If the psychographic profile page score for the user identity is within a predefined top percentile (e.g., the top 20%) of psychographic profile page scores for all user identities identified as candidates for the travel lovers psychographic profile, then the application may determine that the user identity belongs to the travel lovers psychographic profile.

Various different techniques may be employed to determine if a user identity belongs to the art connoisseurs psychographic profile. One particular example is described below. The art connoisseurs psychographic profile may be defined as corresponding to "pages" categorized within the electronic social networking platform as museum/art gallery, arts/humanities, and artist. If a user identity has endorsed any "page" within the electronic social networking platform categorized as belonging to any one of these categories, the application may consider the user identity to be a candidate for the art connoisseurs psychographic profile and calculate a psychographic profile page score for the user identity. If the psychographic profile page score for the user identity is within a predefined top percentile (e.g., the top 20%) of psychographic profile page scores for all user identities identified as candidates for the art connoisseurs psychographic profile, then the application may determine that the user identity belongs to the art connoisseurs psychographic profile. Even if the application determines that the user identity's "page" endorsements do not qualify the user identity for membership in the art connoisseurs psychographic profile, the application still may determine that the user identity belongs to the art connoisseurs psychographic profile based on the user identity's "check-in" activity. For example, the application may determine that the user identity belongs to the art connoisseurs psychographic profile if the user identity has "checked-in" to locations classified by the electronic social networking platform and/or the application as museums or art galleries on average once a month for the previous six months.

Various different techniques may be employed to determine if a user identity belongs to the health and beauty conscious psychographic profile. One particular example is described below. The health and beauty conscious psychographic profile may be defined as corresponding to "pages" categorized within the electronic social networking platform as health/wellness, vitamins/supplements, health/beauty, lifestyle, and spas/beauty/personal care or "pages" that include the keyword "fashion" in their descriptions. If a user identity has endorsed any "page" within the electronic social networking platform categorized belonging to one of these categories or that includes the keyword "fashion" in its description, the application may consider the user identity to be a candidate for the health and beauty conscious psychographic profile and calculate a psychographic profile page score for the user identity. If the psychographic profile page score for the user identity is within a predefined top percentile (e.g., the top 20%) of psychographic profile page scores for all user identities identified as candidates for the health and beauty conscious psychographic profile, then the application may determine that the user identity belongs to the health and beauty conscious psychographic profile. Even if the application determines that the user identity's "page" endorsements do not qualify the user identity for membership in the health and beauty conscious psychographic profile, the application still may determine that the user identity belongs to the health and beauty conscious psychographic profile based on the user identity's "check-in" activity. For example, the application may determine that the user identity belongs to the health and beauty conscious psychographic profile if the user identity has "checked-in" to locations classified by the electronic social networking platform and/or the application as fitness centers, or exercise, cosmetics, fashion, health and beauty, beauty products, fashion show, health and fitness, health and hygiene, or hair care locations at least once a week for the previous six months.

Various different techniques may be employed to determine if a user identity belongs to the game lovers psychographic profile. One particular example is described below. The game lovers psychographic profile may be defined as corresponding to "pages" categorized within the electronic social networking platform as games and games/toys. If a user identity has endorsed any "page" within the electronic social networking platform categorized as belonging to any one of these categories, the application may consider the user identity to be a candidate for the game lovers psychographic profile and calculate a psychographic profile page score for the user identity. If the psychographic profile page score for the user identity is within a predefined top percentile (e.g., the top 20%) of psychographic profile page scores for all user identities identified as candidates for the game lovers psychographic profile, then the application may determine that the user identity belongs to the game lovers psychographic profile.

Various different techniques may be employed to determine if a user identity belongs to the techies psychographic profile. One particular example is described below. The techies psychographic profile may be defined as corresponding to "pages" categorized within the electronic social networking platform as appliance, computers/Internet, computers/technology, Internet/software, software, and computers. If a user identity has endorsed any "page" within the electronic social networking platform categorized as belonging to any one of these categories, the application may consider the user identity to be a candidate for the techies psychographic profile and calculate a psychographic profile page score for the user identity. If the psychographic profile page score for the user identity is within a predefined top percentile (e.g., the top 20%) of psychographic profile page scores for all user identities identified as candidates for the techies psychographic profile, then the application may determine that the user identity belongs to the techies psychographic profile.

Various different techniques may be employed to determine if a user identity belongs to the comedy lovers psychographic profile. One particular example is described below. The comedy lovers psychographic profile may be defined as corresponding to "pages" categorized within the electronic social networking platform as comedians, comedy, or humor. If a user identity has endorsed any "page" within the electronic social networking platform categorized as belonging to any one of these categories, the application may consider the user identity to be a candidate for the comedy lovers psychographic profile and calculate a psychographic profile page score for the user identity. If the psychographic profile page score for the user identity is within a predefined top percentile (e.g., the top 20%) of psychographic profile page scores for all user identities identified as candidates for the comedy lovers psychographic profile, then the application may determine that the user identity belongs to the comedy lovers psychographic profile. Even if the application determines that the user identity's "page" endorsements do not qualify the user identity for membership in the comedy lovers psychographic profile, the application still may determine that the user identity belongs to the comedy lovers psychographic profile based on the user identity's "check-in" activity. For example, the application may determine that the user identity belongs to the comedy lovers psychographic profile if the user identity has "checked-in" to locations classified by the electronic social networking platform and/or the application as comedy clubs more than three times within the previous six months.

Various different techniques may be employed to determine if a user identity belongs to the car lovers psychographic profile. One particular example is described below. The car lovers psychographic profile may be defined as corresponding to "pages" categorized within the electronic social networking platform as automotive, cars, and automobiles and parts. If a user identity has endorsed any "page" within the electronic social networking platform categorized as belonging to any one of these categories, the application may consider the user identity to be a candidate for the car lovers psychographic profile and calculate a psychographic profile page score for the user identity. If the psychographic profile page score for the user identity is within a predefined top percentile (e.g., the top 20%) of psychographic profile page scores for all user identities identified as candidates for the car lovers psychographic profile, then the application may determine that the user identity belongs to the car lovers psychographic profile.

Various different techniques may be employed to determine if a user identity belongs to the brand conscious psychographic profile. One particular example is described below. The brand conscious psychographic profile may be defined as corresponding to "pages" categorized within the electronic social networking platform as jewelry/watches and clothing as well as the following specific "pages": Givenchy, Lord & Taylor, Calvin Klein Underwear, Donna Karan New York, GUESS by Marciano, UNITED COLORS OF BENETTON, DKNY, Lucky Brand, Nine West, Kenneth Cole, AIX Armani Exchange, Diesel, HUGO BOSS, BCBG—BCBGMAXAZRIA, GUESS? Inc., Juicy Couture, ARMANI, Barneys New York, INTERMIX, ALEXANDER WANG, bebe, Saks Fifth Avenue, Marc Jacobs Intl, Michael Kors—The Official Page, Neiman Marcus, Dolce & Gabbana, Tory Burch, Gucci, Burberry, ZARA, Victoria's Secret Pink, and Victoria's Secret. If a user identity has endorsed any "page" within the electronic social networking platform categorized as belonging to the categories jewelry/watches or clothing or any of the other specific "pages," the application may consider the user identity to be a candidate for the brand conscious psychographic profile and calculate a psychographic profile page score for the user identity. If the psychographic profile page score for the user identity is within a predefined top percentile (e.g., the top 20%) of psychographic profile page scores for all user identities identified as candidates for the brand conscious psychographic profile, then the application may determine that the user identity belongs to the brand conscious psychographic profile.

Various different techniques may be employed to determine if a user identity belongs to the religious people psychographic profile. One particular example is described below. The religious people psychographic profile may be defined as corresponding to "pages" categorized within the electronic social networking platform as church/religious organization and religion. If a user identity has endorsed any "page" within the electronic social networking platform categorized as belonging to any one of these categories, the application may consider the user identity to be a candidate for the religious people psychographic profile and calculate a psychographic profile page score for the user identity. If the psychographic profile page score for the user identity is within a predefined top percentile (e.g., the top 20%) of psychographic profile page scores for all user identities identified as candidates for the religious people psychographic profile, then the application may determine that the user identity belongs to the religious people psychographic profile. Even if the application determines that the user identity's "page" endorsements do not qualify the user identity for membership in the religious people psychographic profile, the application still may determine that the user identity belongs to the religious people psychographic profile based on the user identity's "check-in" activity. For example, the application may determine that the user identity belongs to the religious people psychographic profile if the user identity has "checked-in" to locations classified by the electronic social networking platform and/or the application as churches, synagogues or places of worship at least six times within the previous six months.

Various different techniques may be employed to determine if a user identity belongs to the outdoor enthusiasts psychographic profile. One particular example is described below. The outdoor enthusiasts psychographic profile may be defined as corresponding to "pages" categorized within the electronic social networking platform as sports/recreation, outdoor gear, attractions/things to do, tours, and landmark. If a user identity has endorsed any "page" within the electronic social networking platform categorized as belonging to any one of these categories, the application may consider the user identity to be a candidate for the outdoor enthusiasts psychographic profile and calculate a psychographic profile page score for the user identity. If the psychographic profile page score for the user identity is within a predefined top percentile (e.g., the top 20%) of psychographic profile page scores for all user identities identified as candidates for the outdoor enthusiasts psychographic profile, then the application may determine that the user identity belongs to the outdoor enthusiasts psychographic profile.

Various different techniques may be employed to determine if a user identity belongs to the frequent travelers psychographic profile. One particular example is described below. The application may determine that the user identity belongs to the frequent travelers psychographic profile if the user identity has "checked-in" to locations classified by the electronic social networking platform and/or the application as airports or hotels or to locations that are more than 100 miles away from his/her current residence city at least once a week for the previous six months.

Various different techniques may be employed to determine if a user identity belongs to the do-it-yourselfers psychographic profile. One particular example is described below. The do-it-yourselfers psychographic profile may be defined as corresponding to "pages" categorized within the electronic social networking platform as home/garden, farming/agriculture, household supplies, home improvement, and tools/equipment as well as the following specific "pages": IKEA, Lowe's Home Improvement, and The Home Depot. If a user identity has endorsed any "page" within the electronic social networking platform categorized as belonging to the categories home/garden, farming/agriculture, household supplies, home improvement, and tools/equipment or any of the other specific "pages," the application may consider the user identity to be a candidate for the do-it-yourselfers psychographic profile and calculate a psychographic profile page score for the user identity. If the psychographic profile page score for the user identity is within a predefined top percentile (e.g., the top 20%) of psychographic profile page scores for all user identities identified as candidates for the do-it-yourselfers psychographic profile, then the application may determine that the user identity belongs to the do-it-yourselfers psychographic profile.

Various different techniques may be employed to determine if a user identity belongs to the party-goers psychographic profile. One particular example is described below. To be considered as a potential member of the party-goer psychographic profile, the user identity may need to be within a defined age range (e.g., between 18 years old and 45 years old). Furthermore, the party-goers psychographic profile may be defined as corresponding to "pages" categorized within the electronic social networking platform as arts/entertainment/nightlife, bar, and club. If a user identity is within the defined age range and has endorsed any "page" within the electronic social networking platform categorized as belonging to any one of these categories, the application may consider the user identity to be a candidate for the party-goers psychographic profile and calculate a psychographic profile page score for the user identity. If the psychographic profile page score for the user identity is within a predefined top percentile (e.g., the top 20%) of psychographic profile page scores for all user identities identified as candidates for the party-goers psychographic profile, then the application may determine that the user identity belongs to the party-goers psychographic profile. Even if the application determines that the user identity's "page" endorsements do not qualify the user identity for membership in the party-goers psychographic profile, the application still may determine that the user identity belongs to the party-goers psychographic profile based on the user identity's "check-in" activity. For example, the application may determine that the user identity belongs to the party-goers psychographic profile if the user identity is within the defined age range and has "checked-in" to locations classified by the electronic social networking platform and/or the application as bars, nightclubs, or adult entertainment at least once a week over the previous six months.

Various different techniques may be employed to determine if a user identity belongs to the politics—Democrats psychographic profile. One particular example is described below. The politics—Democrats psychographic profile may be defined as corresponding to "pages" within the electronic social networking platform that represent politicians who are Democrats. If a user identity has endorsed at least some predefined number (e.g., 3) of "pages" that represent politicians who are Democrats, the application may determine that the user identity belongs to the politics—Democrats psychographic profile. Additionally or alternatively, the application may identify the user identity as belonging to the politics—Democrats psychographic profile if the user identity's profile indicates that the user identity is a Democrat or liberal leaning.

Various different techniques may be employed to determine if a user identity belongs to the pet lovers psychographic profile. One particular example is described below. The pet lovers psychographic profile may be defined as corresponding to "pages" categorized within the electronic social networking platform as pet supplies, animal, and animal breed. If a user identity has endorsed any "page" within the electronic social networking platform categorized as belonging to any one of these categories, the application may consider the user identity to be a candidate for the pet lovers psychographic profile and calculate a psychographic profile page score for the user identity. If the psychographic profile page score for the user identity is within a predefined top percentile (e.g., the top 20%) of psychographic profile page scores for all user identities identified as candidates for the pet lovers psychographic profile, then the application may determine that the user identity belongs to the pet lovers psychographic profile.

Various different techniques may be employed to determine if a user identity belongs to the brides-to-be psychographic profile. One particular example is described below. The application may determine that the user identity belongs to the brides-to-be psychographic profile if the user identity's profile indicates that the user identity's gender is female and that the user identity's relationship status is engaged. To be considered as a potential member of the brides-to-be psychographic profile if the user identity's profile does not indicate that the user identity is female and engaged, the user identity may need to be female, unmarried, and within a defined age range (e.g., between 17 years old and 58 years old). Furthermore, the brides-to-be psychographic profile may be defined as corresponding to "pages" that include one or more of the keywords "wedding," "bride," and "bridal" in their descriptions as well as the following specific pages: Kleinfeld Bridal (Official Page), 'DulhanExpo' Bridal Shows, BRIDES, and Washingtonian Bride & Groom. If a user identity is female, unmarried, and within the defined age range and has endorsed at least some threshold number (e.g., 3) of "pages" from among the specifically-identified pages or that include one or more of the keywords "wedding," "bride," and "bridal," then the application may determine that the user identity belongs to the brides-to-be psychographic profile.

Various different techniques may be employed to determine if a user identity belongs to the budget shoppers psychographic profile. One particular example is described below. The budget shoppers psychographic profile may be defined as corresponding to the following specific "pages": Half Price Books, Nasty Pig, Artbeads.com, Beyond the Rack, Belk, Soap.com, Kmart, Dollar General, QVC, Costco, Sears, Marshalls, Wal-Mart, Kohl's, and Target. If a user identity has endorsed any one of these specific "pages" within the electronic social networking platform, the application may consider the user identity to be a candidate for the budget shoppers psychographic profile and calculate a psychographic profile page score for the user identity. If the psychographic profile page score for the user identity is within a predefined top percentile (e.g., the top 20%) of psychographic profile page scores for all user identities identified as candidates for the budget shoppers psychographic profile, then the application may determine that the user identity belongs to the budget shoppers psychographic profile.

Various different techniques may be employed to determine if a user identity belongs to the deal hunters psychographic profile. One particular example is described below. The deal hunters psychographic profile may be defined as corresponding to any "page" that includes at least one of the keywords "bargains," "coupon," "groupon," "deals," "discount" and "thrifty" in its description. If a user identity has endorsed any "page" including at least one of these keywords in its description, the application may consider the user identity to be a candidate for the deal hunters psychographic profile and calculate a psychographic profile page score for the user identity. If the psychographic profile page score for the user identity is within a predefined top percentile (e.g., the top 20%) of psychographic profile page scores for all user identities identified as candidates for the deal hunters psychographic profile, then the application may determine that the user identity belongs to the deal hunters psychographic profile.

Various different techniques may be employed to determine if a user identity belongs to the politics—Republicans psychographic profile. One particular example is described below. The politics—Republicans psychographic profile may be defined as corresponding to "pages" within the electronic social networking platform that represent politicians who are Republicans. If a user identity has endorsed at least some predefined number (e.g., 3) of "pages" that represent politicians who are Republicans, the application may determine that the user identity belongs to the politics—Republicans psychographic profile. Additionally or alternatively, the application may identify the user identity as belonging to the politics—Republicans psychographic profile if the user identity's profile indicates that the user identity is a Republican or conservative leaning.

Various different techniques may be employed to determine if a user identity belongs to the parents of young kids psychographic profile. One particular example is described below. To be considered as a potential member of the parents of young kids psychographic profile, the user identity may need to be within a defined age range (e.g., between 17 years old and 45 years old) and have a relationship status specified as married or in a relationship. Furthermore, the parents of young kids psychographic profile may be defined as corresponding to "pages" categorized within the electronic social networking platform as baby goods/kids goods and games/toys as well as the following specific "pages": Gymboree, Toys "R" Us, Diapers.com, drugstore.com, Amazon.com, and eBay. If a user identity is within the defined age range, has a relationship status specified as married or in a relationship, and has endorsed any "page" within the electronic social networking platform categorized as baby goods/kids goods and games/toys or any one of the specifically identified pages, the application may consider the user identity to be a candidate for the parents of young kids psychographic profile and calculate a psychographic profile page score for the user identity. If the psychographic profile page score for the user identity is within a predefined top percentile (e.g., the top 20%) of psychographic profile page scores for all user identities identified as candidates for the parents of young kids psychographic profile, then the application may determine that the user identity belongs to the parents of young kids psychographic profile.

Various different techniques may be employed to determine if a user identity belongs to the environmentally aware psychographic profile. One particular example is described below. The environmentally aware psychographic profile may be defined as corresponding to the following specific "pages": Greenpeace Portugal, Greenpeace Mexico, National Wildlife Federation, National Park Foundation, Save The Waves, Greenpeace India, Keep Virginia Beautiful, Piedmont Environmental Council, Water.org, Solar on the White House, Greenpeace Akdeniz—Türkiye, Greenpeace USA, Oceana, Conservation International, Environmental Defense Fund, and Greenpeace International. If a user identity has endorsed any one of these specific "pages" within the electronic social networking platform, the application may consider the user identity to be a candidate for the environmentally aware psychographic profile and calculate a psychographic profile page score for the user identity. If the psychographic profile page score for the user identity is within a predefined top percentile (e.g., the top 25%) of psychographic profile page scores for all user identities identified as candidates for the environmentally aware psychographic profile, then the application may determine that the user identity belongs to the environmentally aware psychographic profile.

Various different techniques may be employed to determine if a user identity belongs to the charity minded psychographic profile. One particular example is described below. The charity minded psychographic profile may be defined as corresponding to "pages" categorized within the electronic social networking platform as cause, non-profit organizations, and non-governmental organization (NGO). If a user identity has endorsed any "page" within the electronic social networking platform categorized as belonging to any one of these categories, the application may consider the user identity to be a candidate for the charity minded psychographic profile and calculate a psychographic profile page score for the user identity. If the psychographic profile page score for the user identity is within a predefined top percentile (e.g., the top 20%) of psychographic profile page scores for all user identities identified as candidates for the charity minded psychographic profile, then the application may determine that the user identity belongs to the charity minded psychographic profile.

Various different techniques may be employed to determine if a user identity belongs to the shopping lovers psychographic profile. One particular example is described below. The shopping lovers psychographic profile may be defined as corresponding to "pages" categorized within the electronic social networking platform as clothing. If a user identity has endorsed any "page" within the electronic social networking platform categorized as belonging to the clothing category, the application may consider the user identity to be a candidate for the shopping lovers psychographic profile and calculate a psychographic profile page score for the user identity. If the psychographic profile page score for the user identity is within a predefined top percentile (e.g., the top 20%) of psychographic profile page scores for all user identities identified as candidates for the shopping lovers psychographic profile, then the application may determine that the user identity belongs to the shopping lovers psychographic profile.

Various different techniques may be employed to determine if a user identity belongs to the beverage lovers psychographic profile. One particular example is described below. The beverage lovers psychographic profile may be defined as corresponding to "pages" categorized within the electronic social networking platform as wine/spirits and drink. If a user identity has endorsed any "page" within the electronic social networking platform categorized as belonging to any one of these categories, the application may consider the user identity to be a candidate for the beverage lovers psychographic profile and calculate a psychographic profile page score for the user identity. If the psychographic profile page score for the user identity is within a predefined top percentile (e.g., the top 20%) of psychographic profile page scores for all user identities identified as candidates for the beverage lovers psychographic profile, then the application may determine that the user identity belongs to the beverage lovers psychographic profile.

Various different techniques may be employed to determine if a user identity belongs to the on-line shoppers psychographic profile. One particular example is described below. The on-line shoppers psychographic profile may be defined as corresponding to the following specific "pages": drugstore.com, Amazon.com, and eBay. If a user identity has endorsed any one of these specific "pages" within the electronic social networking platform, the application may consider the user identity to be a candidate for the on-line shoppers psychographic profile and calculate a psychographic profile page score for the user identity. If the psychographic profile page score for the user identity is within a predefined top percentile (e.g., the top 20%) of psychographic profile page scores for all user identities identified as candidates for the on-line shoppers psychographic profile, then the application may determine that the user identity belongs to the on-line shoppers psychographic profile.

As discussed above, an application that leverages an electronic social networking platform may process data extracted from the electronic social networking platform in an effort to glean intelligence about the users of the application and/or the other user identities of the electronic social networking platform who are members of the social networks of the users of the application.

FIGS. 5A-5D are diagrams of examples of GUIs 500, 508, and 538 provided by an example of an application that leverages an electronic social networking platform that may enable analysis of users of the application and/or other user identities of the electronic social networking platform who are members of the social networks of the users of the application based on information extracted from the electronic social networking platform by the application. The electronic social networking platform may correspond to the electronic social networking platform 402 illustrated and described above in connection with FIGS. 4A-4B, and the application that leverages the electronic social networking platform may correspond to the application hosted by computing system 404 illustrated and described above in connection with FIGS. 4A-4B.

Depending upon the application and the scope of the information that the application extracts from the electronic social networking platform, in some implementations, the analysis of user identities of the electronic social networking platform enabled by the application may be limited to analysis of user identities who also are users of the application. In other implementations, the application may enable analysis of user identities of the electronic social networking platform who are users of the application as well as user identities of the electronic social networking platform who are members of the social networks of the user identities who are users of the application. The discussion of the analysis of user identities of the electronic social networking platform enabled by the application that follows will not generally distinguish user identities of the electronic social networking platform who also are users of the application from user identities of the electronic social networking platform who are not also users of the application. Instead, the following discussion generally will focus on the analysis enabled by the application of user identities of the electronic social networking platform for whom the application extracts data from the electronic social networking platform irrespective of whether the user identities are users of the application or are members of the social networks of users of the application.

As discussed above, the application may extract a wide variety of different types of information from the electronic social networking platform for each user identity for whom the application extracts information from the electronic social networking platform. For example, for each user identity for whom the application extracts information from the electronic social networking platform, the application may extract (or attempt to extract) the following information: name; gender; birthday (and/or age); current city; hometown; relationship status; sexual orientation; primary language; employment history; education history; contact information (e.g., mailing address(es), e-mail address(es), phone number(s), etc.); interests recorded with the electronic social networking platform (e.g., by endorsing interest objects manifested as "pages"); "check-ins" registered with the electronic social networking platform; event information for events to which the user identity has been invited within the context of the electronic social networking platform; "status posts" published by the user identity to other user identities who are members of the user identity's social network and any related responsive comments and/or endorsements; and "wall posts" or "timeline posts" received by the user identity.

In some situations, the application may be unable to extract certain types of information from the electronic social networking platform for a particular user identity. In some cases, this may be due to the fact that the particular user identity has not supplied the desired type(s) of information to the electronic social networking platform. Alternatively, the particular user identity may have supplied the desired type(s) of information to the electronic social networking platform, but the application may not be authorized to extract the desired type(s) of information from the electronic social networking platform for the particular user identity (e.g., based on the particular user identity's privacy settings).

As described in greater detail below, the GUIs 500, 508, and 538 may enable comparison of (i) characteristics of user identities for whom data was extracted from the electronic social networking platform who have been identified as belonging to one psychographic profile based on data extracted from the electronic social networking platform to (ii) characteristics of user identities for whom data was extracted from the electronic social networking platform who have been identified as belonging to another psychographic profile based on data extracted from the electronic social networking platform.

Figure 5A:
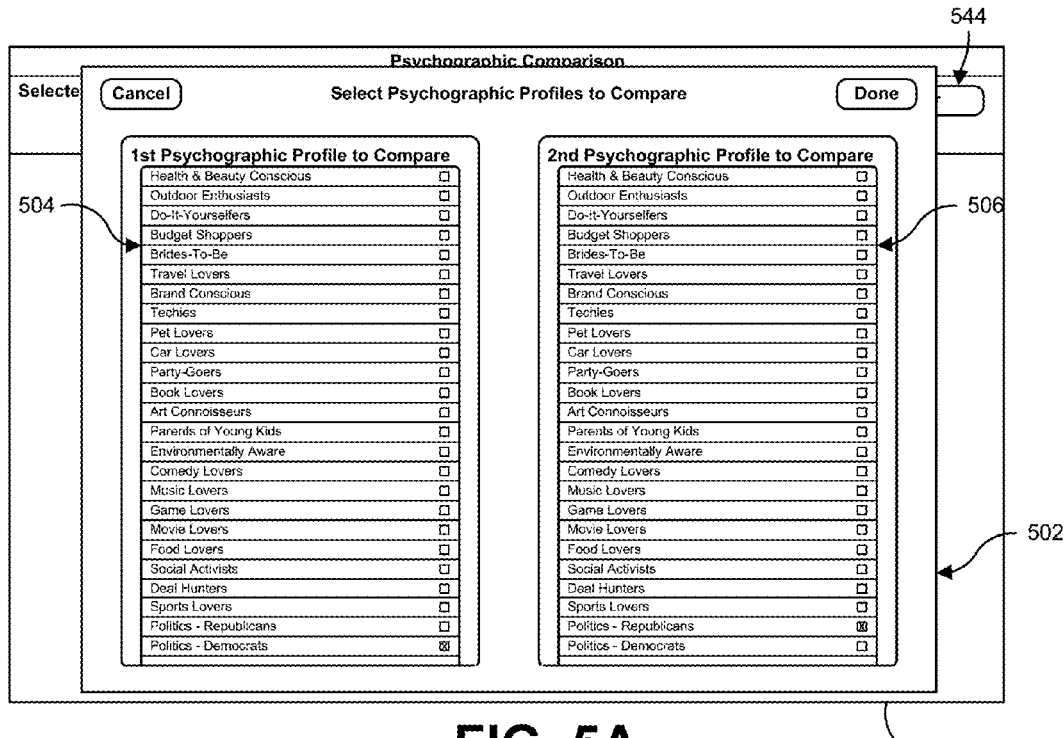
FIGS. 5A-5D, 6A-6F, and 7A-7B are diagrams of examples of GUIs for an application that leverages an electronic social networking platform that enables analysis of user identities of the electronic social networking platform.

Referring first to FIG. 5A, GUI 500 displays a pop-up window 502 that includes a first psychographic profile selection menu 504 and a second psychographic profile selection menu 506. Psychographic profile selection menus 504 and 506 enable a user to specify two different psychographic profiles for which the user desires to compare characteristics of the different user identities who have been identified as belonging to the psychographic profiles. In particular, as illustrated in FIG. 5A, psychographic profile selection menus 504 and 506 enable a user to select from among the following psychographic profiles: health and beauty conscious, outdoor enthusiasts, do-it-yourselfers, budget shoppers, brides-to-be, travel lovers, brand conscious, techies, pet lovers, car lovers, party-goers, book lovers, art connoisseurs, parents of young kids, environmentally aware, comedy lovers, music lovers, game lovers, movie lovers, food lovers, social activists, deal hunters, sports lovers, politics—Republicans, and politics—Democrats. In addition, GUI 500 is configured to enable a user to scroll the views of psychographic selection menus 504 and 506 to enable selection from among additional psychographic profiles including, for example, TV fans, religious people, frequent travelers, charity minded, shopping lovers, beverage lovers, and on-line shoppers.

Responsive to user selection of a first psychographic profile via psychographic profile selection menu 504, the application identifies the user identities for whom data was extracted from the electronic social networking platform who belong to the first psychographic profile. Similarly, responsive to user selection of a second psychographic profile via psychographic profile selection menu 506, the application identities the user identities for whom data was extracted from the electronic social networking platform who belong to the second psychographic profile. As illustrated in FIG. 5A, a user has selected the "politics—Democrats" psychographic profile with psychographic selection menu 504 and the "politics—Republicans" psychographic profile with psychographic selection menu 506.

Consequently, the application identifies the user identities for whom data was extracted from the electronic social networking platform who belong to the "politics—Democrats" psychographic profile and the user identities for whom data was extracted from the electronic social networking platform who belong to the "politics—Republicans" psychographic profile. In addition, the application identifies data about various different characteristics of the user identities identified as belonging to the "politics—Democrats" psychographic profile and the user identities identified as belonging to the "politics—Republicans" psychographic profile from among the data extracted from the electronic social networking platform. For example, among other data, the application may identify the gender, current residence, relationship status, and "page" endorsements for the user identities identified as belonging to the "politics—Democrats" psychographic profile as well as for the user identities identified as belonging to the "politics—Republicans" psychographic profile. In addition, the application may identify similar data for all user identities for whom data was extracted from the electronic social networking platform.

Figure 5B:
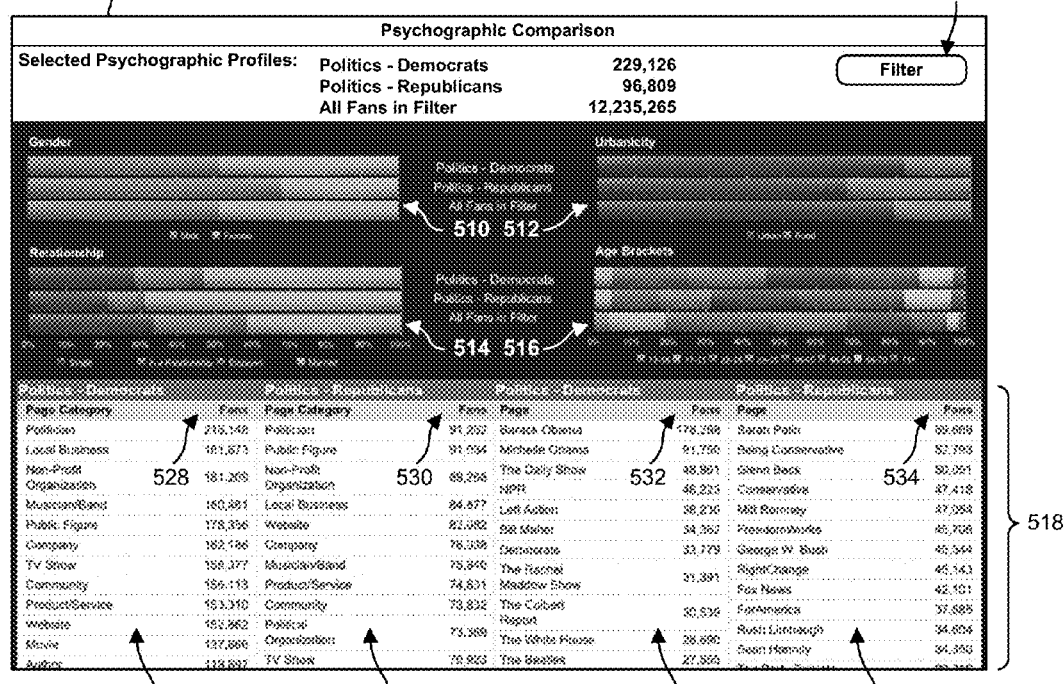
Figure 5C:
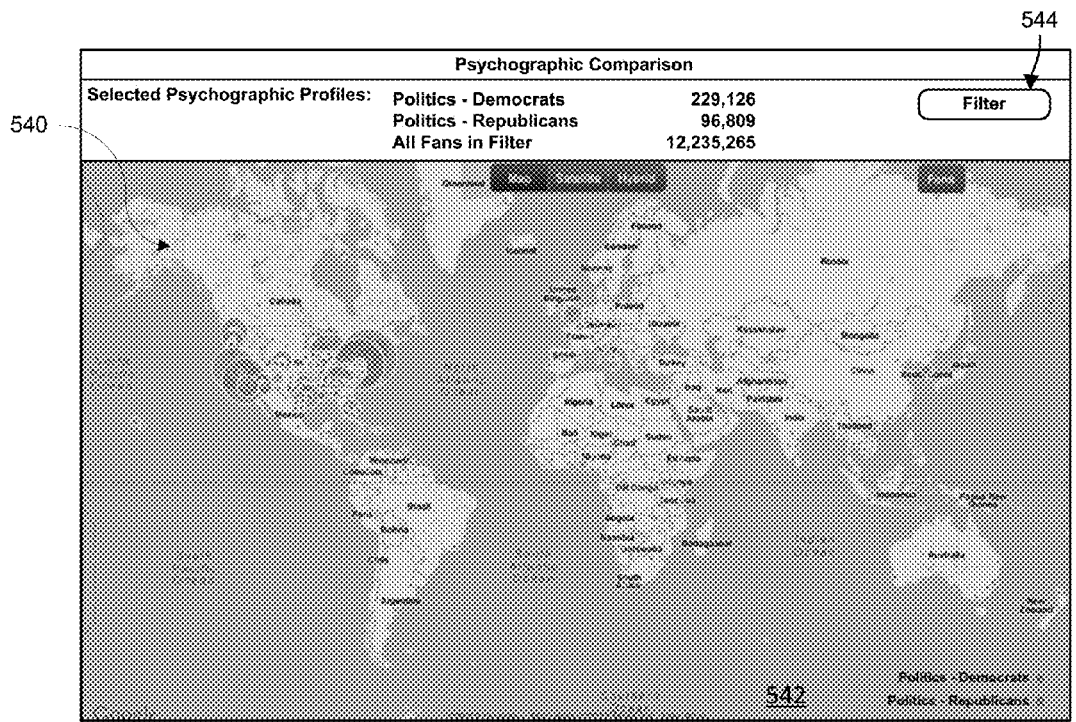

Thereafter, as illustrated in FIGS. 5B-5C, the application presents various different data about the segment of user identities who belong to the "politics—Democrats" psychographic profile, the segment of user identities who belong to the "politics—Republicans" psychographic profile, and the overall population of user identities for whom data was extracted from the electronic social networking platform, for example, to enable comparison of characteristics of the segment of user identities who belong to the "politics—Democrats" psychographic profile, the segment of user identities who belong to the "politics—Republicans" psychographic profile, and/or the overall population of user identities for whom data was extracted from the electronic social networking platform.

Referring now to FIG. 5B, GUI 508 presents aggregated statistics about various different characteristics of the segment of user identities who belong to the "politics—Democrats" psychographic profile, the segment of user identities who belong to the "politics—Republicans" psychographic profile, and the overall population of user identities for whom data was extracted from the electronic social networking platform. For starters, GUI 508 indicates that the application has extracted data from the electronic social networking platform for 12,235,265 different user identities and that, of these 12,235,265 different user identities, 229,126 user identities have been identified as belonging to the "politics—Democrats" psychographic profile while 96,809 user identities have been identified as belonging to the "politics—Republicans" psychographic profile.

In addition, GUI 508 includes a "Gender" panel 510 that provides graphical representations of (i) a breakdown by gender of the user identities who belong to the "politics—Democrats" psychographic profile (for whom gender data is available), (ii) a breakdown by gender of the user identities who belong to the "politics—Republicans" psychographic profile (for whom gender data is available), and (iii) a breakdown by gender of all of the user identities for whom data was extracted from the electronic social networking platform (for whom gender data is available). As illustrated in FIG. 5B, slightly more than 50% of the user identities who belong to the "politics—Democrats" psychographic profile are male, while just under 50% of the user identities who belong to the "politics—Democrats" psychographic profile are female. In comparison, approximately 67% of the user identities who belong to the "politics—Republicans" psychographic profile are male, while approximately 33% of the user identities who belong to the "politics—Republicans" psychographic profile are female. Furthermore, just over 50% of all of the user identities for whom data was extracted from the electronic social networking platform are male, while slightly less than 50% of all of the user identities for whom data was extracted from the electronic social networking platform are female.

GUI 508 also includes an "Urbanicity" panel 512 that provides graphical representations of (i) a breakdown of the user identities who belong to the "politics—Democrats" psychographic profile (for whom current residence data is available) according to whether the user identities currently reside in urban or rural locations, (ii) a breakdown of the user identities who belong to the "politics—Republicans" psychographic profile (for whom current residence data is available) according to whether the user identities currently reside in urban or rural locations, and (iii) a breakdown of all of the user identities for whom data was extracted from the electronic social networking platform (for whom current residence data is available) according to whether the user identities currently reside in urban or rural locations. As illustrated in FIG. 5B, slightly more than 80% of the user identities who belong to the "politics—Democrats" psychographic profile currently reside in urban locations, while slightly less than 20% of the user identities who belong to the "politics—Democrats" psychographic profile currently reside in rural locations. In comparison, slightly more than 65% of the user identities who belong to the "politics—Republicans" psychographic profile currently reside in urban locations, while slightly less than 35% of the user identities who belong to the "politics—Republicans" psychographic profile currently reside in rural locations. Furthermore, approximately 80% of all of the user identities for whom data was extracted from the electronic social networking platform currently reside in urban locations, while approximately 20% of all of the user identities for whom data was extracted from the electronic social networking platform currently reside in rural locations.

As described above, the current residence information for user identities extracted from the electronic social networking platform may not actually indicate whether the locations of current residence of the user identities are in urban or rural areas. Instead, the current residence information for user identities extracted from the electronic social networking platform may simply identify the current cities (and perhaps states/territories and/or countries) of residence of the user identities. As such, the application may employ intelligent mapping techniques, such as, for example, those described above, to the current cities (and perhaps states/territories and/or countries) of residence of the user identities extracted from the electronic social networking platform to determine whether the current locations of residence of the user identities are in urban or rural areas. In some cases, the application may not be able to determine whether a particular user identity's location of current residence is located in an urban or rural area based on the current residence information extracted from the electronic social networking platform for the particular user identity. In such cases, the application may not include data for the particular user identity in the statistics presented in the "Urbanicity" panel 512.

GUI 508 further includes a "Relationship Status" panel 514 that provides graphical representations of (i) a breakdown by relationship status of the user identities who belong to the "politics—Democrats" psychographic profile (for whom relationship status data is available), (ii) a breakdown by relationship status of the user identities who belong to the "politics—Republicans" psychographic profile (for whom relationship status data is available), and (iii) a breakdown by relationship status of all of the user identities for whom data was extracted from the electronic social networking platform (for whom relationship status data is available). As illustrated in FIG. 5B, slightly less than 30% of the user identities who belong to the "politics—Democrats" psychographic profile have a relationship status of "single," approximately 15% of the user identities who belong to the "politics—Democrats" psychographic profile have a relationship status of "in a relationship," slightly less than 5% of the user identities who belong to the "politics—Democrats" psychographic profile have a relationship status of "engaged," and slightly more than 50% of the user identities who belong to the "politics—Democrats" psychographic profile have a relationship status of "married." In comparison, slightly over 20% of the user identities who belong to the "politics—Republicans" psychographic profile have a relationship status of "single," slightly more than 5% of the user identities who belong to the "politics—Republicans" psychographic profile have a relationship status of "in a relationship," approximately 3% of the user identities who belong to the "politics—Republicans" psychographic profile have a relationship status of "engaged," and slightly less than 70% of the user identities who belong to the "politics—Republicans" psychographic profile have a relationship status of "married." Furthermore, approximately 33% of all of the user identities for whom data was extracted from the electronic social networking platform have a relationship status of "single," approximately 20% of all of the user identities for whom data was extracted from the electronic social networking platform have a relationship status of "in a relationship," slightly less than 5% of all of the user identities for whom data was extracted from the electronic social networking platform have a relationship status of "engaged," and slightly more than 40% of all of the user identities for whom data was extracted from the electronic social networking platform have a relationship status of "married."

GUI 508 also includes an "Age Bracket" panel 516 that provides graphical representations of (i) a breakdown by age bracket of the user identities who belong to the "politics—Democrats" psychographic profile (for whom age data is available), (ii) a breakdown by age bracket of the user identities who belong to the "politics—Republicans" psychographic profile (for whom age data is available), and (iii) a breakdown by age bracket of all of the user identities for whom data was extracted from the electronic social networking platform (for whom age data is available). As illustrated in FIG. 5B, less than 1% of the user identities who belong to the "politics—Democrats" psychographic profile are in the 13-16 year old age bracket, slightly less than 5% of the user identities who belong to the "politics—Democrats" psychographic profile are in the 17-21 year old age bracket, approximately 20% of the user identities who belong to the "politics—Democrats" psychographic profile are in the 22-29 year old age bracket, approximately 20% of the user identities who belong to the "politics—Democrats" psychographic profile are in the 29-35 year old age bracket, slightly more than 20% of the user identities who belong to the "politics—Democrats" psychographic profile are in the 36-45 year old age bracket, slightly less than 20% of the user identities who belong to the "politics—Democrats" psychographic profile are in the 46-58 year old age bracket, slightly less than 10% of the user identities who belong to the "politics—Democrats" psychographic profile are in the 59-70 year old age bracket, and approximately 3% of the user identities who belong to the "politics—Democrats" psychographic profile are older than 71. In comparison, less than 1% of the user identities who belong to the "politics—Republicans" psychographic profile are in the 13-16 year old age bracket, slightly less than 5% of the user identities who belong to the "politics—Republicans" psychographic profile are in the 17-21 year old age bracket, slightly more than 10% of the user identities who belong to the "politics—Republicans" psychographic profile are in the 22-28 year old age bracket, approximately 15% of the user identities who belong to the "politics—Republicans" psychographic profile are in the 29-35 year old age bracket, slightly less than 25% of the user identities who belong to the "politics—Republican" psychographic profile are in the 36-45 year old age bracket, slightly less than 30% of the user identities who belong to the "politics—Republicans" psychographic profile are in the 46-58 year old age bracket, approximately 10% of the user identities who belong to the "politics—Republicans" psychographic profile are in the 59-70 year old age bracket, and slightly less than 5% of the user identities who belong to the "politics—Republican" psychographic profile are older than 71. Furthermore, slightly less than 5% of all of the user identities for whom data was extracted from the electronic social networking platform are in the 13-16 year old age bracket, approximately 15% of all of the user identities for whom data was extracted from the electronic social networking platform are in the 17-21 year old age bracket, slightly less than 30% of all of the user identities for whom data was extracted from the electronic social networking platform are in the 22-28 year old age bracket, slightly more than 20% of all of the user identities for whom data was extracted from the electronic social networking platform are in the 29-35 year old age bracket, slightly more than 15% of all of the user identities for whom data was extracted from the electronic social networking platform are in the 36-45 year old age bracket, slightly less than 10% of all of the user identities for whom data was extracted from the electronic social networking platform are in the 46-58 year old age bracket, approximately 3% of all of the user identities for whom data was extracted from the electronic social networking platform are in the 59-70 year old age bracket, and approximately 2% of all of the user identities for whom data was extracted from the electronic social networking platform are older than 71. It will be understood that the age brackets illustrated in the "Age Bracket" panel 516 may be arbitrary, and that the application may use other age brackets instead. Moreover, in some implementations, the application actually may enable a user to configure the age brackets to be used within the "Age Bracket" panel 516. Furthermore, in some implementations, the application may display the average age of the user identities who belong to the "politics—Democrats" psychographic profile (for whom age data is available), the average age of the user identities who belong to the "politics—Republicans" psychographic profile (for whom age data is available), and the average age of all of the user identities for whom data was extracted from the electronic social networking platform (for whom age data is available).

GUI 508 further includes a "Popular Interest" panel 518. "Popular Interest" panel 518 has a first sub-panel 520 that presents a list of different categories of interests determined to be most popular among the user identities who belong to the "politics—Democrats" psychographic profile. In addition, "Popular Interest" panel 518 has a second sub-panel 522 that presents a list of different categories of interests determined to be most popular among the user identities who belong to the "politics—Republicans" psychographic profile. Furthermore, "Popular Interest" panel 518 has a third sub-panel 524 that presents a list of interests recorded with the electronic social networking platform (e.g., by endorsing "pages" hosted within the electronic social networking platform) by user identities who belong to the "politics—Democrats" psychographic profile determined to be most popular among the user identities who belong to the "politics—Democrats" psychographic profile. Finally, "Popular Interest" panel 518 has a fourth sub-panel 526 that presents a list of interests recorded with the electronic social networking platform (e.g., by endorsing "pages" hosted within the electronic social networking platform) by user identities who belong to the "politics—Republicans" psychographic profile determined to be most popular among the user identities who belong to the "politics—Republicans" psychographic profile.

As discussed above, sub-panel 520 presents a list of different categories of interests determined to be most popular among the user identities who belong to the "politics—Democrats" psychographic profile. The categories of interests listed in sub-panel 520 may correspond to categories assigned by the electronic social networking platform to "pages" hosted by the electronic social networking platform. For example, the electronic social networking platform may maintain its own taxonomy for categorizing "pages," and the application may determine categories of interests that are popular among the user identities who belong to the "politics—Democrats" psychographic profile by identifying categories of "pages" for which the user identities who belong to the "politics—Democrats" psychographic profile have endorsed relatively large numbers of "pages."

As illustrated in FIG. 5B, sub-panel 520 includes a "Fans" column 528 that indicates the number of endorsements of "pages" belonging to each "page" category listed in sub-panel 520 by user identities who belong to the "politics—Democrats" psychographic profile. As further illustrated in FIG. 5B, the categories of interests listed in sub-panel 520 are listed from top to bottom in descending order of the number of endorsements of "pages" belonging to each category by user identities who belong to the "politics—Democrats" psychographic profile. In some implementations, the application may identify the categories to list in sub-panel 520 by identifying some predefined number (e.g., 20) of the categories for which user identities who belong to the "politics—Democrats" psychographic profile have endorsed the greatest number of "pages."

Given screen real estate constraints, the view of sub-panel 520 displayed within GUI 508 may not include all of the categories of interests identified by the application as being most popular among the user identities who belong to the "politics—Democrats" psychographic profile. Therefore, GUI 508 may be configured to enable a user to scroll the view of sub-panel 520 to display additional categories of interests identified by the application as being popular among the user identities who belong to the "politics—Democrats" psychographic profile.

Like sub-panel 520, sub-panel 522 presents a list of different categories of interests determined to be most popular among the user identities who belong to the "politics—Republicans" psychographic profile. As illustrated in FIG. 5B, sub-panel 522 includes a "Fans" column 530 that indicates the number of endorsements of "pages" belonging to each "page" category listed in sub-panel 522 by user identities who belong to the "politics—Republicans" psychographic profile. As further illustrated in FIG. 5B, the categories of interests listed in sub-panel 522 are listed from top to bottom in descending order of the number of endorsements of "pages" belonging to each category by user identities who belong to the "politics—Republicans" psychographic profile. In some implementations, the application may identify the categories to list in sub-panel 522 by identifying some predefined number (e.g., 20) of the categories for which user identities who belong to the "politics—Republicans" psychographic profile have endorsed the greatest number of "pages."

Given screen real estate constraints, the view of sub-panel 522 displayed within GUI 508 may not include all of the categories of interests identified by the application as being most popular among the user identities who belong to the "politics—Republicans" psychographic profile. Therefore, GUI 508 may be configured to enable a user to scroll the view of sub-panel 522 to display additional categories of interests identified by the application as being popular among the user identities who belong to the "politics—Republicans" psychographic profile.

As discussed above, sub-panel 524 presents a list of interests recorded with the electronic social networking platform (e.g., by endorsing "pages" hosted within the electronic social networking platform) by user identities who belong to the "politics—Democrats" psychographic profile determined to be popular among the user identities who belong to the "politics—Democrats" psychographic profile. More particularly, sub-panel 524 includes a "Fans" column 532 that indicates the number of user identities who belong to the "politics—Democrats" psychographic profile who have endorsed each "page" listed in sub-panel 524. As illustrated in FIG. 5B, the "pages" listed in sub-panel 524 are listed from top to bottom in descending order of the number of user identities who have endorsed each "page." In some implementations, the application may identify the "pages" to list in sub-panel 524 by identifying some predefined number (e.g., 20) of the "pages"

endorsed by the greatest number of user identities who belong to the "politics—Democrats" psychographic profile.

Given screen real estate constraints, the view of sub-panel 524 displayed within GUI 508 may not include all of the "pages" identified by the application as being most popular among the user identities who belong to the "politics—Democrats" psychographic profile. Therefore, GUI 508 may be configured to enable a user to scroll the view of sub-panel 524 to display additional "pages" identified by the application as being popular among the user identities who belong to the "politics—Democrats" psychographic profile.

Like sub-panel 524, sub-panel 526 presents a list of interests recorded with the electronic social networking platform (e.g., by endorsing "pages" hosted within the electronic social networking platform) by user identities who belong to the "politics—Republicans" psychographic profile determined to be popular among the user identities who belong to the "politics—Republicans" psychographic profile. More particularly, sub-panel 526 includes a "Fans" column 534 that indicates the number of user identities who belong to the "politics—Republicans" psychographic profile who have endorsed each "page" listed in sub-panel 526. As illustrated in FIG. 5B, the "pages" listed in sub-panel 526 are listed from top to bottom in descending order of the number of user identities who have endorsed each "page." In some implementations, the application may identify the "pages" to list in sub-panel 526 by identifying some predefined number (e.g., 20) of the "pages" endorsed by the greatest number of user identities who belong to the "politics—Republicans" psychographic profile.

Given screen real estate constraints, the view of sub-panel 526 displayed within GUI 508 may not include all of the "pages" identified by the application as being most popular among the user identities who belong to the "politics—Republicans" psychographic profile. Therefore, GUI 508 may be configured to enable a user to scroll the view of sub-panel 526 to display additional "pages" identified by the application as being popular among the user identities who belong to the "politics—Republicans" psychographic profile.

In some implementations, the application may categorize interests recorded with the electronic social networking platform into different categories (e.g., Companies/Products, Travel, Games/Apps, General Entertainment, etc.). In such implementations, the application may present lists of interests recorded with the electronic social networking platform determined to be most popular among user identities who belong to the "politics—Democrats" psychographic profile and user identities who belong to the "politics—Republicans" psychographic profile within one or more of these different categories. For example, the application may present lists of the most popular interests recorded by user identities who belong to the "politics—Democrats" psychographic profile within the Companies/Products, Travel, Games/Apps, and/or General Entertainment categories. Similarly, the application also may present lists of the most popular interests recorded by user identities who belong to the "politics—Republicans" psychographic profile within the Companies/Products, Travel, Games/Apps, and/or General Entertainment categories.

In addition to the comparisons of the different characteristics of the user identities who belong to the "politics—Democrats" psychographic profile and the user identities who belong to the "politics—Republicans" psychographic profile illustrated and described above in connection with FIG. 5B, the application also may enable a comparison of the current locations of residence of the user identities who belong to the "politics—Democrats" psychographic profile to the current locations of residence of the user identities who belong to the "politics—Republicans" psychographic profile.

For example, referring now to FIG. 5C, GUI 538 presents a bubble chart 540 overlaying a map 542 that plots both (i) the number of user identities who belong to the "politics—Democrats" psychographic profile (for whom current residence data is available) as a function of the geographic locations of their current residences and (ii) the number of user identities who belong to the "politics—Republicans" psychographic profile (for whom current residence data is available) as a function of the geographic locations of their current residences. As illustrated in FIG. 5C, the user identities who belong to the "politics—Democrats" psychographic profile are represented by relatively light bubbles, and the user identities who belong to the "politics—Republicans" psychographic profile are represented by relatively dark bubbles. Furthermore, the size of a bubble plotted over a geographic location represents the number of user identities who belong to the corresponding psychographic profile who currently reside at the location, where larger bubbles represent greater numbers of user identities.

In some cases, a single city may be specified as the city of current residence both for user identities who belong to the "politics—Democrats" psychographic profile and for user identities who belong to the "politics—Republicans" psychographic profile. In such cases, in some implementations, the application may determine which psychographic profile has the greater number of user identities who have specified the city as their city of current residence and render (e.g., shade, color, etc.) the bubble plotted over the city in a manner that corresponds to the psychographic profile determined to have the greater number of user identities who have specified the city as their city of current residence. Responsive to user selection of the bubble plotted over the city, the application may display an informational window that presents indications of the number of user identities belonging to each psychographic profile who have specified the city as their city of current residence.

Figure 5D:
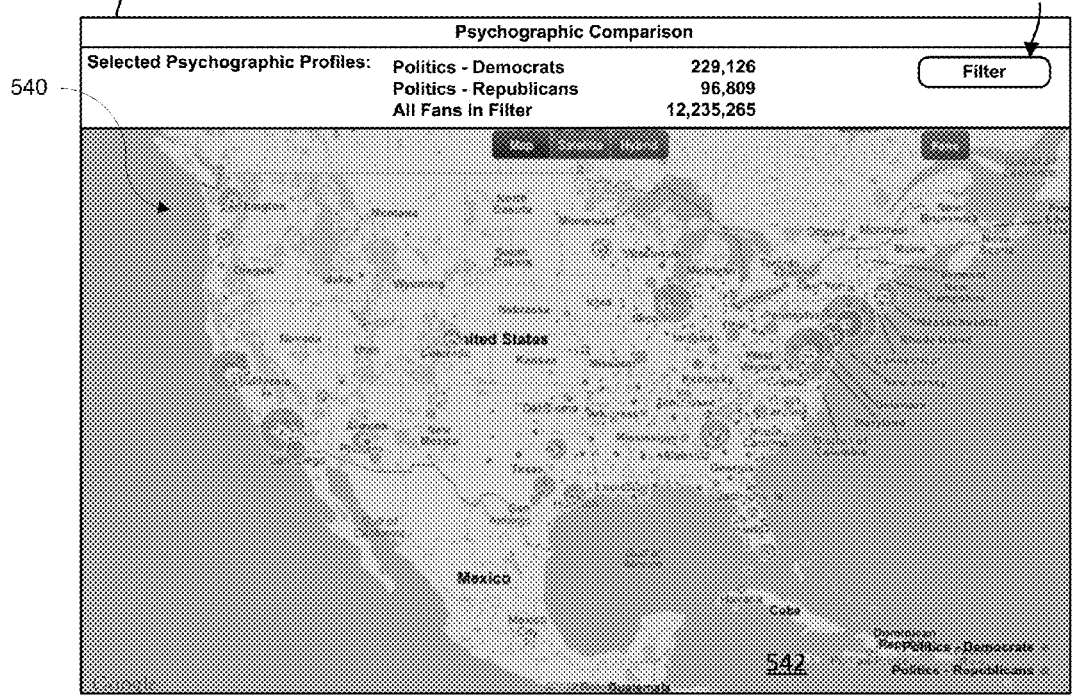

Furthermore, in some implementations, GUI 538 may be configured to enable zooming in and out on the map 542. For example, as illustrated in FIG. 5D, the view of the map 542 has been zoomed in to focus on the continental United States.

In addition to enabling the comparisons of the different characteristics of the user identities who belong to the "politics—Democrats" psychographic profile and the user identities who belong to the "politics—Republicans" psychographic profile illustrated and described above in connection with FIGS. 5B-5D, the application also may enable a comparison of other characteristics of the user identities who belong to the "politics—Democrats" psychographic profile and the user identities who belong to the "politics—Republicans" psychographic profile. For example, among other characteristics, the application may present breakdowns of the user identities who belong to the "politics—Democrats" psychographic profile and the user identities who belong to the "politics—Republicans" psychographic profile by education history (e.g., highest level of education completed, for instance, high school, college, graduate school, etc.), country of residence, metro area, and/or primary language. Additionally or alternatively, the application also may present estimated income information (e.g. average estimated income), estimated influence information (e.g., average estimated influence scores), and/or estimated popularity information (e.g., average estimated popularity scores) for the user identities who belong to the "politics—Democrats" psychographic profile and for the user identities who belong to the "politics—Republicans" psychographic profile.

In addition to enabling the comparison of characteristics of all of the user identities who belong to one psychographic profile to characteristics of all of the user identities who belong to another psychographic profile as illustrated and described above in connection with FIGS. 5A-5D, the application also may enable a user to apply filters to the two segments of user identities who belong to the different psychographic profiles, thereby enabling a comparison of characteristics of sub-segments of the user identities who belong to the different psychographic profiles who share one or more characteristics in common as defined by the filter(s). Furthermore, in some implementations, the application may enable a user to first apply one or more filters to the user identities to identify a subset of the user identities who share one or more characteristics in common. Thereafter, the user may specify psychographic profiles for which the user desires to compare the characteristics of the user identities who belong to the psychographic profiles.

Referring again to FIG. 5B, GUI 508 includes a selectable filter button 544. Responsive to actuation of selectable filter button 544 by a user, GUI 508 may cause a display of a menu of filter options to enable a user to specify one or more filters to be applied to the two segments of user identities who belong to the different psychographic profiles in order to define sub-segments of the user identities who belong to the different psychographic profiles who satisfy one or more characteristics defined by the filters specified by the user.

Figure 6A:
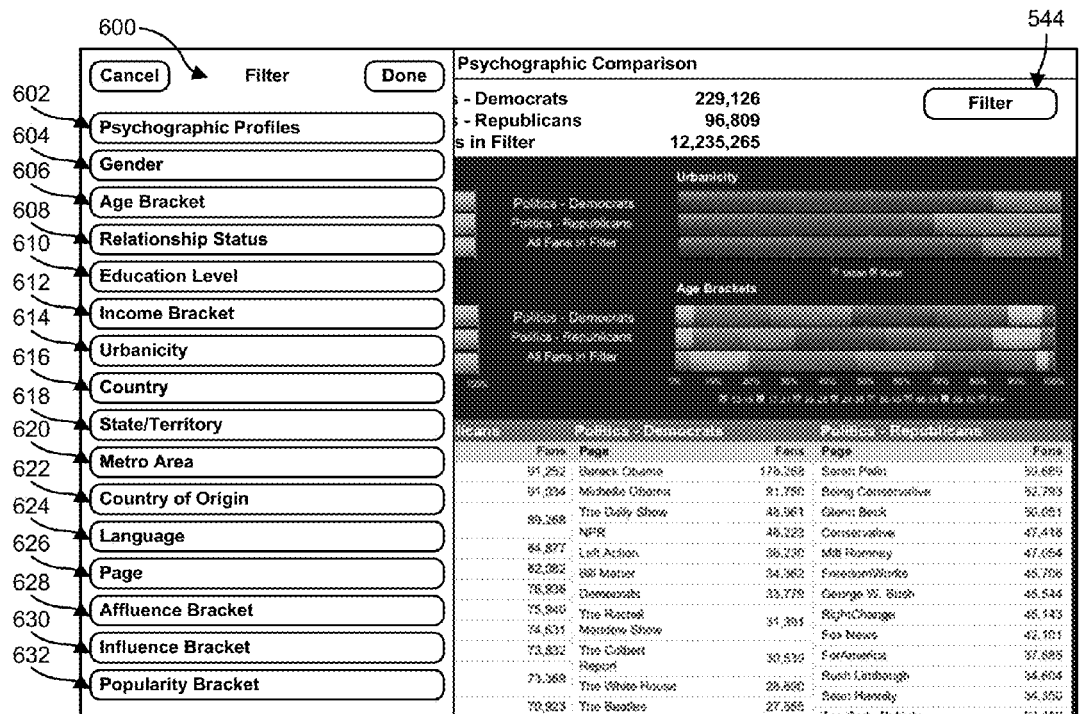

For example, referring now to FIG. 6A, responsive to actuation of selectable filter button 544 by a user, GUI 508 causes a display of a menu 600 of filter options. As illustrated in FIG. 6A, the menu 600 of filter options includes a selectable "psychographic profiles" filter option 602, a selectable gender filter option 604, a selectable age filter option 606, a selectable relationship status filter option 608, a selectable education level filter option 610, a selectable income bracket filter option 612, a selectable urbanicity filter option 614, a selectable country filter option 616, a selectable state/territory filter option 618, a selectable metro area filter option 620, a selectable country of origin filter option 622, a selectable language filter option 624, a selectable page filter option 626, a selectable affluence filter option 628, a selectable influence filter option 630, and a selectable popularity filter option 632. In response to user actuation of any of these selectable filter options 602, 604, 606, 608, 610, 612, 614, 616, 618, 620, 622, 624, 626, 628, 630, and 632, GUI 500 may display controls that enable a user identity to specify corresponding filters.

Figure 6B:
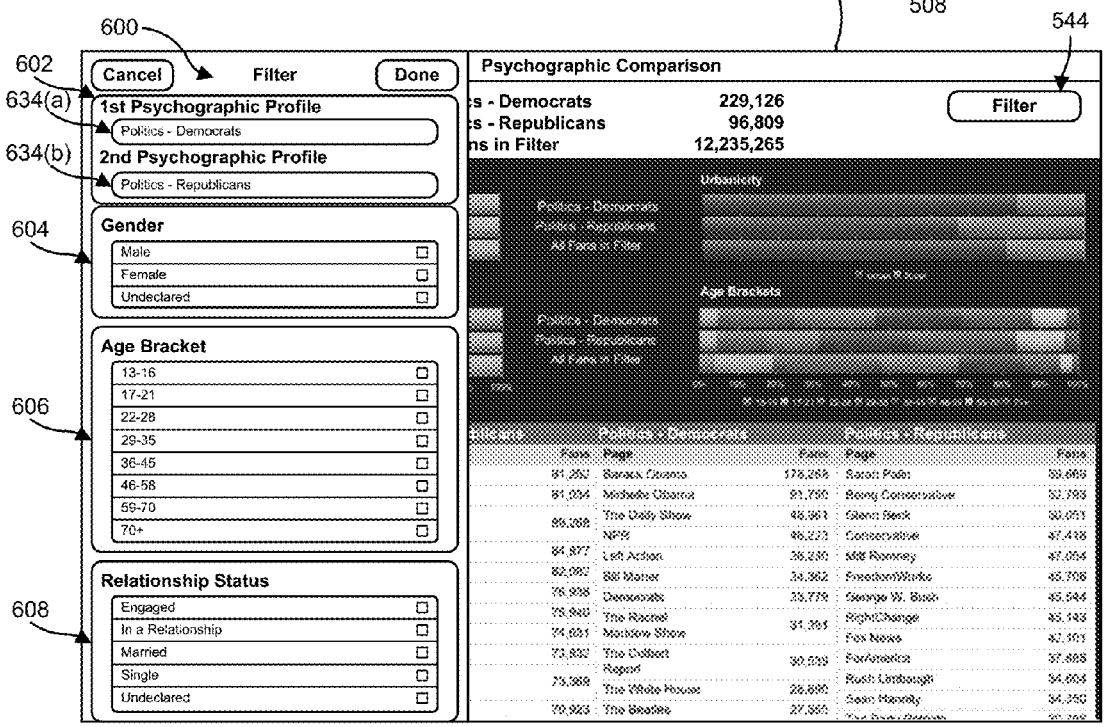

For example, referring now to FIG. 6B, responsive to user actuation of selectable psychographic profiles filter option 602, GUI 508 expands psychographic profiles filter option 602 to display a first psychographic profile specification field 634(a) and a second psychographic profile specification field 634(b). Psychographic profile specification fields 634(a) and 634(b) enable a user to specify different psychographic profiles for which the user desires to compare characteristics of the user identities who belong to the psychographic profiles. As illustrated in FIG. 6B, the user has maintained the "politics—Democrats" psychographic profile and the "politics—Republicans" psychographic profile as the two psychographic profiles for which the user desires to compare characteristics of the user identities who belong to the psychographic profiles.

Responsive to user actuation of selectable gender filter option 604, GUI 508 expands gender filter option 604 to display options (e.g., male, female, undeclared) for filtering the user identities belonging to the "politics—Democrats" and the "politics—Republicans" psychographic profiles by gender. In response to selection of any one or more of the options for filtering the user identities by gender, the application will include only those user identities who satisfy the selected gender options in the defined sub-segments of the user identities who belong to the "politics—Democrats" and the "politics—Republicans" psychographic profiles.

Responsive to actuation of selectable age filter option 606, GUI 508 expands age filter option 606 to display different age brackets for filtering the user identities belonging to the "politics—Democrats" and the "politics—Republicans" psychographic profiles by age. In response to selection of any one or more of the age brackets, the application will include only those user identities who fall into the selected age brackets in the defined sub-segments of the user identities who belong to the "politics—Democrats" and the "politics—Republicans" psychographic profiles. It will be appreciated that the age brackets illustrated in FIG. 6B are examples and that, in other implementations, other age brackets may be provided as filtering options.

Responsive to user actuation of selectable relationship status filter option 608, GUI 508 expands relationship status filter option to display options (e.g., engaged, in a relationship, married, single, undeclared) for filtering the user identities belonging to the "politics—Democrats" and the "politics—Republicans" psychographic profiles by relationship status. In response to selection of any one or more of the options for filtering the user identities by relationship status, the application will include only those user identities who satisfy the selected relationship status options in the defined sub-segments of the user identities who belong to the "politics—Democrats" and the "politics—Republicans" psychographic profiles.

Figure 6C:
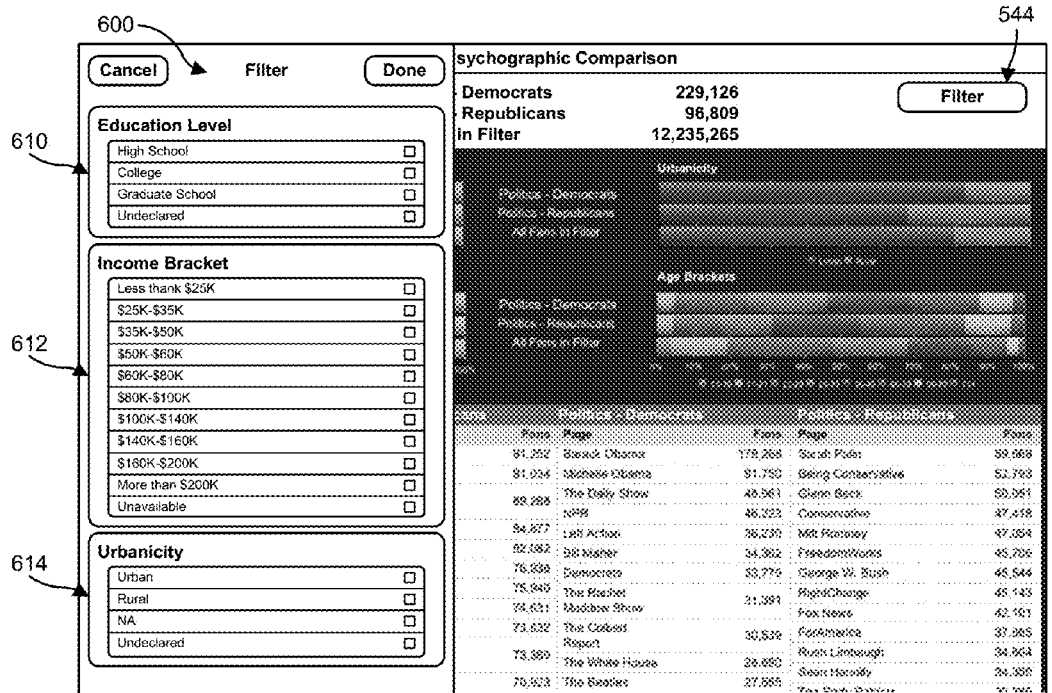

Referring now to FIG. 6C, responsive to user actuation of selectable education level filter option, GUI 508 expands education level filter option 610 to display options (e.g., high school, college, graduate school, undeclared) for filtering the user identities belonging to the "politics—Democrats" and the "politics—Republicans" psychographic profiles by education level. In response to selection of any one of the filter options for filtering the user identities by education level, the application will include those user identities whose highest level of education corresponds to the selected filter options in the defined sub-segments of the user identities who belong to the "politics—Democrats" and the "politics—Republicans" psychographic profiles. For example, in response to selection of high school as an education level filter, the application will include those user identities whose highest level of education is high school in the defined sub-segments of the user identities who belong to the "politics—Democrats" and the "politics—Republicans" psychographic profiles. Similarly, in response to selection of graduate school as an education level filter, the application will include those user identities whose highest level of education is graduate school in the defined sub-segments of the user identities who belong to the "politics—Democrats" and the "politics—Republicans" psychographic profiles.

Responsive to user actuation of selectable income bracket filter option 612, GUI 508 expands income bracket filter option 612 to display different income brackets for filtering the user identities belonging to the "politics—Democrats" and the "politics—Republicans" psychographic profiles by income. In response to selection of any one or more of the income brackets, the application will include only those user identities whose estimated incomes (e.g., calculated based on data extracted from the electronic social networking platform as described above) fall into the selected income brackets in the defined sub-segments of user identities who belong to the "politics—Democrats" and the "politics—Republicans" psychographic profiles. It will be appreciated that the income brackets illustrated in FIG. 6C are examples and that, in other implementations, other income brackets may be provided as filtering options.

Responsive to user actuation of selectable urbanicity filter option 614, GUI 508 expands urbanicity bracket filter option 614 to display different options (e.g., urban, rural, NA, undeclared) for filtering the user identities belonging to the "politics—Democrats" and the "politics—Republicans" psychographic profiles based on whether the application has determined their current residences to be in urban or rural areas (e.g., using the techniques described above). In response to selection of any one or more of the urbanicity filter options, the application will include only those user identities whose current residences satisfy the selected urbanicity filter options in the defined sub-segments of user identities who belong to the "politics—Democrats" and the "politics—Republicans" psychographic profiles.

Figure 6D:

Referring now to FIG. 6D, responsive to user actuation of selectable country filter option 616, GUI 508 expands country filter option 616 to display a country specification field 636. Country specification field 636 enables a user to specify one or more countries where user identities' current residences must be located in order for the application to include the user identities in the defined sub-segments of user identities who belong to the "politics—Democrats" and the "politics—Republicans" psychographic profiles.

Responsive to user actuation of selectable state/territory filter option 618, GUI 508 expands state/territory filter option 618 to display a state/territory specification field 638. State/territory specification field 638 enables a user to specify one or more states or territories where user identities' current residences must be located in order for the application to include the user identities in the defined sub-segments of user identities who belong to the "politics—Democrats" and the "politics—Republicans" psychographic profiles.

Responsive to user actuation of selectable metro area filter option 620, GUI 508 expands metro area filter option 620 to display a metro area specification field 640. Metro area specification field 640 enables a user to specify one or more metro areas where the application must have determined user identities' current residences to be located in order for the application to include the user identities in the defined sub-segments of user identities who belong to the "politics—Democrats" and the "politics—Republicans" psychographic segments.

Responsive to user actuation of selectable country of origin filter option 622, GUI 508 expands country of origin filter option 622 to display a country of origin specification field 642. Country of origin specification field 642 enables a user to specify one or more countries that user identities must have specified as their countries of origin in order for the application to include the user identities in the defined sub-segments of user identities who belong to the "politics—Democrats" and the "politics—Republicans" psychographic segments.

Responsive to user actuation of selectable language filter option 624, GUI 508 expands language filter option 624 to display a language specification field 644. Language specification field 644 enables a user to specify one or more languages that user identities must have specified as their primary languages in order for the application to include the user identities in the defined sub-segments of user identities who belong to the "politics—Democrats" and the "politics—Republicans" psychographic segments.

Responsive to user actuation of selectable "page" filter option 626, GUI 508 expands "page" filter option 626 to display a "page" specification field 646. "Page" specification field 646 enables a user to specify one or more "pages" hosted by the electronic social networking platform that user identities must have endorsed in order for the application to include the user identities in the defined sub-segments of user identities who belong to the "politics—Democrats" and the "politics—Republicans" psychographic segments.

Figure 6E:
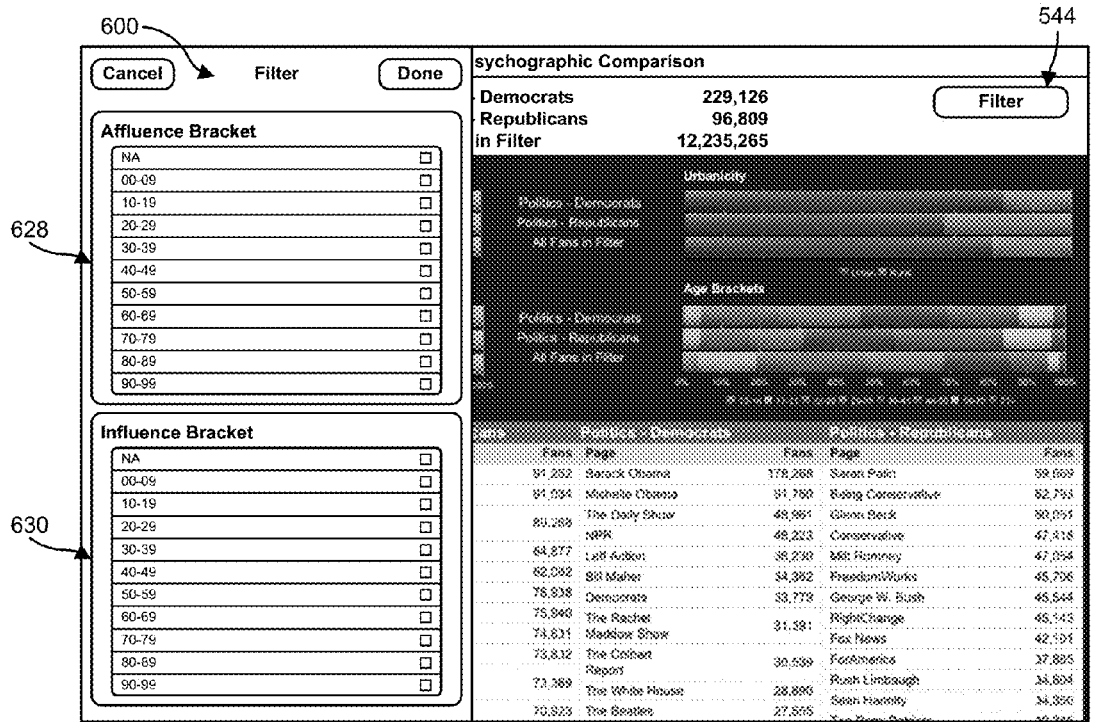

Referring now to FIG. 6E, responsive to user actuation of selectable affluence bracket filter option 628, GUI 508 expands affluence bracket filter option 628 to display different affluence brackets for filtering the user identities belonging to the "politics—Democrats" and the "politics—Republicans" psychographic profiles by affluence. In response to selection of any one or more of the affluence brackets, the application will include only those user identities whose estimated affluence (e.g., calculated based on data extracted from the electronic social networking platform as described above) falls into the selected affluence brackets in the defined sub-segments of user identities who belong to the "politics—Democrats" and the "politics—Republicans" psychographic profiles. It will be appreciated that the affluence brackets illustrated in FIG. 6E are examples and that, in other implementations, other affluence brackets may be provided as filtering options.

Responsive to user actuation of selectable influence bracket filter option 630, GUI 508 expands influence bracket filter option 630 to display different influence brackets for filtering the user identities belonging to the "politics—Democrats" and the "politics—Republicans" psychographic profiles by influence. In response to selection of any one or more of the influence brackets, the application will include those user identities whose estimated influence (e.g., calculated based on data extracted from the electronic social networking platform as described above) falls into the selected influence brackets in the defined sub-segments of user identities who belong to the "politics—Democrats" and the "politics—Republicans" psychographic profiles. It will be appreciated that the influence brackets illustrated in FIG. 6E are examples and that, in other implementations, other influence brackets may be provided as filtering options.

Figure 6F:
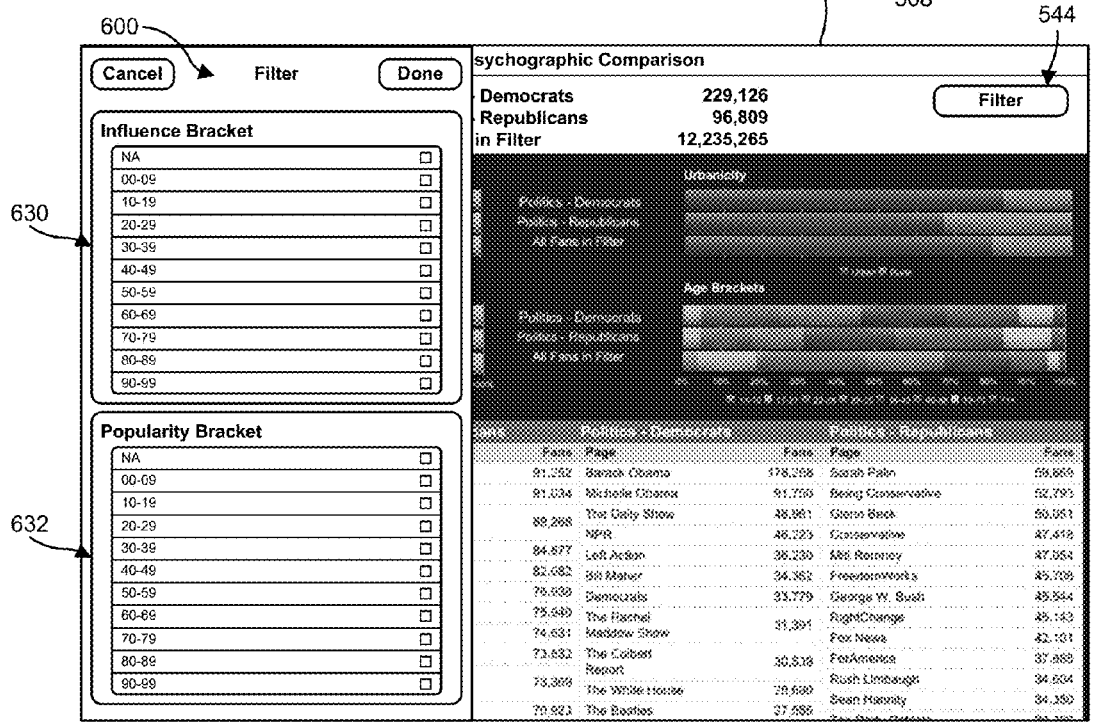

Referring now to FIG. 6F, responsive to user actuation of selectable popularity bracket filter option 632, GUI 508 expands popularity bracket filter option 632 to display different popularity brackets for filtering the user identities belonging to the "politics—Democrats" and the "politics—Republicans" psychographic profiles by popularity. In response to selection of any one or more of the popularity brackets, the application will include only those user identities whose estimated popularity (e.g., calculated based on data extracted from the electronic social networking platform as described above) falls into the selected popularity brackets in the defined sub-segments of user identities who belong to the "politics—Democrats" and the "politics—Republicans" psychographic profiles. It will be appreciated that the popularity brackets illustrated in FIG. 6F are examples and that, in other implementations, other popularity brackets may be provided as filtering options.

A variety of different options for filtering user identities belonging to different psychographic profiles have been described and illustrated above in connection with FIGS. 6A-6F. Any of these options may be used individually or in combination with any other option to filter the user identities belonging to the different psychographic profiles to define sub-segments of the user identities who belong to the different psychographic profiles. After sub-segments of the user identities who belong to the different psychographic profiles have been defined, the application may enable comparison of different characteristics of the user identities who belong to the defined sub-segments of the user identities who belong to the different psychographic profiles.

Figure 7A:
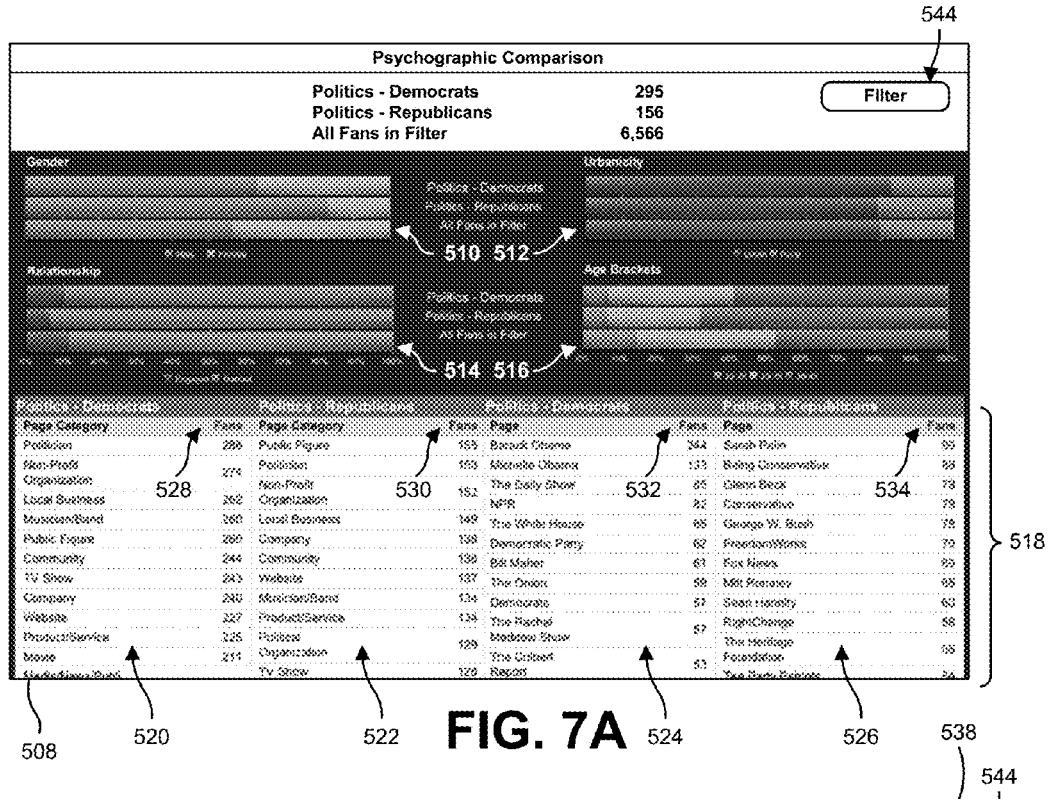
Figure 7B:
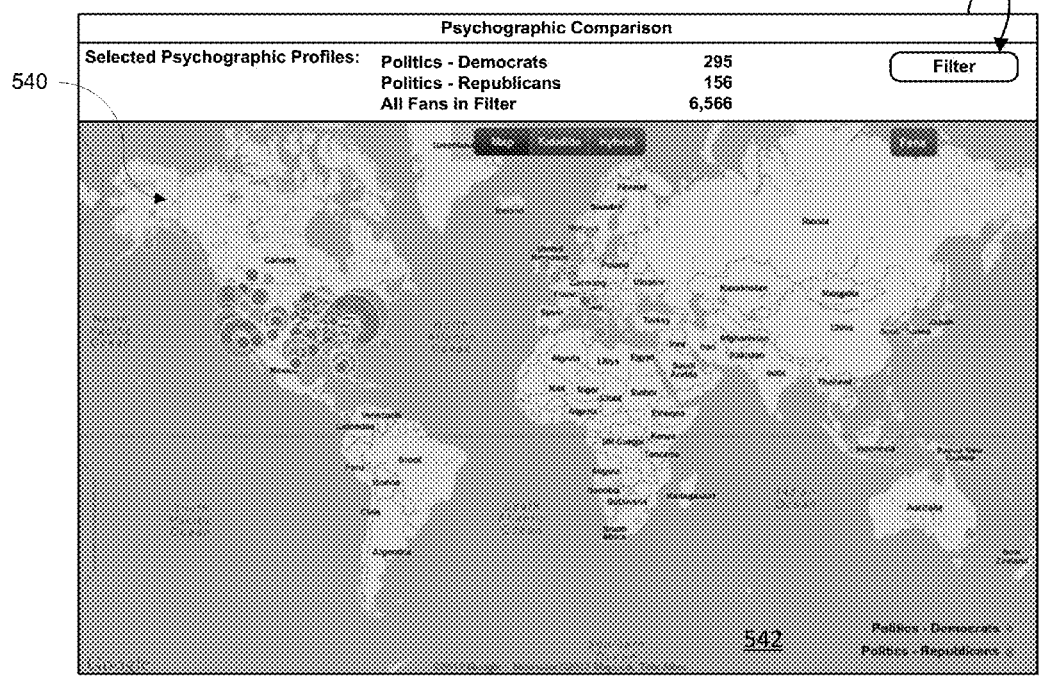

Consider as an example the scenario where a user of the application uses the filtering options to specify that the sub-segments of user identities who belong to the "politics—Democrats" and the "politics—Republicans" psychographic profiles should include user identities who fall into the age brackets 22-28, 29-35, or 36-45, who have a relationship status of engaged or married, who have an education level of college or graduate school, who have estimated incomes of $50,000-$60,000, $60,000-$80,000, $80,000-$100,000, or $100,000-$140,000, and who have popularity scores calculated by the application that fall into the popularity brackets 50-59, 60-69, 70-79, 80-89, and 90-99. As illustrated in FIGS. 7A-7B, responsive to user specification of these criteria for the sub-segments of the user identities who belong to the "politics—Democrats" and the "politics—Republicans" psychographic profiles, the application identifies the user identities who belong to the "politics—Democrats" and the "politics—Republicans" psychographic profiles who satisfy these criteria and updates GUIs 508 and 538 to enable comparison of different characteristics of the sub-segments of the user identities who belong to the "politics—Democrats" and the "politics—Republicans" psychographic profiles.

In particular, referring first to FIG. 7A, the application has updated GUI 508 to reflect that the segment of user identities who belong to the "politics—Democrats" psychographic profile includes 295 user identities who fall into the age brackets 22-28, 29-35, or 36-45, who have a relationship status of engaged or married, who have an education level of college or graduate school, who have estimated incomes of $50,000-$60,000, $60,000-$80,000, $80,000-$100,000, or $100,000-$140,000, and who have popularity scores calculated by the application that fall into the popularity brackets 50-59, 60-69, 70-79, 80-89, and 90-99. Similarly, the application has updated GUI 508 to reflect that the segment of user identities who belong to the "politics—Republicans" psychographic profile includes 156 user identities who fall into the age brackets 22-28, 29-35, or 36-45, who have a relationship status of engaged or married, who have an education level of college or graduate school, who have estimated incomes of $50,000-$60,000, $60,000-$80,000, $80,000-$100,000, or $100,000-$140,000, and who have popularity scores calculated by the application that fall into the popularity brackets 50-59, 60-69, 70-79, 80-89, and 90-99. Furthermore, the application has updated GUI 508 to reflect that there are a total of 6,566 user identities for whom the application extracted data from the electronic social networking platform who fall into the age brackets 22-28, 29-35, or 36-45, who have a relationship status of engaged or married, who have an education level of college or graduate school, who have estimated incomes of $50,000-$60,000, $60,000-$80,000, $80,000-$100,000, or $100,000-$140,000, and who have popularity scores calculated by the application that fall into the popularity brackets 50-59, 60-69, 70-79, 80-89, and 90-99.

The application also has updated the aggregated statistics about the various different demographic characteristics presented in "Gender" panel 510, "Urbanicity" panel 512, "Relationship Status" panel 514, and "Age Brackets" panel 516 of GUI 508 to reflect the demographic characteristics of the sub-segments of the user identities who belong to the "politics—Democrats" and "politics—Republicans" psychographic profiles who satisfy the filtering criteria. In addition, the application has updated the popular interest information presented in "Popular Interest" panel 518 to reflect the interests that are popular among the sub-segments of the user identities who belong to the "politics—Democrats" and the "politics—Republicans" psychographic profiles who satisfy the filtering criteria.

Referring now to FIG. 7B, the application has updated the bubble chart 540 of GUI 538 to plot (i) the number of user identities who belong to the "politics—Democrats" psychographic profile who satisfy the filtering criteria as a function of the geographic locations of their current residences and (ii) the number of user identities who belong to the "politics—Republicans" psychographic profile who satisfy the filtering criteria as a function of the geographic locations of their current residences.

Figure 8:
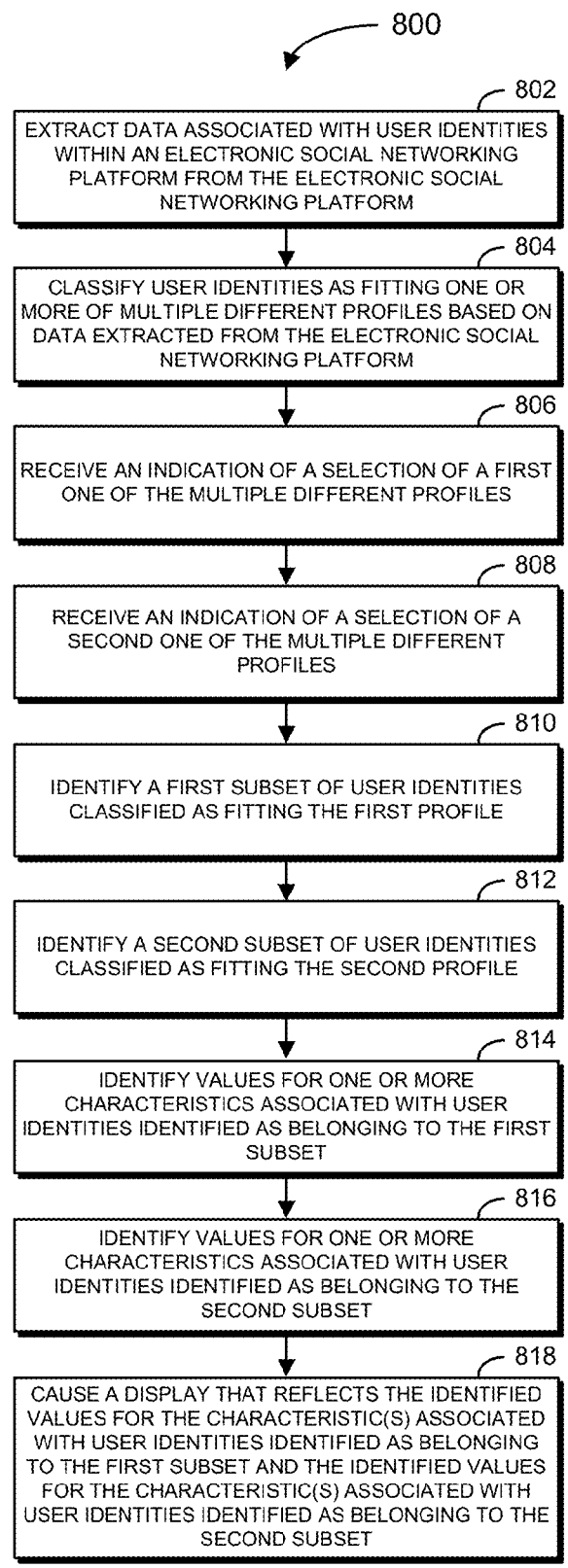
FIG. 8 is a flow chart that illustrates an example of a process.

FIG. 8 is a flow chart 800 that illustrates an example of a process for generating a display that enables comparison of characteristics of a first subset of user identities of an electronic social networking platform who have been identified as fitting a first profile (e.g., a first psychographic profile) to characteristics of a second subset of user identities of the electronic social networking platform who have been identified as fitting a second profile (e.g., a second psychographic profile). The process illustrated in the flow chart 800 of FIG. 8 may be performed by a computing system, such as, for example, computing system 404 of FIGS. 4A and 4B.

The computing system extracts data associated with user identities within an electronic social networking platform from the electronic social networking platform (802). For example, for each user identity within a set of user identities, the computing system may extract (or attempt to extract) from the electronic social networking platform some or all of the following types of data: name; gender; birthday (and/or age); current city; hometown; relationship status; sexual orientation; primary language; employment history; education history; contact information (e.g., mailing address(es), e-mail address(es), phone number(s), etc.); interests recorded with the electronic social networking platform (e.g., by endorsing interest objects manifested as "pages"); "check-ins" registered with the electronic social networking platform; event information for events to which the user identity has been invited within the context of the electronic social networking platform; "status posts" published by the user identity to other user identities who are members of the user identity's social network and any related responsive comments and/or endorsements; and "wall posts" or "timeline posts" received by the user identity. After extracting the data from the electronic social networking platform, the computing system may store the extracted data in a computer-readable storage device.

Based on the data extracted from the electronic social networking platform, the computing system classifies individual user identities for whom data was extracted from the electronic social networking platform as fitting one or more different profiles (804). For example, in some implementations, the computing system may classify individual user identities for whom data was extracted from the electronic social networking platform as fitting one or more different psychographic profiles based on the data extracted from the electronic social networking platform. In such implementations, the computing system may classify individual user identities for whom data was extracted from the electronic social networking platform as fitting one or more of the following psychographic profiles (e.g., according to the techniques described above): music lovers, movie lovers, TV fans, social activists, sports lovers, food lovers, book lovers, travel lovers, art connoisseurs, health and beauty conscious, game lovers, techies, comedy lovers, car lovers, brand conscious, religious people, outdoor enthusiasts, frequent travelers, do-it-yourselfers, party-goers, politics—Democrats, pet lovers, brides-to-be, budget shoppers, deal hunters, politics—Republicans, parents of young kids, environmentally aware, charity minded, shopping lovers, beverage lovers, and on-line shoppers.

The computing system receives an indication of a selection of a first one of the multiple different profiles (806), for example, for which a user desires to compare characteristics of user identities who have been identified as fitting the first profile to user identities who have been identified as fitting a second profile. In some implementations, the computing system may receive an indication of the first profile as a consequence of a user selecting the first profile from within a profile selection menu displayed within a GUI presented to the user, such as, for example, first profile selection menu 504 of GUI 500 illustrated in FIG. 5A.

The computing system also receives an indication of a selection of a second one of the multiple different profiles (808), for example, for which a user desires to compare characteristics of user identities who have been identified as fitting the second profile to user identities who have been identified as fitting the first profile. In some implementations, the computing system may receive an indication of the second profile as a consequence of a user selecting the second profile from within a profile selection menu displayed within a GUI presented to the user, such as, for example, second profile selection menu 506 of GUI 500 illustrated in FIG. 5A.

In response to receiving the indication of the selection of the first profile, the computing system identifies a first subset of the user identities who have been classified as fitting the first profile (810). Similarly, in response to receiving the indication of the selection of the second profile, the computing system identifies a second subset of the user identities who have been classified as fitting the second profile (812).

In addition to identifying the first subset of the user identities who have been classified as fitting the first profile, the computing system also identities values for one or more characteristics associated with user identities identified as belonging to the first subset (814). For example, in some implementations, among other characteristics, the computing system may identify one or more of the gender, city of current residence (including, in some cases, an indication of whether the city of current residence is located in an urban or rural area), relationship status, and age of individual user identities identified as belonging to the first subset. Furthermore, in some implementations, the computing system also may identify interests that user identities identified as belonging to the first subset of user identities have recorded with the electronic social networking platform.

Similarly, the computing system also identities values for one or more characteristics associated with user identities identified as belonging to the second subset (816). For example, in some implementations, among other characteristics, the computing system may identify one or more of the gender, city of current residence (including, in some cases, an indication of whether the city of current residence is located in an urban or rural area), relationship status, and age of individual user identities identified as belonging to the second subset. Furthermore, in some implementations, the computing system also may identify interests that user identities identified as belonging to the second subset of user identities have recorded with the electronic social networking platform.

Thereafter, the computing system causes a display that reflects the identified values for the one or more characteristics associated with user identities identified as belonging to the first subset of user identities and the identified values for the one or more characteristics associated with the user identities identified as belonging to the second subset of user identities (818). For example, as illustrated and described above in connection with FIGS. 5B-5D, the computing system may cause a display that reflects aggregated information about one or more of the gender, urbanicity of current residence, relationship status, age, and city of current residence of the user identities identified as belonging to the first subset of user identities as well as aggregated information about one or more of the gender, urbanicity of current residence, relationship status, age, and city of current residence of the user identities identified as belonging to the second subset of user identities. In some implementations, the computing system may cause the display on a display device communicatively coupled to the computing system itself. Additionally or alternatively, the computing system may transmit data to another computing device or system enabling the other computing device or system to render the display on a display device communicatively coupled to the other computing device or system.

A number of methods, techniques, systems, and apparatuses have been described. Nevertheless, various modifications may be made without departing from the scope of this disclosure. For example, although various disclosed techniques generally are described herein as being performed externally to an electronic social networking platform using data extracted from the electronic social networking platform, in some implementations, the techniques disclosed herein may be performed internally within an electronic social networking platform using data stored by the electronic social networking platform.

In addition, although one mechanism by which a user identity may record an interest with an electronic social networking platform that is described herein is to endorse a "page" hosted by the electronic social networking platform, there are other ways in which a user identity may record an interest with an electronic social networking platform. Furthermore, in some cases, a user identity may record an interest with an electronic social networking platform by endorsing a "page" that is not hosted by the electronic social networking platform. For example, in some cases, a user identity may record an interest with an electronic social networking platform by endorsing a web page or website that is external to the electronic social networking platform.

Moreover, while this disclosure generally tends to describe techniques for comparing characteristics of user identities who have been identified as belonging to different psychographic profiles in the context of comparing characteristics of user identities identified as belonging to a first psychographic profile to characteristics of user identities identified as belonging to a second psychographic profile, the techniques described herein are applicable to comparing characteristics of user identities identified as belonging to any number of different psychographic profiles. For example, the characteristics of user identities identified as belonging to any arbitrary number of n different psychographic profiles may be compared. In one particular example, the characteristics of user identities identified as belonging to a first psychographic profile, the characteristics of user identities identified as belonging to a second psychographic profile, the characteristics of user identities identified as belonging to a third psychographic profile, the characteristics of user identities identified as belonging to a fourth psychographic profile, and the characteristics of user identities identified as belonging to a fifth psychographic profile all may be compared.

The methods, techniques, systems, and apparatuses described herein may be implemented in digital electronic circuitry or computer hardware, for example, by executing instructions stored in tangible computer-readable storage media.

Apparatuses implementing these techniques may include appropriate input and output devices, a computer processor, and/or tangible computer-readable storage media storing instructions for execution by a processor.

A process implementing techniques disclosed herein may be performed by a processor executing instructions stored on a tangible computer-readable storage medium for performing desired functions by operating on input data and generating appropriate output. Suitable processors include, by way of example, both general and special purpose microprocessors. Suitable computer-readable storage devices for storing executable instructions include all forms of non-volatile memory, including, by way of example, semiconductor memory devices, such as Erasable Programmable Read-Only Memory (EPROM), Electrically Erasable Programmable Read-Only Memory (EEPROM), and flash memory devices; magnetic disks such as fixed, floppy, and removable disks; other magnetic media including tape; and optical media such as Compact Discs (CDs) or Digital Video Disks (DVDs). Any of the foregoing may be supplemented by, or incorporated in, specially designed application-specific integrated circuits (ASICs).

Although the operations of the disclosed techniques may be described herein as being performed in a certain order and/or in certain combinations, in some implementations, individual operations may be rearranged in a different order, combined with other operations described herein, and/or eliminated, and desired results still may be achieved. Similarly, components in the disclosed systems may be combined in a different manner and/or replaced or supplemented by other components and desired results still may be achieved.

What is claimed is:

1. A computer-implemented method comprising:
   for each user identity within a set of multiple user identities of an electronic social networking platform, extracting, from the electronic social networking platform, data associated with the user identity within the electronic social networking platform;
   classifying at least some of the user identities within the set of multiple user identities as fitting one or more of multiple different profiles based on the data extracted from the electronic social networking platform;
   receiving, from a user, an indication of a selection of a first e of the multiple different profiles;
   receiving, from a user, an indication of a selection of a second one of the multiple different profiles;
   identifying a first subset of user identities classified as fitting the first profile;
   identifying a second subset of user identities classified as fitting the second profile;
   identifying values for a particular characteristic associated with user identities identified as belonging to the first subset based on the data extracted from the electronic social networking platform;
   identifying values for the particular characteristic associated with user identities identified as belonging to the second subset based on the data extracted from the electronic social networking platform;
   identifying values for the particular characteristic associated with user identities from the set of multiple user identities based on the data extracted from the social networking platform;
   determining, for each value of the particular characteristic, a percentage of user identities identified as belonging to the first subset associated with the value of the particular characteristic;
   determining, for each value of the particular characteristic, a percentage of user identities identified as belonging to the second subset associated with the value of the particular characteristic;
   determining, for each value of the particular characteristic, a percentage of user identities identified as belonging to the set of multiple user identities associated with the value of the particular characteristic; and
   causing a display that reflects a comparison between (i) the percentage of user identities identified as belonging to the first subset associated with each value of the particular characteristic, (ii) the percentage of user identities identified as belonging to the second subset associated with each value of the particular characteristic, and (iii) the percentage of user identities identified as belonging to the set of multiple user identities associated with each value of the particular characteristic.

2. The method of claim 1 wherein classifying at least some of the user identities within the set of multiple user identities as fitting one or more of multiple different profiles based on the data extracted from the electronic social networking platform includes classifying at least some of the user identities within the set of multiple user identities as fitting one or more of multiple different psychographic profiles based on the data extracted from the electronic social networking platform.

3. The method of claim 2 wherein:
   extracting, from the electronic social networking platform for each user identity within the set of user identities, data associated with the user identity within the electronic social networking platform includes extracting, for each of at least some of the user identities within the set, indications of interests recorded with the electronic social networking platform by the user identity; and
   classifying at least some of the user identities within the set of multiple user identities as fitting one or more of multiple different psychographic profiles based on the data extracted from the electronic social networking platform includes classifying at least some of the user identities within the set of multiple user identities as fitting one or more of multiple different psychographic profiles based on interests recorded with the electronic social networking platform by the user identities.

4. The method of claim 2 wherein:
   extracting, from the electronic social networking platform for each user identity within the set of user identities, data associated with the user identity within the electronic social networking platform includes extracting, for each of at least some of the user identities within the set, indications of locations visited by the user identity that have been recorded with the electronic social networking platform; and
   classifying at least some of the user identities within the set of multiple user identities as fitting one or more of multiple different psychographic profiles based on the data extracted from the electronic social networking platform includes classifying at least some of the user identities within the set of multiple user identities as fitting one or more of multiple different psychographic profiles based on locations visited by the user identities that have been recorded with the electronic social networking platform.

5. The method of claim 2 wherein:
   extracting, from the electronic social networking platform for each user identity within the set of user identities, data associated with the user identity within the electronic social networking platform includes extracting, for each of at least some of the user identities within the set, an indication of the user identity's gender;
identifying values for a particular characteristic associated with user identities identified as belonging to the first subset includes identifying the genders of user identities identified as belonging to the first subset;
identifying values for the particular characteristic associated with user identities identified as belonging to the second subset includes identifying the genders of user identities identified as belonging to the second subset;
identifying values for the particular characteristic associated with user identities from the set of multiple user identities includes identifying the genders of user identities from the set of multiple user identities; and
causing a display that reflects a comparison between (i) the percentage of user identities identified as belonging to the first subset associated with each value of the particular characteristic, (ii) the percentage of user identities identified as belonging to the second subset associated with each value of the particular characteristic, and (iii) the percentage of user identities identified as belonging to the set of multiple user identities associated with each value of the particular characteristic includes causing a display that reflects the genders of the user identities identified as belonging to the first subset, the genders of the user identities identified as belonging to the second subset, and the genders of the user identities from the set of multiple user identities.

6. The method of claim 2 wherein:
extracting, from the electronic social networking platform for each user identity within the set of user identities, data associated with the user identity within the electronic social networking platform includes extracting, for each of at least some of the user identities within the set, an indication of the user identity's relationship status;
identifying values for a particular characteristic associated with user identities identified as belonging to the first subset includes identifying the relationship statuses of user identities identified as belonging to the first subset;
identifying values for the particular characteristic associated with user identities identified as belonging to the second subset includes identifying the relationship statuses of user identities identified as belonging to the second subset;
identifying values for the particular characteristic associated with user identities from the set of multiple user identities includes identifying the relationship statuses of user identities from the set of multiple user identities; and
causing a display that reflects a comparison between (i) the percentage of user identities identified as belonging to the first subset associated with each value of the particular characteristic, (ii) the percentage of user identities identified as belonging to the second subset associated with each value of the particular characteristic, and (iii) the percentage of user identities identified as belonging to the set of multiple user identities associated with each value of the particular characteristic includes causing a display that reflects the relationship statuses of the user identities identified as belonging to the first subset, the relationship statuses of the user identities identified as belonging to the second subset, and the relationship statuses of the user identities from the set of multiple user identities.

7. The method of claim 2 wherein:
extracting, from the electronic social networking platform for each user identity within the set of user identities, data associated with the user identity within the electronic social networking platform includes extracting, for each of at least sonic of the user identities within the set, an indication of the user identity's city of current residence;
identifying values for a particular characteristic associated with user identities identified as belonging to the first subset includes identifying the cities of current residence of user identities identified as belonging to the first subset;
identifying values for the particular characteristic associated with user identities identified as belonging to the second subset includes identifying the cities of current residence of user identities identified as belonging to the second subset;
identifying values for the particular characteristic associated with user identities from the set of multiple user identities includes identifying the cities of current residence of user identities from the set of multiple user identities; and
causing a display that reflects a comparison between (i) the percentage of user identities identified as belonging to the first subset associated with each value of the particular characteristic, (ii) the percentage of user identities identified as belonging to the second subset associated with each value of the particular characteristic, and (iii) the percentage of user identities identified as belonging to the set of multiple user identities associated with each value of the particular characteristic includes causing a display that reflects the cities of current residence of the user identities identified as belonging to the first subset, the cities of current residence of the user identities identified as belonging to the second subset, and the cities of current residence of the user identities from the set of multiple user identities.

8. The method of claim 2 wherein:
extracting, from the electronic social networking platform for each user identity w the set of user identities, data associated with the user identity within the electronic social networking platform includes extracting, for each of at least some of the user identities within the set, an indication of the user identity's city of current residence;
identifying values for a particular characteristic associated with user identities identified as belonging to the first subset includes:
    identifying a first number of user identities from among the first subset who live in urban areas based on the indications of user identities' cities of current residence extracted from the electronic social networking platform, and
    identifying a second number of user identities from among the first subset who live in rural areas based on the indications of user identities' cities of current residence extracted from the electronic social networking platform;
identifying values for the particular characteristic associated with user identities identified as belonging to the second subset includes:
    identifying a third number of user identities from among the second subset who live in urban areas based on the indications of user identities' cities of current residence extracted from the electronic social networking platform, and identifying a fourth number of user identities from among the second subset who live in rural areas based on the indications of user identities' cities of current residence extracted from the electronic social networking platform;

identifying values for the particular characteristic associated with user identities from the set of multiple user identities includes:

identifying a fifth number of user identities from among the user identities from the set of multiple user identities who live in urban areas based on the indications of user identities' cities of current residence extracted from the electronic social networking platform, and identifying a sixth number of user identities from among the user identities from the set of multiple user identities who live in rural areas based on the indications of user identities' cities of current residence extracted from the electronic social networking platform; and causing a display that reflects a comparison between (i) the percentage of user identities identified as belonging to the first subset associated with each value of the particular characteristic, (ii) the percentage of user identities identified as belonging to the second subset associated with each value of the particular characteristic, and (iii) the percentage of user identities identified as belonging to the set of multiple user identities associated with each value of the particular characteristic includes causing a display that reflects the first number of user identities from among the first subset who live in urban areas, the second number of user identities from among the first subset who live in rural areas, the third number of user identities from among the second subset who live in urban areas, the fourth number of user identities from among the second subset who live in rural areas, the fifth number of user identities from among the user identities from the set of multiple user identities who live in rural areas, and the sixth number of user identities from among the user identities from the set of multiple user identities who live in urban areas.

9. The method of claim 2 wherein:

extracting, from the electronic social networking platform for each user identity within the set of user identities, data associated with the user identity within the electronic social networking platform includes extracting, for each of at least some of the user identities within the set, an indication of the user identity's age;

identifying values for a particular characteristic associated with user identities identified as belonging to the first subset includes identifying the ages of user identities identified as belonging to the first subset;

identifying values for the particular characteristic associated with user identities identified as belonging to the second subset includes identifying the ages of user identities identified as belonging to the second subset;

identifying values for the particular characteristic associated with user identities from the set of multiple user identities includes identifying the ages of user identities identified as belonging to the set of multiple user identities; and causing a display that reflects a comparison between (i) the percentage of user identities identified as belonging to the first subset associated with each value of the particular characteristic, (ii) the percentage of user identities identified as belonging to the second subset associated with each value of the particular characteristic, and (iii) the percentage of user identities identified as belonging to the set of multiple user identities associated with each value of the particular characteristic includes causing a display that reflects the ages of the user identities identified as belonging to the first subset, the ages of the user identities identified as belonging to the second subset, and the ages of the user identities identified as belonging to the set of multiple user identities.

10. The method of claim 2 wherein:

extracting, from the electronic social networking platform for each user identity within the set of user identities, data associated with the user identity within the electronic social networking platform includes extracting, for each of at least some of the user identities within the set, indications of interests recorded with the electronic social networking platform by the user identity;

the method further comprises:

based on the indications of interests recorded with the electronic social networking platform extracted from the electronic social networking platform, identifying categories of interests recorded with the electronic social networking platform by user identities identified as belonging to the first subset that are popular among the user identities identified as belonging to the first subset, and based on the indications of interests recorded with the electronic social networking platform extracted from the electronic social networking platform, identifying categories of interests recorded with the electronic social networking platform by user identities identified as belonging to the second subset that are popular among the user identities identified as belonging to the second subset; and causing a display that reflects a comparison between (i) the percentage of user identities identified as belonging to the first subset associated with each value of the particular characteristic, (ii) the percentage of user identities identified as belonging to the second subset associated with each value of the particular characteristic, and (iii) the percentage of user identities identified as belonging to the set of multiple user identities associated with each value of the particular characteristic includes causing a display that reflects categories of interests identified as being popular among the user identities identified as belonging to the first subset and categories of interests identified as being popular among the user identities identified as belonging to the second subset in addition to the identified values for the particular characteristic associated with user identities identified as belonging to the first subset and the identified values for the particular characteristic associated with user identities identified as belonging to the second subset.

11. The method of claim 2 wherein:

extracting, from the electronic social networking platform for each user identity within the set of user identities, data associated with the user identity within the electronic social networking platform includes extracting, for each of at least some of the user identities within the set, indications of interests recorded with the electronic social networking platform by the user identity;

the method further comprises:

based on the indications of interests recorded with the electronic social networking platform extracted from the electronic social networking platform, identifying interests recorded with the electronic social networking platform by user identities identified as belonging to the first subset that are popular among the user identities identified as belonging to the first subset, and based on the indications of interests recorded with the electronic social networking platform extracted from the electronic social networking platform, identifying interests recorded with the electronic social networking platform by user identities identified as belonging to the second subset that are popular among the user identities identified as belonging to the second subset; and causing a display that reflects a comparison between (i) the percentage of user identities identified as belonging to the first subset associated with each value of the particular characteristic, (ii) the percentage of user identities identified as belonging to the second subset associated with each value of the particular characteristic, and (iii) the percentage of user identities identified as belonging to the set of multiple user identities associated with each value of the particular characteristic includes causing a display that reflects interests identified as being popular among the user identities identified as belonging to the first subset and interests identified as being popular among the user identities identified as belonging to the second subset in addition to the identified values for the particular characteristic associated with user identities identified as belonging to the first subset and the identified values for the particular characteristic associated with user identities identified as belonging to the second subset.

12. The method of claim 2 wherein:

identifying values for a particular characteristic associated with user identities identified as belonging to the first subset includes identifying values for multiple characteristics associated with user identities identified as belonging to the first subset;

identifying values for a particular characteristic associated with user identities identified as belonging to the second subset includes identifying values for the multiple characteristics associated with user identities identified as belonging to the second subset;

identifying values for the particular characteristic associated with user identities from the set of multiple user identities includes identifying values for the multiple characteristics associated with user identities identified as belonging to the set of multiple user identities; and causing a display that reflects a comparison between (i) the percentage of user identities identified as belonging to the first subset associated with each value of the particular characteristic, (ii) the percentage of user identities identified as belonging to the second subset associated with each value of the particular characteristic, and (ii) the percentage of user identities identified as belonging to the set of multiple user identities associated with each value of the particular characteristic includes causing a display that reflects the identified values for the multiple characteristics associated with user identities identified as belonging to the first subset, the identified values for the multiple characteristics associated with user identities identified as belonging to the second subset, and the identified values for the multiple characteristics associated with user identities identified as belonging to the set of multiple user identities.

13. A non-transitory computer-readable storage medium storing instructions that, when executed, cause a computing system to:

extract, from an electronic social networking platform for each user identity within a set of multiple user identities of the electronic social networking platform, data associated with the user identity within the electronic social networking platform;

classify at least some of the user identities within the set of multiple user identities as fitting one or more of multiple different psychographic profiles based on the data extracted from the electronic social networking platform;

process an indication that is received from a user of a selection of a first one of the multiple different psychographic profiles;

process an indication that is received from a user of a selection of a second one of the multiple different psychographic profiles;

identify a first subset of user identities classified as fitting the first psychographic profile;

identify a second subset of user identities classified as fitting the second psychographic file;

identify values for a particular characteristic associated with user identities identified as belonging to the first subset based on the data extracted from the electronic social networking platform;

identify values for the particular characteristic associated with user identities identified as belonging to the second subset based on the data extracted from the electronic social networking platform;

identify values for the particular characteristic associated with user identities from the set of multiple user identities based on the data extracted from the social networking platform;

determine, for each value of the particular characteristic, a percentage of user identities identified as belonging to the first subset associated with the value of the particular characteristic;

determine, for each value of the particular characteristic, a percentage of user identities identified as belonging to the second subset associated with the value of the particular characteristic;

determine, for each value of the particular characteristic, a percentage of user identities identified as belonging to the set of multiple user identities associated with the value of the particular characteristic; and cause a display that reflects a comparison between (i) the percentage of user identities identified as belonging to the first subset associated with each value of the particular characteristic, (ii) the percentage of user identities identified as belonging to the second subset associated with each value of the particular characteristic, and (iii) the percentage of user identities identified as belonging to the set of multiple user identities associated with each value of the particular characteristic.

14. The non-transitory computer-readable storage medium of claim 13 wherein:

the instructions that, when executed, cause a computing system to extract, from an electronic social networking platform for each user identity within a set of multiple user identities of the electronic social networking platform, data associated with the user identity within the electronic social networking platform include instructions that, when executed, cause a computing system to extract, from an electronic social networking platform for each of at least some of the user identities within the set, indications of interests recorded with the electronic social networking platform by the user identity; and the instructions that, when executed, cause a computing system to classify at least some of the user identities within the set of multiple user identities as fitting one or more of multiple different psychographic profiles based on the data extracted from the electronic social networking platform include instructions that, when executed, cause the computing system to classify at least some of the user identities within the set of multiple user identities as fitting one or more of multiple different psychographic profiles based on interests recorded with the electronic social networking platform by the user identities.

15. The non-transitory computer-readable storage medium of claim 13 wherein:
the instructions that, when executed, cause a computing system to extract, from an electronic social networking platform for each user identity within a set of multiple user identities of the electronic social networking platform, data associated with the user identity within the electronic social networking platform include instructions that, when executed, cause a computing system to extract, from an electronic social networking platform for each of at least some of the user identities within the set, indications of locations visited by the user identity that have been recorded with the electronic social networking platform; and
the instructions that, when executed, cause a computing system to classify at least some of the user identities within the set of multiple user identities as fitting one or more of multiple different psychographic profiles based on the data extracted from the electronic social networking platform include instructions that, when executed, cause the computing system to classify at least some of the user identities within the set of multiple user identities as fitting one or more of multiple different psychographic profiles based on locations visited by the user identities that have been recorded with the electronic social networking platform.

16. A system comprising:
one or more processing elements; and
computer-readable storage media storing instructions that, when executed by the one or more processing elements, cause the computing system to:
extract, from an electronic social networking platform for each user identity within a set of multiple user identities of the electronic social networking platform, data associated with the user identity within the electronic social networking platform;
classify at least some of the user identities within the set of multiple user identities as fitting one or more of multiple different psychographic profiles based on the data extracted from the electronic social networking platform;
process an indication that is received from a user of a selection of a first one of the multiple different psychographic profiles;
process an indication that is received from a user of a selection of a second one of the multiple different psychographic profiles;
identify a first subset of user identities classified as fitting the first psychographic profile;
identify a second subset of user identities classified as fitting the second psychographic profile;
identify values for a particular characteristic associated with user identities identified as belonging to the first subset based on the data extracted from the electronic social networking platform;
identify values for the particular characteristic associated with user identities identified as belonging to the second subset based on the data extracted from the electronic social networking platform;
identify values for the particular characteristic associated with user identities from the set of multiple user identities based on the data extracted from the social networking platform;
determine, for each value of the particular characteristic, a percentage of user identities identified as belonging to the first subset associated with the value of the particular characteristic;
determine, for each value of the particular characteristic, a percentage of user identities identified as belonging to the second subset associated with the value of the particular characteristic;
determine, for each value of the particular characteristic, a percentage of user identities identified as belonging to the set of multiple user identities associated with the value of the particular characteristic; and
cause a display that reflects a comparison between (i) the percentage of user identities identified as belonging to the first subset associated with each value of the particular characteristic, (ii) the percentage of user identities identified as belonging to the second subset associated with each value of the particular characteristic, and (iii) the percentage of user identities identified as belonging to the set of multiple user identities associated with each value of the particular characteristic.

17. The system of claim 16 wherein:
the instructions that, when executed by the one or more processing elements, cause the computing system to extract, from an electronic social networking platform for each user identity within a set of multiple user identities of the electronic social networking platform, data associated with the user identity within the electronic social networking platform include instructions that, when executed by the one or more processing elements, cause the computing system to extract, from an electronic social networking platform for each of at least some of the user identities within the set, indications of interests recorded with the electronic social networking platform by the user identity; and
the instructions that, when executed by the one or more processing elements, cause the computing system to classify at least some of the user identities within the set of multiple user identities as fitting one or more of multiple different psychographic profiles based on the data extracted from the electronic social networking platform include instructions that, when executed by the one or more processing elements, cause the computing system to classify at least some of the user identities within the set of multiple user identities as fitting one or more of multiple different psychographic profiles based on interests recorded with the electronic social networking platform by the user identities.

18. The system of claim 16 wherein:
the instructions that, when executed by the one or more processing elements, cause the computing system to extract, from an electronic social networking platform for each user identity within a set of multiple user identities of the electronic social networking platform, data associated with the user identity within the electronic social networking platform include instructions that, when executed by the one or more processing elements, cause the computing system to extract, from an electronic social networking platform for each of at least some of the user identities within the set, indications of locations visited by the user identity that have been recorded with the electronic social networking platform; and the instructions that, when executed by the one or more processing elements, cause the computing system to classify at least some of the user identities within the set of multiple user identities as fitting one or more of multiple different psychographic profiles based on the data extracted from the electronic social networking platform include instructions that, when executed by the one or more processing elements, cause the computing system to classify at least some of the user identities within the set of multiple user identities as fitting one or more of multiple different psychographic profiles based on locations visited by the user identities that have been recorded with the electronic social networking platform.

19. The system of claim 16 wherein:

the instructions that, when executed by the one or more processing elements, cause the computing system to identify values for a particular characteristic associated with user identities identified as belonging to the first subset include instructions that, when executed by the one or more processing elements, cause the computing system to identify values for multiple characteristics associated with user identities identified as belonging to the first subset;

the instructions that, when executed by the one or more processing elements, cause the computing system to identify values for a particular characteristic associated with user identities identified as belonging to the second subset include instructions that, when executed by the one or more processing elements, cause the computing system to identify values for multiple characteristics associated with user identities identified as belonging to the second subset;

the instructions that, when executed by the one or more processing elements, cause the computing system to identify values for a particular characteristic associated with user identities identified as belonging to the set of multiple user identities include instructions that, when executed by the one or more processing elements, cause the computing system to identify values for multiple characteristics associated with user identities identified as belonging to the set of multiple user identities; and the instructions that, when executed by the one or more processing elements, cause the computing system to cause a display that reflects a comparison between (i) the percentage of user identities identified as belonging to the first subset associated with each value of the particular characteristic, (ii) the percentage of user identities identified as belonging to the second subset associated with each value of the particular characteristic, and (iii) the percentage of user identities identified as belonging to the set of multiple user identities associated with each value of the particular characteristic include instructions that, when executed by the one or more processing elements, cause the computing system to cause a display that reflects the identified values for the multiple characteristics associated with user identities identified as belonging to the first subset, the identified values for the multiple characteristics associated with user identities identified as belonging to the second subset, and the identified values for the multiple characteristics associated with user identities identified as belonging to the set of multiple user identities.

* * * * *